US 8,619,521 B2

(12) United States Patent
Suzuki

(10) Patent No.: US 8,619,521 B2
(45) Date of Patent: Dec. 31, 2013

(54) DISC DRIVE AND TRACKING SERVO PULL-IN METHOD

(75) Inventor: Yuichi Suzuki, Kanagawa (JP)

(73) Assignee: Sony Corporation, Tokyo (JP)

(*) Notice: Subject to any disclaimer, the term of this patent is extended or adjusted under 35 U.S.C. 154(b) by 1 day.

(21) Appl. No.: 13/352,099

(22) Filed: Jan. 17, 2012

(65) Prior Publication Data
US 2012/0195177 A1  Aug. 2, 2012

(30) Foreign Application Priority Data
Jan. 28, 2011  (JP) ................. 2011-016084

(51) Int. Cl.
  *G11B 7/00*  (2006.01)
(52) U.S. Cl.
  USPC .............. 369/44.26; 369/44.29; 369/53.28
(58) Field of Classification Search
  USPC ........... 369/44.26, 44.29, 44.35, 53.23, 53.28
  See application file for complete search history.

(56) References Cited

U.S. PATENT DOCUMENTS

| | | | |
|---|---|---|---|
| 6,704,252 B2 * | 3/2004 | Aso et al. ............... | 369/30.11 |
| 6,970,409 B2 * | 11/2005 | Araki et al. ............. | 369/53.24 |
| 7,085,204 B1 * | 8/2006 | Park et al. .............. | 369/44.34 |
| 7,164,630 B2 * | 1/2007 | Nakane et al. .......... | 369/44.32 |
| 7,960,092 B2 | 6/2011 | Yamatsu et al. | |
| 8,007,982 B2 | 8/2011 | Uchiyama et al. | |

FOREIGN PATENT DOCUMENTS

| | | |
|---|---|---|
| JP | 02-158920 A | 6/1990 |
| JP | 2008-135144 A | 6/2008 |
| JP | 2008-176902 A | 7/2008 |

* cited by examiner

*Primary Examiner* — Brenda Bernardi
(74) *Attorney, Agent, or Firm* — Wolf, Greenfield & Sacks, P.C.

(57) ABSTRACT

A disc drive includes an optical pickup that emits laser light to a predetermined layer position via an objective lens and detects reflection light of the laser light, a tracking mechanism that drives the objective lens in a tracking direction, a tracking error signal generation unit that generates a tracking error signal, based on a light detecting signal for the reflection light obtained by the optical pickup, a tracking servo control unit that performs a tracking servo control based on the tracking error signal, and a control unit that makes the tracking servo control unit perform tracking servo pull-in on the basis of a frequency measurement result of the tracking error signal and a recording or non-recording determination result based on the light detecting signal.

13 Claims, 36 Drawing Sheets

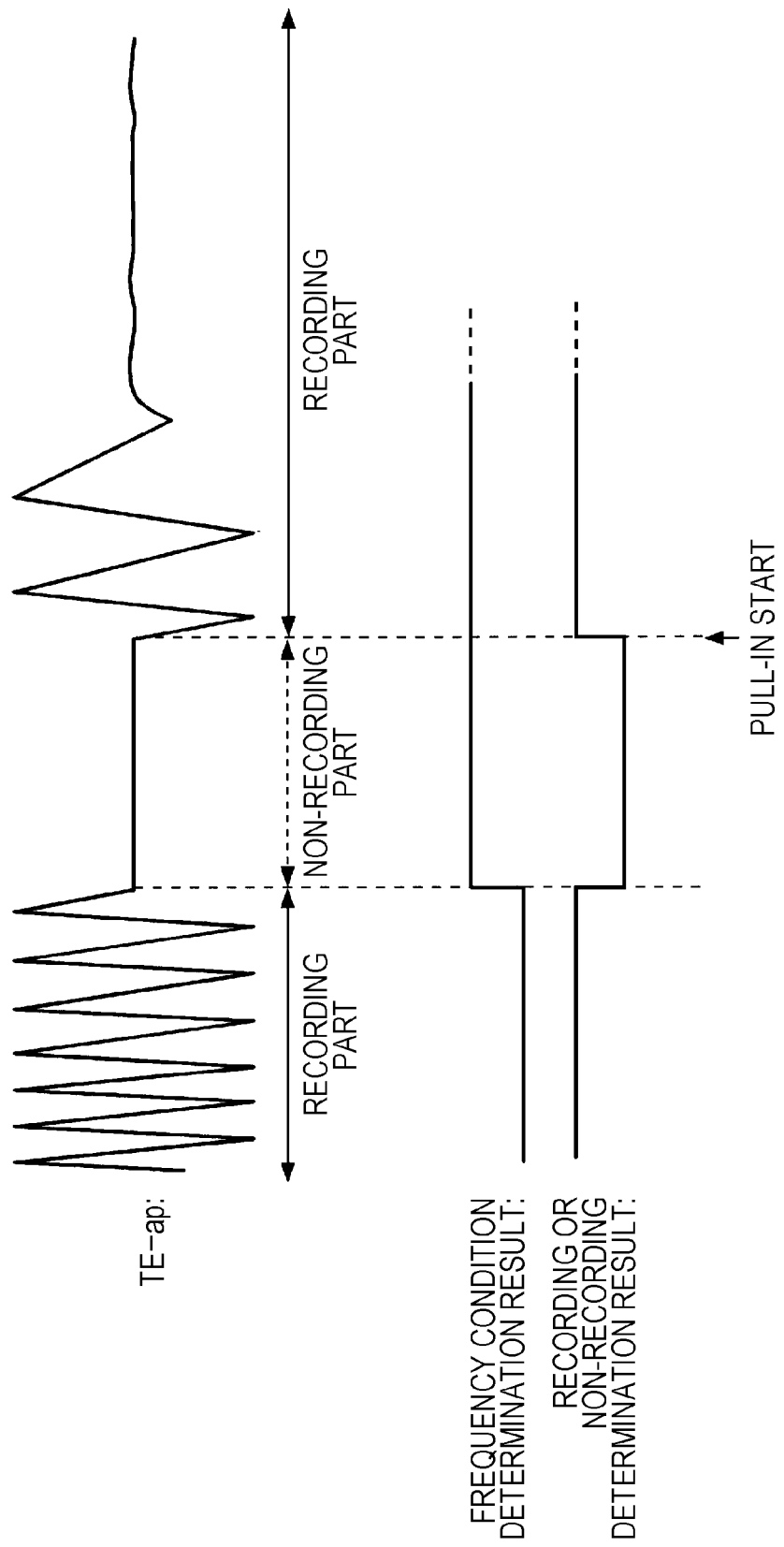

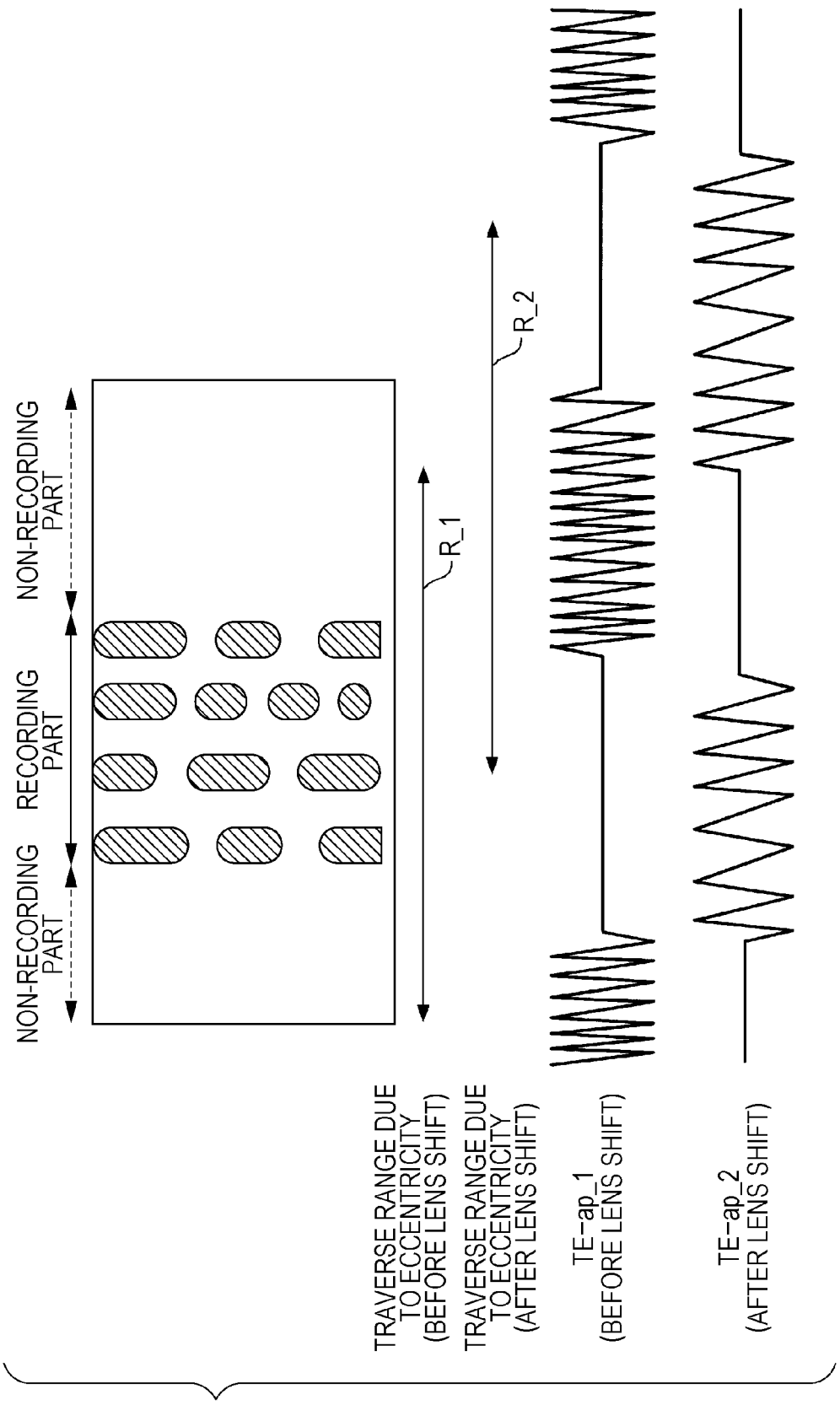

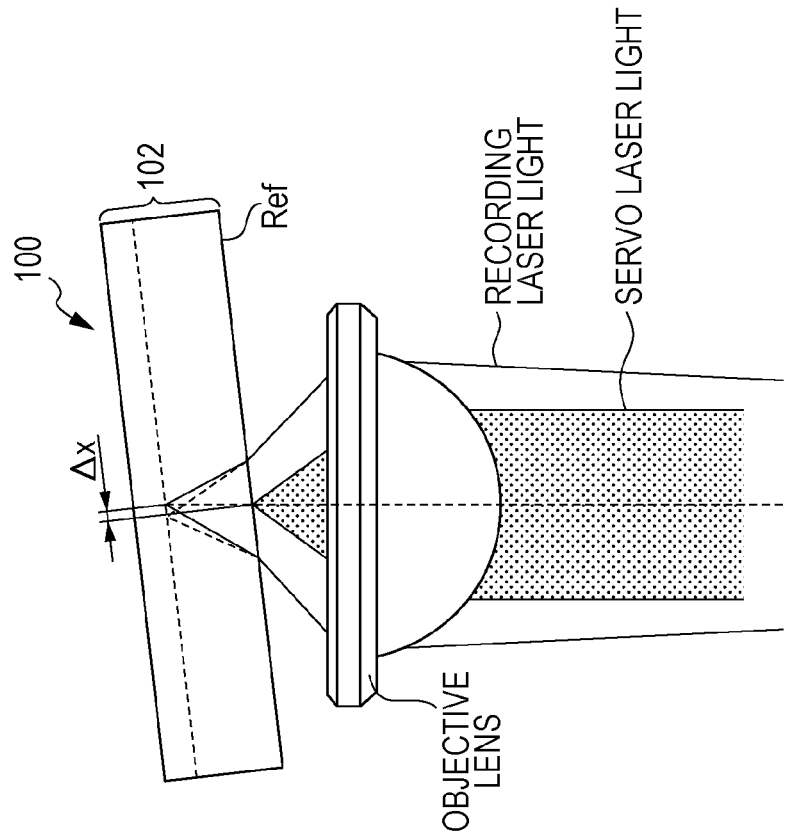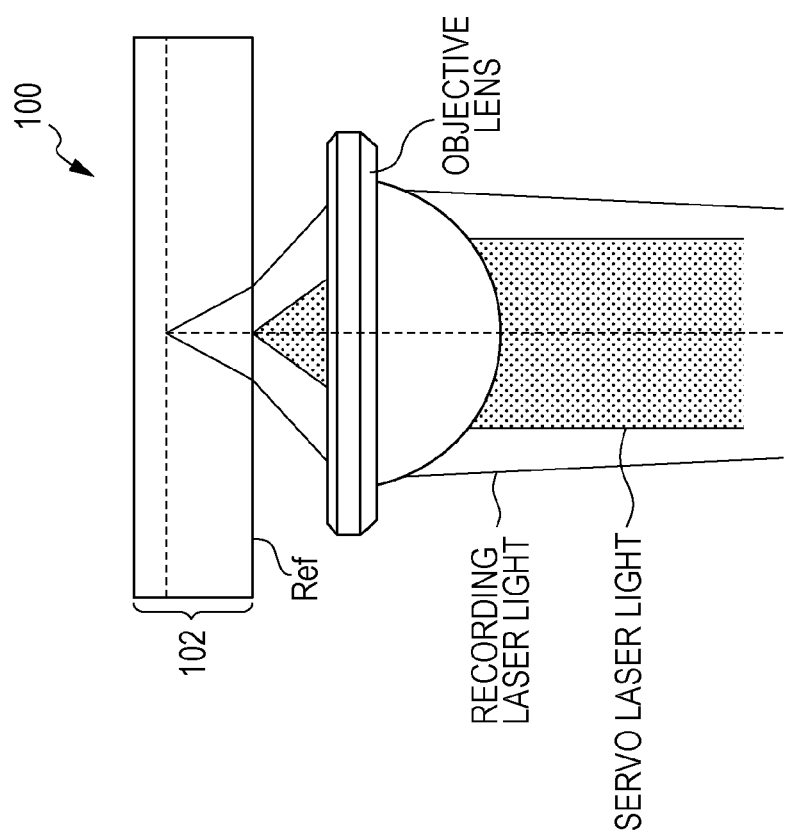

DISC DRIVE AND TRACKING SERVO PULL-IN METHOD

BACKGROUND

The present disclosure relates to a disc drive and a tracking servo pull-in method thereof, and more particularly to a disc drive and a tracking servo pull-in method thereof which are very suitable for a case of recording and reproducing an optical disc recording medium in which position guiders are not formed in advance at a layer position where marks are to be recorded and recording parts and non-recording parts are mixed at the layer position.

As optical disc recording media (optical discs) for recording and reproducing signals using light emission, for example, a CD (Compact Disc), a DVD (Digital Versatile Disc), a BD (Blu-ray Disc: registered trademark), and the like have become widespread.

The present applicant has proposed a so-called bulk recording type optical recording medium as disclosed in Japanese Unexamined Patent Application Publication No. 2008-135144 or Japanese Unexamined Patent Application Publication No. 2008-176902 with regard to optical disc recording media which lead the next generation of optical disc recording media which are widespread at present such as CDs, DVDs, BDs, and the like.

Here, the bulk recording is a technique in which, for example, as shown in FIG. 25, laser light emission is performed for an optical recording medium (a bulk type recording medium 100) having at least a cover layer 101 and a bulk layer (recording layer) 102 while sequentially changing focal positions and thus multi-layer recording is performed inside the bulk layer 102, thereby achieving a large recording capacity.

For such bulk recording, a recording technique called a micro hologram type is disclosed in Japanese Unexamined Patent Application Publication No. 2008-135144.

In the micro hologram type, a so-called hologram recording material is used as a recording material of the bulk layer 102. As the hologram recording material, for example, light cured photopolymer or the like is widely known.

Micro hologram types are largely classified into a positive micro hologram type and a negative micro hologram type.

The positive micro hologram type is a method in which two light beams (light beam A and light beam B) opposite to each other are collected at the same position so as to form fine interference fringes (holograms), which are used as recording marks.

In addition, the negative micro hologram type is a method in which, in contrast to the positive micro hologram type, interference fringes which are formed in advance are erased by laser light emission, and the erased portions are used as recording marks. Specifically, in the negative micro hologram type, an initialization process for forming interference fringes on the bulk layer 102 in advance is performed before a recording operation is performed. The initialization process is performed by irradiating the bulk layer 102 with light beams C and D by parallel light to be opposite to each other, and forming interference fringes on the overall bulk layer 102. Further, the interference fringes are formed in advance through the above-described initialization process, and then information is recorded by forming erasure marks. Specifically, in a state of focusing on an arbitrary layer position, information is recorded using the erasure marks by performing laser light emission according to information to be recorded.

Further, the present applicant has proposed a recording method of forming voids (vacancies) as recording marks, as disclosed in, for example, Japanese Unexamined Patent Application Publication No. 2008-176902, as a method of the bulk recording different from the micro hologram type.

The void recording method is a method in which laser light emission is performed for the bulk layer 102 made of a recording material such as, for example, light cured photopolymer at relatively high power, thereby recording voids inside the bulk layer 102. As disclosed in Japanese Unexamined Patent Application Publication No. 2008-176902, the vacancy portions formed in this way have a refractive index different from other portions in the bulk layer 102, and thus reflectance of light at the interfaces can be heightened. Therefore, the vacancy portions function as recording marks, and thereby information recording is realized by the formation of the vacancy marks.

Since the void recording type does not form holograms, recording may be completed through light emission from one side. In other words, it is not necessary to collect two light beams at the same position and form recording marks unlike the positive micro hologram type.

Upon comparison with the negative micro hologram type, there is an advantage in that the initialization process is not necessary.

In addition, although an example where when the void recording is performed, pre-cure light is applied before the recording is described in Japanese Unexamined Patent Application Publication No. 2008-176902, the void recording can be performed even if the application of the pre-cure light is omitted.

However, the bulk recording type (hereinafter, simply referred to as a bulk type) optical recording medium where the above-described variety of recording methods are proposed does not have an explicit multi-layer structure in the meaning that the recording layer (bulk layer) of the bulk type optical recording medium is formed by, for example, a plurality of recording films (reflection films). That is to say, the bulk layer 102 is not provided with a plurality of recording films and position guiders for each recording film which a typical multi-layer disc has.

Therefore, in a state of the structure of the bulk type recording medium 100 shown in FIG. 25 described above, a focus servo or a tracking servo may not be performed during the recording where the marks are not formed.

For this reason, in practice, the bulk type recording medium 100 is provided with a reflection surface (reference face Ref) which has guide grooves as shown in FIG. 26 and is used as a reference.

Specifically, guide grooves (position guider) are formed at the lower surface side of the cover layer 101 by, for example, formation of pits or grooves and a selective reflection layer 103 is formed thereon. In addition, the bulk layer 102 is laminated on the lower layer side of the cover layer 101 where the selective reflection layer 103 is formed in this way, via an adhesive material such as, for example, a UV cured resin as an intermediate layer 104 in the figure.

After the above-described medium structure is formed, as shown in FIG. 27, the bulk type recording medium 100 is irradiated with servo laser light as laser light for position control independently from laser light for recording marks (hereinafter, recording laser light).

As shown in the figure, the recording laser light and the servo laser light are applied to the bulk type recording medium 100 via a common objective lens.

At this time, if the servo laser light reaches the bulk layer 102, there is concern that the servo laser light may have an adverse effect on the mark recording in the bulk layer 102. For this reason, in the bulk recording type in the related art, laser light having a wavelength band different from that of the recording laser light is used as the servo laser light, and, as a reflection layer formed on the guide groove formation surface (reference face Ref), the selective reflection layer 103 having wavelength selectivity of reflecting servo laser light and transmitting recording laser light therethrough is provided.

Based on the above-described premise, an operation of when marks are recorded on the bulk type recording medium 100 will be described with reference to FIG. 27.

First, when multi-layer recording is performed for the bulk layer 102 which does not have guide grooves or a reflection layer, a layer position where the marks are recorded in the bulk layer 102 in the depth direction is set in advance. In the figure, as a layer position where marks are formed (mark forming layer position: also referred to as an information recording layer position) in the bulk layer 102, a case is exemplified where a total of five information recording layer positions L of a first information recording layer L1 to a fifth information recording layer position L5 are set. As shown, the first information recording layer position L1 is set at a position separated from the selective reflection layer 103 (reference face Ref) on which the guide grooves are formed, in the focus direction (depth direction) by a first offset of-L1. In addition, the second information recording layer position L2, the third information recording layer position L3, the fourth information recording layer position L4, and the fifth information recording layer position L5 are respectively set at positions separated from the reference face Ref by a second offset of-L2, a third offset of-L3, a fourth offset of-L4, and a fifth offset of-L5.

Here, during recording where the marks are not formed, a focus servo or a tracking servo may not be performed for each layer position L in the bulk layer 102 based on reflection light of the recording laser light. Therefore, a focus servo control and a tracking servo control of the objective lens during the recording are performed such that a spot position of the servo laser light tracks the guide grooves on the reference face Ref based on reflection light of the servo laser light as position control light.

However, it is necessary for the recording laser light to reach the bulk layer 102 formed at the lower layer side of the selective reflection layer 103 for the mark recording. For this reason, an optical system in this case is provided with a focus mechanism for independently adjusting a focus position of the recording laser light separately from the focus mechanism of the objective lens.

Here, FIG. 28 shows an internal configuration example of a recording apparatus of the bulk type recording medium 100 including a mechanism for independently adjusting a focus position of the recording laser light.

In FIG. 28, a first laser diode 111 denoted by LD1 is a light source of recording laser light, and a second laser diode 119 denoted by LD2 is a light source of servo laser light. As can be seen from the above description, the first laser diode 111 and the second laser diode 119 are configured to emit laser light having wavelength bands different from each other.

As shown in the figure, recording laser light emitted from the first laser diode 111 is incident to a focus mechanism including a fixed lens 113, a movable lens 114, and a lens driving portion 115, via a collimation lens 112. When the movable lens 114 is driven in a direction parallel to the optical axis of the recording laser light by the lens driving portion 115, a collimation state (divergence, parallel, and convergence) of the recording laser light incident to an objective lens 117 in the figure varies, and thus a focus position of the recording laser light can be adjusted independently from variations of a focus position due to driving of the objective lens 117.

In addition, in this meaning, the focus mechanism is also indicated as a recording light focus mechanism.

The recording laser light is incident via the recording light focus mechanism to a dichroic mirror (dichroic prism) 116 which is configured to transmit light having the same wavelength band as the recording laser light therethrough and reflect light other than that.

As shown in the figure, the recording laser light passing through the dichroic mirror 116 is applied to the bulk type recording medium 100 via the objective lens 117. The objective lens 117 is maintained so as to be displaced in a focus direction and a tracking direction by a biaxial actuator 118.

In addition, servo laser light emitted from the second laser diode 119 is transmitted through a beam splitter 121 via a collimation lens 120 and is incident to the above-described dichroic mirror 116. The servo laser light is reflected by the dichroic mirror 116 and is incident to the objective lens 117 such that the optical axis thereof matches the optical axis of the recording laser light which is transmitted through the dichroic mirror 116.

The servo laser light which is incident to the objective lens 117 focuses on the selective reflection layer 103 (reference face Ref) of the bulk type recording medium 100 when the biaxial actuator 118 is driven through a focus servo control by a servo circuit 125 described later. In addition, a position in the tracking direction of the servo laser light follows the guide grooves formed on the selective reflection layer 103 when the biaxial actuator 118 is driven through a tracking servo control by the servo circuit 125.

Reflection light of the servo laser light from the selective reflection layer 103 is reflected by the dichroic mirror 116 via the objective lens 117, and then is reflected by the beam splitter 121. The reflection light of the servo laser light reflected by the beam splitter 121 is collected on a detection surface of a photo detector 123 via a condensing lens 122.

A matrix circuit 124 generates each of focus and tracking error signals based on light detecting signals from the photo detector 123, and each error signal is supplied to the servo circuit 125.

The servo circuit 125 generates a focus servo signal and a tracking servo signal from each error signal. When the biaxial actuator 118 is driven based on the focus servo signal and the tracking servo signal, the focus servo control and the tracking servo control of the objective lens 117 are realized.

Here, when mark recording is performed on a necessary information recording layer position L among the respective information recording layer positions L set in the bulk type recording medium 100 in advance, a focus position of the recording laser light is varied by an amount according to an offset corresponding to a selected information recording layer position L by controlling driving of the lens driving portion 115.

Specifically, such a setting control of the information recording position is performed by, for example, a controller 126 which controls the overall recording apparatus. That is to say, the controller 126 controls the lens driving portion 115 based on an offset amount of-L which is set in advance according to a targeted information recording layer position Ln, and an information recording position (focus position) by the recording laser light focuses on the targeted information recording layer position Ln.

In addition, the tracking servo of the recording laser light during recording, as described above, is automatically performed when the servo circuit 125 performs the tracking servo control for the objective lens 117 based on reflection light of the servo laser light. Specifically, a spot position of the recording laser light in the tracking direction is controlled to be located under the guide grooves formed on the reference face Ref.

When the bulk type recording medium 100 on which marks have been recorded is reproduced, it is not necessary to control a position of the objective lens 117 based on reflection light of the servo laser light from the reference face Ref unlike the recording. In other words, during the reproduction, it is possible to perform a focus servo control and a tracking servo control of the objective lens 117 based on reflection light of the reproduction laser light by targeting a mark string formed at the information recording layer positions L to be reproduced by applying reproduction laser light.

However, in a case of employing a specification which allows a recording part and a non-recording part to be mixed in the same layer position L, in relation to the focus servo control during the reproduction, it is preferable to employ a method in which a position of the objective lens 117 is controlled (a focal position of the recording laser light is adjusted by the recording light focus mechanism) based on reflection light of the servo laser light from the reference face Ref in the same manner as the recording. This is because focus servo misalignment of recording and reproducing laser light is prevented from occurring in the non-recording part.

As described above, in the bulk recording type, the recording laser light for recording the marks and the servo laser light as position control light are applied to the bulk type recording medium 100 through the common objective lens 117 (through the synthesis on the same optical axis). In addition, a focus servo and a tracking servo can be performed for the recording laser light even if guide grooves or a reflection surface where the guide grooves are formed are not formed in the bulk layer 102, by performing a focus servo control and a tracking servo control for the objective lens 117 based on the reflection light of the servo laser light.

However, in a case of employing the above-described servo control method, in relation to the recording laser light and the servo laser light, a spot position is misaligned in an inner direction of the recording surface due to lens shift of the objective lens 117 caused by eccentricity of the bulk type recording medium 100 or so-called skew (tilt).

FIGS. 29A and 29B schematically show a spot position misalignment of the recording laser light and the servo laser light due to occurrence of skew.

In a state where there is no skew shown in FIG. 29A, the spot positions of the servo laser light and the recording laser light correspond with each other in the recording surface inner direction. In contrast, in a case where there is skew as shown in FIG. 29B, the optical axes of the servo laser light and the recording laser light are misaligned with each other, and thus the spot position misalignment Δx occurs as shown in the figure.

FIGS. 30A and 30B schematically show a spot position misalignment of the recording laser light and the servo laser light due to lens shift.

In a state where there is no lens shift shown in FIG. 30A, the objective lens is in a reference position, and thus the center of the objective lens corresponds with the optical axis c of each laser light beam incident to the objective lens. An optical system is designed such that spot positions correspond with each other in the recording surface inner directions of the respective laser light beams in a state where the objective lens is in the reference position.

In contrast, when the objective lens is shifted from the reference position so as to track disc eccentricity as shown in FIG. 30B (in this case, the objective lens is shifted in the left direction of the figure) through the tracking servo control, the spot position misalignment Δx occurs as shown in the figure.

The spot position misalignment caused by the lens shift occurs due to a difference in incident aspects of the servo laser light and the recording laser light to the objective lens. Specifically, this is because the servo laser light is incident to the objective lens so as to be substantially parallel, whereas the recording laser light is incident thereto so as not to be parallel.

A misalignment in information recording positions occurs in the bulk layer 102 according to the occurrence of the spot position misalignment of the servo laser light and the recording laser light caused by the skew or the lens shift. That is to say, as can be seen from the above description, a spot position of the recording laser light during recording is controlled by performing a tracking servo control for the objective lens based on reflection light of the servo laser light, and thus recording may not be performed at a desired position in the bulk layer 102 because of the occurrence of the above-described spot position misalignment.

At this time, there is concern that information recording positions may overlap each other between adjacent tracks depending on an amount of skew or eccentricity of the disc to be generated or settings of track pitch (formation interval of position guiders). Specifically, since the disc eccentricity or the skew may occur in a different aspect because a disc is clamped onto a spindle motor each time discs are loaded, for example, in a case where a disc is rewritten according to disc shifting, an aspect of skew or eccentricity which has occurred in previous recording is different from an aspect of skew or eccentricity occurring during the rewriting, and thereby there may occur a problem that a mark string in the pre-recording part may overlap a mark string in the rewritten part, or they may intersect each other depending on the situation.

In this state, a recording signal may not be reproduced correctly.

As one method for preventing the overlapping or intersection of the mark strings, there may be a method in which a track pitch in the reference face Ref is set to be wide.

However, if the track pitch in the reference face Ref is widened, recording capacity is naturally reduced in the bulk layer 102.

As one method for preventing reduction in recording capacity in the bulk layer 102 while preventing the overlapping or intersection of the recorded mark strings due to the above-described skew or lens shift, employing a servo control method using a so-called ATS (Adjacent Track Servo) has been reviewed.

FIG. 31 is a diagram illustrating the ATS.

The ATS has been reviewed originally as a self servo track writer (SSTW) in a hard disc drive.

As shown in FIG. 31, in the ATS, an adjacent track servo spot Sats is formed on a recording medium along with a recording spot Srec (irradiation spot of the recording laser light).

In the ATS, the recording spot Srec is a leading spot (for example, an outer circumferential side in a case where recording progresses from the inner circumference to the outer circumference in the radius direction), the adjacent track servo spot Sats is a following spot, and a tracking servo is performed on a mark string formed by the recording spot Srec using the adjacent track servo spot Sats. That is to say, a tracking servo control of the objective lens is performed such that the adjacent track servo spot Sats follows a track previous to one track of tracks formed by the recording spot Srec.

According to the ATS, since a track pitch is a distance S between spots and is constant, it is possible to effectively prevent the problem that the tracks overlap each other (information recording positions overlap each other) due to the influence of the eccentricity.

Here, when recording is started by the ATS, first, tracking servo pull-in is performed on a pre-recording part by the adjacent track servo spot Sats.

Specifically, when recording is started by the ATS, the tracking servo pull-in is performed on a pre-recording part by the adjacent track servo spot Sats. If the tracking servo pull-in is successful, address information recorded in the pre-recorded mark strings can be read by the adjacent track servo spot Sats, and thus it is possible to detect a timing when the adjacent track servo spot Sats reaches a position which is previous to one circumference of an end position of the pre-recording part. In this way, it is possible to start rewriting on a previously recording part by starting recording using the recording spot Srec at the timing when the adjacent track servo spot Sats reaches a position which is previous to one circumference of an end position of the pre-recording part.

However, it is noted that a pre-recorded mark string (recording track) is relatively moved (a so-called traverse state) with respect to the adjacent track servo spot Sats due to the influence of the disc eccentricity when the pull-in is performed.

FIG. 32 is a diagram illustrating a traverse signal (a tracking error signal obtained in a traverse state) accompanied by the disc eccentricity.

If the disc eccentricity occurs, a movement speed of a track which traverses a spot varies at a period corresponding to rotation of the disc. For this reason, the traverse signal accompanied by the disc eccentricity can be obtained by a waveform where high and low frequencies thereof are repeated periodically as shown in the figure.

Here, a movement speed of the track is preferably low when the tracking servo pull-in is performed.

In light of this point, in the related art, there has been proposed a method in which a speed is controlled such that a relative speed of the track to the spot is equal to or less than a predetermined speed and then the tracking servo pull-in is started, for example, as disclosed in Japanese Unexamined Patent Application Publication No. 02-158920.

Alternatively, more simply, a method has been generally performed in which the tracking servo pull-in is started when a relative speed of the track to the spot is equal to or less than a predetermined speed without performing a speed control.

FIG. 33 shows a configuration for realizing the latter method, that is, a pull-in method as a related example where the tracking servo pull-in is started when a relative speed of the track to the spot is equal to or less than a predetermined speed.

In the figure, a tracking servo circuit 130 generates a tracking servo signal TS for making a value of a tracking error signal TE a constant target value (for example, zero) by performing a predetermined filter process for the tracking error signal TE. A tracking driver 132 drives a tracking actuator 133 which maintains the objective lens so as to be displaced in the tracking direction, depending on a tracking drive signal TD which is generated based on the tracking servo signal TS.

With this configuration, in a state where a tracking servo loop is turned on (the filter process is in an ON state), there is performed a control for making a value of the tracking error signal TE a constant target value, that is, a tracking servo control for enabling a beam spot to follow a track.

In this case, a frequency condition determination circuit 131 is provided as a configuration for instructing the tracking servo circuit 130 to start the tracking servo pull-in.

The frequency condition determination circuit 131 measures a frequency of the tracking error signal TE (that is, the traverse signal) in a state where the tracking servo loop is turned off, and instructs the tracking servo circuit 130 to start the tracking servo pull-in when the frequency becomes equal to or less than a predetermined threshold value.

With this, when the recording tracking is moved with respect to the beam spot due to the influence of the disc eccentricity, the pull-in can be started at a timing when a relative speed is low, and thus it is possible to realize more stable tracking servo pull-in.

SUMMARY

However, there is concern that appropriate tracking servo pull-in may not be performed in a case where the above-described tracking servo pull-in method in the related art is employed as a tracking servo pull-in method for the bulk type recording medium 100 without modification.

Specifically, in a case of employing the specification which allows a recording part and a non-recording part to be mixed in the same layer position L as described above, appropriate tracking servo pull-in may not be realized.

Here, optical discs (hereinafter, also referred to as typical discs) in the related art such as CDs, DVDs, and BDs, position guiders (tracks) for guiding recording (reproduction) positions of information using, for example, pre-grooves, pre-pits, or the like are formed on a recording layer (recording film) in advance.

In contrast, in the bulk type recording medium 100, position guiders are not formed by grooves or pits in advance, and tracks are not formed in a non-recording part of marks, at each layer position L of the bulk layer 102 unlike the typical discs.

For this reason, there is concern that if the pull-in method in the related art based on the above-described traverse signal frequency is employed without modification, tracking servo pull-in may not be performed appropriately.

Hereinafter, this will be described in detail.

FIGS. 34A to 34C are diagrams illustrating a traverse signal in a case where a recording part and a non-recording part are mixed in the same layer in a typical disc.

As shown in FIG. 34A, in the typical disc, position guiders are formed in advance in the recording layer. Therefore, as shown in FIG. 34B, even in a case where recording is performed only at a part of the recording layer, it is possible to obtain a traverse signal (a traverse signal accompanied by the disc eccentricity) having an amplitude corresponding to traverse of the tracks regardless of the recording part and the non-recording part as shown in FIG. 34C.

In contrast, in a recording medium where position guiders are not formed on the recording layer in advance such as the bulk type recording medium 100, tracks are formed only on the recording part of information as shown in FIG. 35A. Therefore, a traverse signal accompanied by the disc eccentricity in this case can have an amplitude corresponding to traverse of the track only in the recording part, and does not have an amplitude (becomes zero) in the non-recording part.

FIGS. 36A and 36B are diagrams illustrating a problem in a case where a disc where position guiders are not formed such as the bulk type recording medium 100 employs the pull-in method in the related art.

FIG. 36A shows a waveform of the tracking error signal TE in a case where the tracking servo pull-in in the related art is performed for a typical disc for comparison. In a case of the typical disc where position guiders are formed on the recording layer in advance, the tracking servo pull-in is performed according to establishment of the above-described frequency condition, thereby the pull-in can be performed normally, and therefore it is possible to obtain a track-following state after the pull-in is successful.

In contrast, in the disc where position guiders are not formed, as cases where the above-described frequency condition is established, there are two cases where a frequency of the traverse signal obtained from the recording part is reduced and a spot enters the non-recording part.

In the latter case, that is, in the case where the spot enters the non-recording part and the frequency condition is established, the tracking servo pull-in is performed for the non-recording part as shown in FIG. 36B. That is to say, the tracking servo pull-in may not be appropriately performed for the recording tracks.

As shown in FIG. 36B, since the amplitude of the tracking error signal TE is zero in the non-recording part, the objective lens is in a non-control state, and thus in this case, the traverse state due to the eccentricity continues even after performing the pull-in. As shown in the figure, tracking servo misalignment is initially detected at a time point when the recording part enters the spot again due to the influence of the eccentricity.

As such, if the tracking servo pull-in method in the related art based on a traverse signal frequency is simply applied to a disc where position guiders are not formed in advance at a layer position in which marks are recorded such as the bulk type recording medium 100, the tracking servo pull-in may not be performed appropriately.

It is desirable to appropriately perform tracking servo pull-in in an optical disc recording medium where position guiders are not formed in advance at a layer position in which marks are recorded, and a mixture of a recording part and a non-recording part is allowed at the layer position.

A disc drive according to an embodiment of the present disclosure has the following configuration.

That is to say, there is provided a light emission and detecting unit (optical pickup) that emits laser light to a predetermined layer position via an objective lens and detects reflection light of the laser light with respect to an optical disc recording medium where marks are recorded at the predetermined layer position through application of laser light.

In addition, there is provided a tracking mechanism that drives the objective lens in a tracking direction which is a direction parallel to a radius direction of the optical disc recording medium.

Further, there is provided a tracking error signal generation unit that generates a tracking error signal indicating a position error of an irradiation spot of the laser light with respect to a track which is formed at the predetermined layer position through mark recording, based on a light detecting signal for the reflection light obtained by the optical pickup.

There is provided a tracking servo control unit that performs a tracking servo control based on the tracking error signal.

In addition, there is provided a control unit that makes the tracking servo control unit perform tracking servo pull-in on the basis of a frequency measurement result of the tracking error signal and a recording or non-recording determination result based on the light detecting signal, in a state where a tracking servo control by the tracking servo control unit is turned off.

According to the embodiment of the present disclosure, tracking servo pull-in is performed on the basis of a frequency measurement result (traverse frequency measurement result) of the tracking error signal as a traverse signal obtained in a state where a tracking servo control is turned off, and a recording or non-recording determination result based on the light detecting signal.

If the tracking servo pull-in is performed based on not only a traverse frequency condition in the related art but also a recording and non-recording condition, it is possible to effectively prevent the tracking servo pull-in from being performed for a non-recording part.

According to the embodiments of the present disclosure, it is possible to effectively prevent tracking servo pull-in from being erroneously performed for a non-recording part in an optical disc recording medium where position guiders are not formed in advance at a layer position in which marks are to be recorded, and a mixture of a recording part and a non-recording part is allowed at the layer position.

BRIEF DESCRIPTION OF THE DRAWINGS

FIG. 4 is a diagram illustrating a pull-in method according to the first embodiment.

FIG. 6 is a diagram illustrating an effect achieved by a pull-in method according to a second embodiment.

FIGS. 29A and 29B are diagrams schematically illustrating spot position misalignment of recording laser light and servo laser light due to skew.

DETAILED DESCRIPTION OF EMBODIMENTS

Hereinafter, embodiments of the present disclosure will be described.

In addition, the description will be made in the following order.

1. FIRST EMBODIMENT
1-1. OPTICAL DISC RECORDING MEDIUM WHICH IS TARGET OF RECORDING AND REPRODUCTION
1-2. INTERNAL CONFIGURATION OF DISC DRIVE
1-3. PULL-IN METHOD ACCORDING TO FIRST EMBODIMENT
1-4. CONFIGURATION RELATED TO PULL-IN CONTROL
2. SECOND EMBODIMENT
2-1. PROBLEM THAT TRAVERSE FREQUENCY IS NOT REDUCED
2-2. PULL-IN METHOD ACCORDING TO SECOND EMBODIMENT
2-3. CONFIGURATION RELATED TO PULL-IN CONTROL
2-4. MODIFIED EXAMPLE ACCORDING TO SECOND EMBODIMENT
3. THIRD EMBODIMENT
3-1. PULL-IN METHOD ACCORDING TO THIRD EMBODIMENT
3-2. CONFIGURATION RELATED TO PULL-IN CONTROL
3-3. MODIFIED EXAMPLE 1 OF THIRD EMBODIMENT
3-4. MODIFIED EXAMPLE 2 OF THIRD EMBODIMENT
3-5. MODIFIED EXAMPLE 3 OF THIRD EMBODIMENT
4. FOURTH EMBODIMENT
4-1. OPTICAL DISC RECORDING MEDIUM WHICH IS TARGET OF RECORDING AND REPRODUCTION
4-2. INTERNAL CONFIGURATION OF DISC DRIVE
5. MODIFIED EXAMPLE

Figure 1:
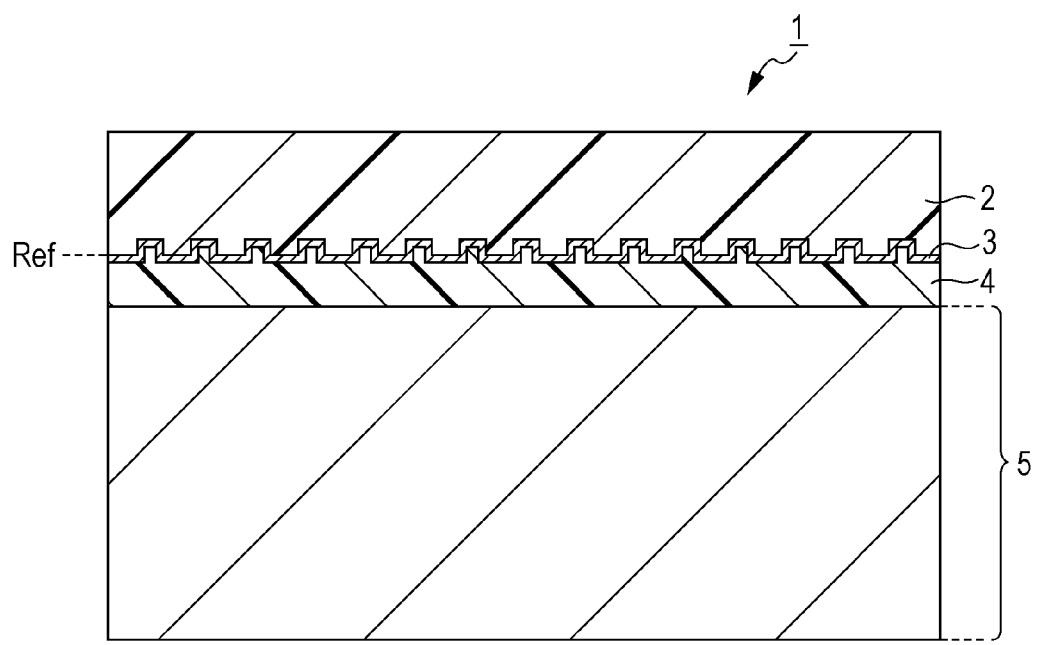
FIG. 1 is a diagram illustrating a cross-sectional structure of an optical disc recording medium which is a target of recording and reproduction according to a first embodiment.

1. First Embodiment 1-1. Optical Disc Recording Medium which is Target of Recording and Reproduction FIG. 1 is a diagram illustrating a cross-sectional structure of an optical disc recording medium which is a target of recording and reproduction by a disc drive according to the first embodiment.

The optical disc recording medium which is a target of recording and reproduction according to the first embodiment is a so-called bulk recording type optical disc recording medium, and is hereinafter referred to as a bulk type recording medium 1.

In the bulk type recording medium 1 as an optical disc recording medium, mark recording (information recording) is performed by applying laser light in a state where it is rotatably driven by a recording apparatus.

In addition, the optical disc recording medium is a generic name of disc-shaped recording media which record (and reproduce) information through light irradiation.

As shown in FIG. 1, the bulk type recording medium 1 is provided with a cover layer 2, a selective reflection layer 3, an intermediate layer 4, and a bulk layer 5 which are sequentially formed from the upper layer side.

Here, in the present specification, the "upper layer side" indicates an upper layer side when a face to which laser light from a recording apparatus (a recording apparatus 10) according to an embodiment described later is incident is an upper face.

In addition, in the present specification, the term "depth direction" is used and indicates a direction (that is, a direction parallel to an incident direction of laser light from the recording apparatus: focus direction) corresponding to the vertical direction (longitudinal direction) according to the definition of the "upper layer side".

In the bulk type recording medium 1, the cover layer 2 is made of resin such as, for example, polycarbonate or acryl, and, as shown in the figure, position guiders for guiding recording and reproduction positions are formed on the lower surface.

The position guiders include guide grooves formed by continuous grooves or a pit string. The guide grooves are formed in a spiral shape on the disc surface.

For example, if the guide grooves are formed by the pit string, position information (absolute position information: rotation angle information as information indicating a rotation angle position on a disc, radius position information, or the like, which is hereinafter also referred to as address information) is recorded by combinations of lengths of pits and lands. Alternatively, if the guide grooves are formed by grooves, the grooves are formed to be wobbled in a cyclic manner, and thereby position information is recorded using the cycle information of the corresponding wobbles.

The cover layer 2 is generated by, for example, an injection molding using a stamper on which the guide grooves (concave-convex shape) are formed.

The selective reflection layer 3 is formed on the lower surface side of the cover layer 2 provided with the guide grooves.

Here, as described above, in the bulk recording type, separately from light for performing recording of marks (recording laser light) for the bulk layer 5 as a recording layer, servo light for obtaining an error signal of tracking or focus (also referred to as position control light or servo laser light) based on the above-described guide grooves is applied.

At this time, if the servo laser light reaches the bulk layer 5, it may have an adverse effect on the mark recording in the bulk layer 5. For this reason, a reflection layer having selectivity of reflecting the servo laser light and transmitting the recording laser light therethrough is used.

In the bulk recording method in the related art, the recording laser light and the servo laser light use laser light having different wavelength bands, and, in order to correspond thereto, the selective reflection layer 3 uses a selective reflection layer having wavelength selectivity of reflecting light having the same wavelength band as the servo laser light and transmitting light other than that therethrough.

The bulk layer 5 as a recording layer is formed (adhered) under the lower layer side of the selective reflection layer 3 via the intermediate layer 4 made of, for example, an adhesive material such as a UV cured resin.

A material (recording material) of the bulk layer 5 may appropriately use optimal material according to an employed bulk recording type such as, for example, the positive micro hologram type, the negative micro hologram type, or the void recording type described above.

In addition, a mark recording type for the optical disc recording medium to which the present disclosure is applied is not particularly limited but may use an arbitrary type in a scope of the bulk recording type.

Hereinafter, in this example, a case of employing the void recording type will be described.

In a case of employing the void recording type, the bulk layer 5 may be made of resin.

Here, in the bulk type recording medium 1 having the above-described configuration, the selective reflection layer 3 which has a concave-convex cross-sectional shape pattern due to the formation of the above-described guide grooves becomes a reflection layer which is used as a reference when a position control of the recording laser light is performed based on the servo laser light as described later. In this meaning, the face on which the selective reflection layer 3 is formed is hereinafter referred to as a reference face Ref.

Figure 27:
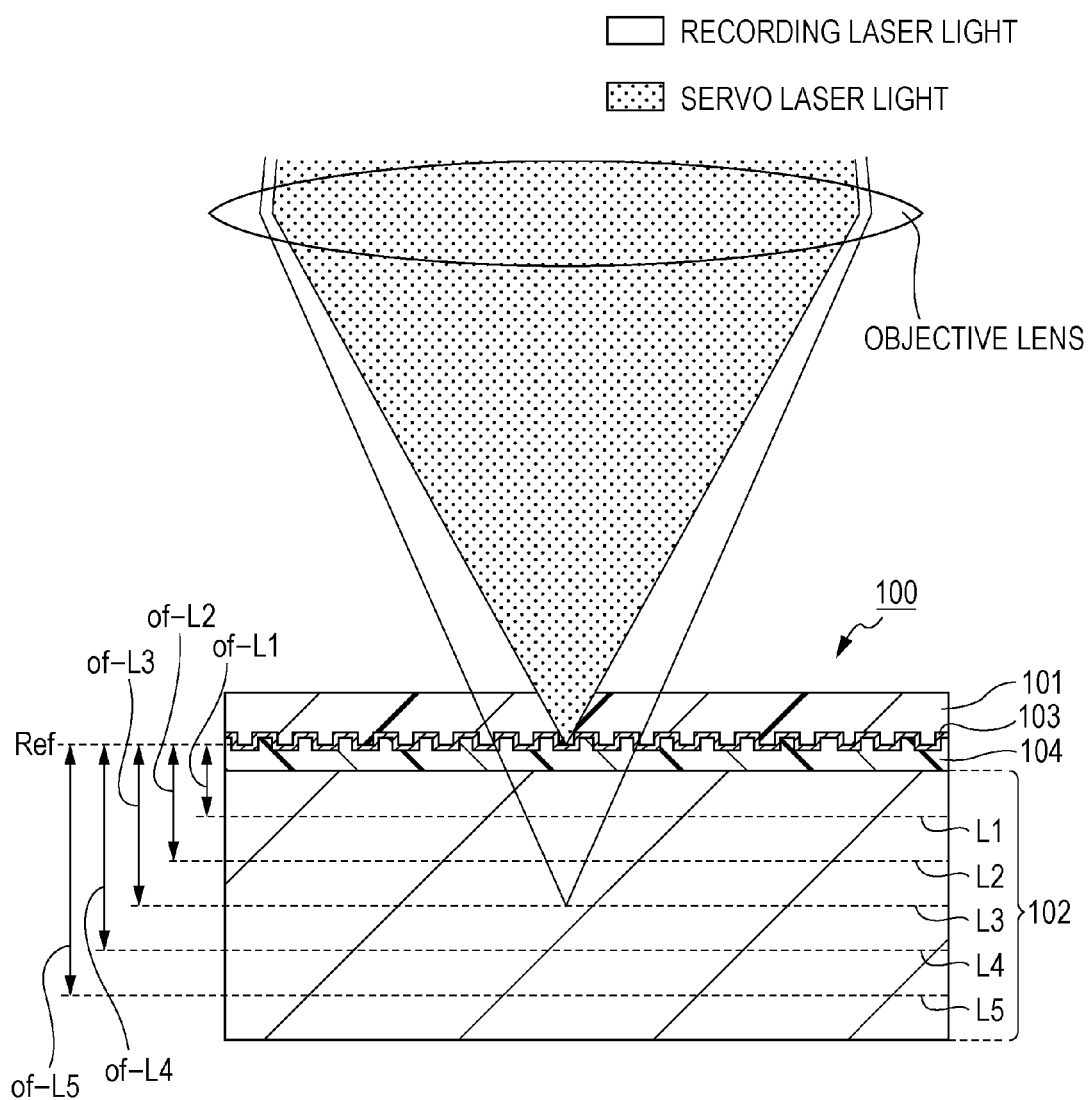
FIG. 27 is a diagram illustrating an operation of recording marks on the bulk type recording medium.

As described with reference to FIG. 27, each layer position (information recording layer positions L) where information is recorded is set in advance such that multi-layer recording is performed in the recording layer having a bulk shape in the bulk type optical recording medium. In the bulk type recording medium 1 as well, in the same manner as FIG. 27, it is assumed that a first information recording layer position L1, a second information recording layer position L2, a third information recording layer position L3, a fourth information recording layer position L4, and a fifth information recording layer position L5 are respectively set in the information recording layer positions L by a first offset of-L1, a second offset of-L2, a third offset of-L3, a fourth offset of-L4, and a fifth offset of-L5 separated from the reference face Ref in the depth direction.

Information for the offset of-L to each layer position L from the reference face Ref is set in the recording apparatus side in advance.

In addition, the number of the information recording layer positions L is not limited to five.

1-2. Internal Configuration of Disc Drive

Figure 2:
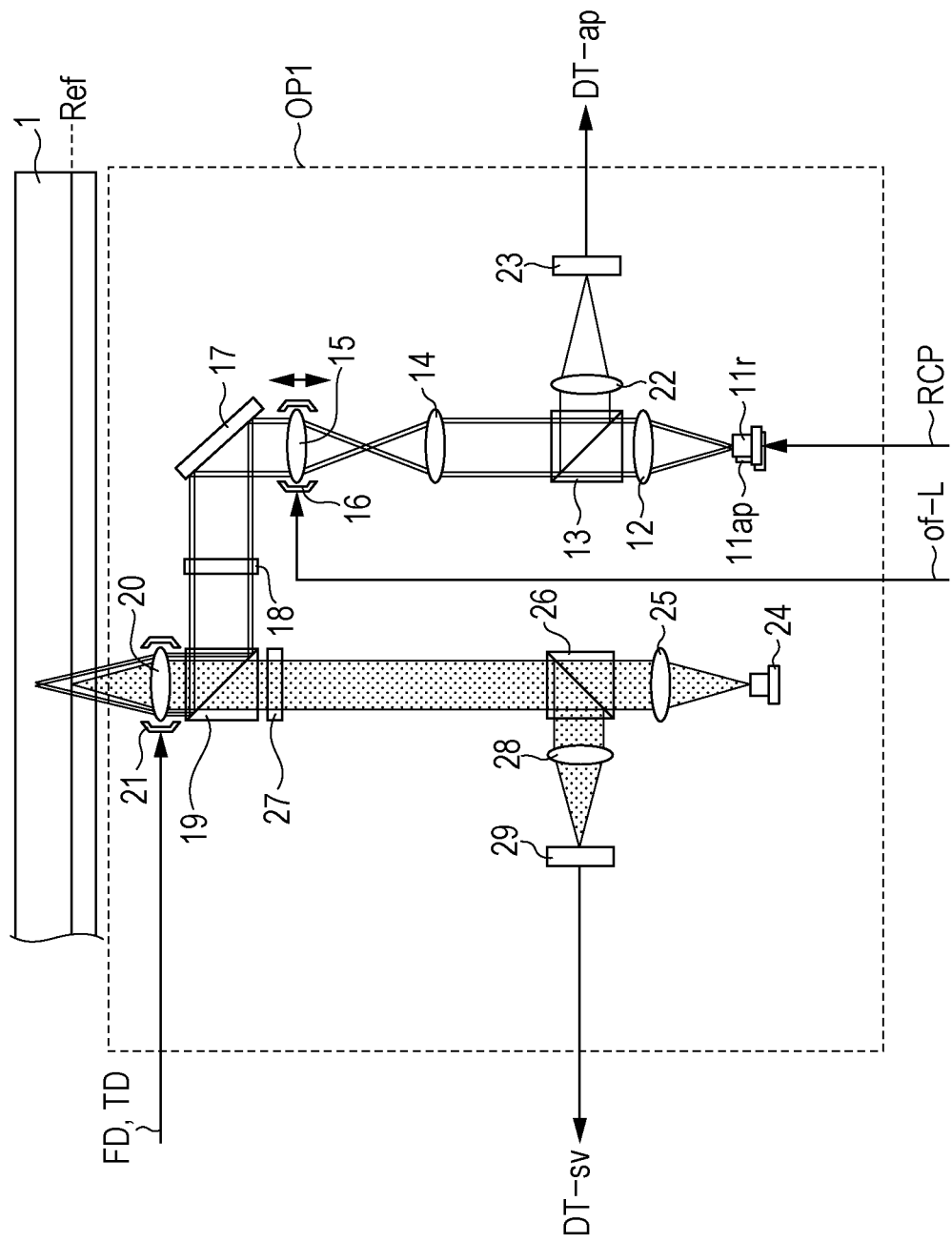
FIG. 2 is a diagram illustrating a configuration of the main optical system included in the disc drive according to the first embodiment.

FIG. 2 is a diagram illustrating a configuration of a main optical system included in the disc drive which performs recording and reproduction for the bulk type recording medium 1 shown in FIG. 1 according to the first embodiment. Specifically, FIG. 2 mainly shows an internal configuration of an optical pickup OP1 included in the disc drive.

In FIG. 2, the bulk type recording medium 1 loaded onto the disc drive is set such that the center hole thereof is clamped at a predetermined position in the disc drive, and is held to be rotatably driven by a spindle motor (not shown).

The optical pickup OP1 is provided to irradiate the bulk type recording medium 1 which is rotatably driven by the spindle motor with ATS (Adjacent Track Servo) light for forming recording laser light, servo laser light, and adjacent track servo spot Sats.

Here, as described with reference to FIG. 31, in the ATS, the recording spot Srec (irradiation spot of the recording laser light) and the adjacent track servo spot Sats (irradiation spot of the ATS light) are formed on the recording medium.

In the ATS, the recording spot Srec is a leading spot (for example, an outer circumferential side in a case where recording progresses from the inner circumference to the outer circumference in the radius direction), the adjacent track servo spot Sats is a following spot, and a tracking servo is performed on a mark string formed by the recording spot Srec using the adjacent track servo spot Sats. That is to say, a tracking servo control of an objective lens 20 is performed such that the adjacent track servo spot Sats follows a track previous to one track of tracks formed by the recording spot Srec.

According to the ATS, since a track pitch is a distance between spots S and is constant, it is possible to prevent the problem that the tracks overlap each other (information recording positions overlap each other) due to the influence of the eccentricity.

The description will be continued with reference to FIG. 2.

In the optical pickup OP1, there are provided a recording laser 11r which is a light source of laser light for recording signals by marks, and a servo laser 24 which is a light source of servo laser light for performing a position control using the position guiders formed on the reference face Ref. In addition, there is provided an ATS and reproduction laser 11ap which is a light source for applying ATS light during recording and laser light used to read a recording signal during reproduction.

In addition, as can be seen from the above description, the ATS light is also used as light for reproducing signals recorded by marks in the embodiment.

Here, as described above, the recording laser light and the servo laser light use light beams having different wavelength bands. In this example, the wavelength of the recording laser light is about 405 nm (so-called blue-violet laser light), and the wavelength of the servo laser light is about 650 nm (red laser light).

In addition, it is necessary for laser light which functions as ATS light or reproduction light for reading signals and uses the ATS and reproduction laser 11ap as a light source (hereinafter, simply referred to as ATS light) to pass through the selective reflection layer 3 and then reach the bulk layer 5, and further to have the same recording and reproduction wavelengths, and thus a wavelength thereof is made to have the same wavelength as the recording laser light.

In addition, in the optical pickup OP1, there is provided the objective lens 20 which is an output stage of recording laser light, servo laser light, and ATS light to the bulk type recording medium 1.

In addition, there are provided a first light detecting unit 23 for detecting reflection light of the ATS light from the bulk type recording medium 1, and a second light detecting unit 29 for detecting reflection light of the servo laser light from the bulk type recording medium 1.

Further, in the optical pickup OP1, there is provided an optical system which guides recording laser light emitted from the recording laser 11r and ATS light emitted from the ATS and reproduction laser 11ap to the objective lens 20 and guides reflection light of the ATS light incident to the objective lens 20 from the bulk type recording medium 1 to the first light detecting unit 23.

Specifically, the recording laser light emitted from the recording laser 11r and the ATS light emitted from the ATS and reproduction laser 11ap become parallel light via a collimation lens 12, and then are incident to a polarization beam splitter 13. In this way, the polarization beam splitter 13 is configured to transmit the recording laser light and the ATS light incident from the light source side therethrough.

Figure 28:
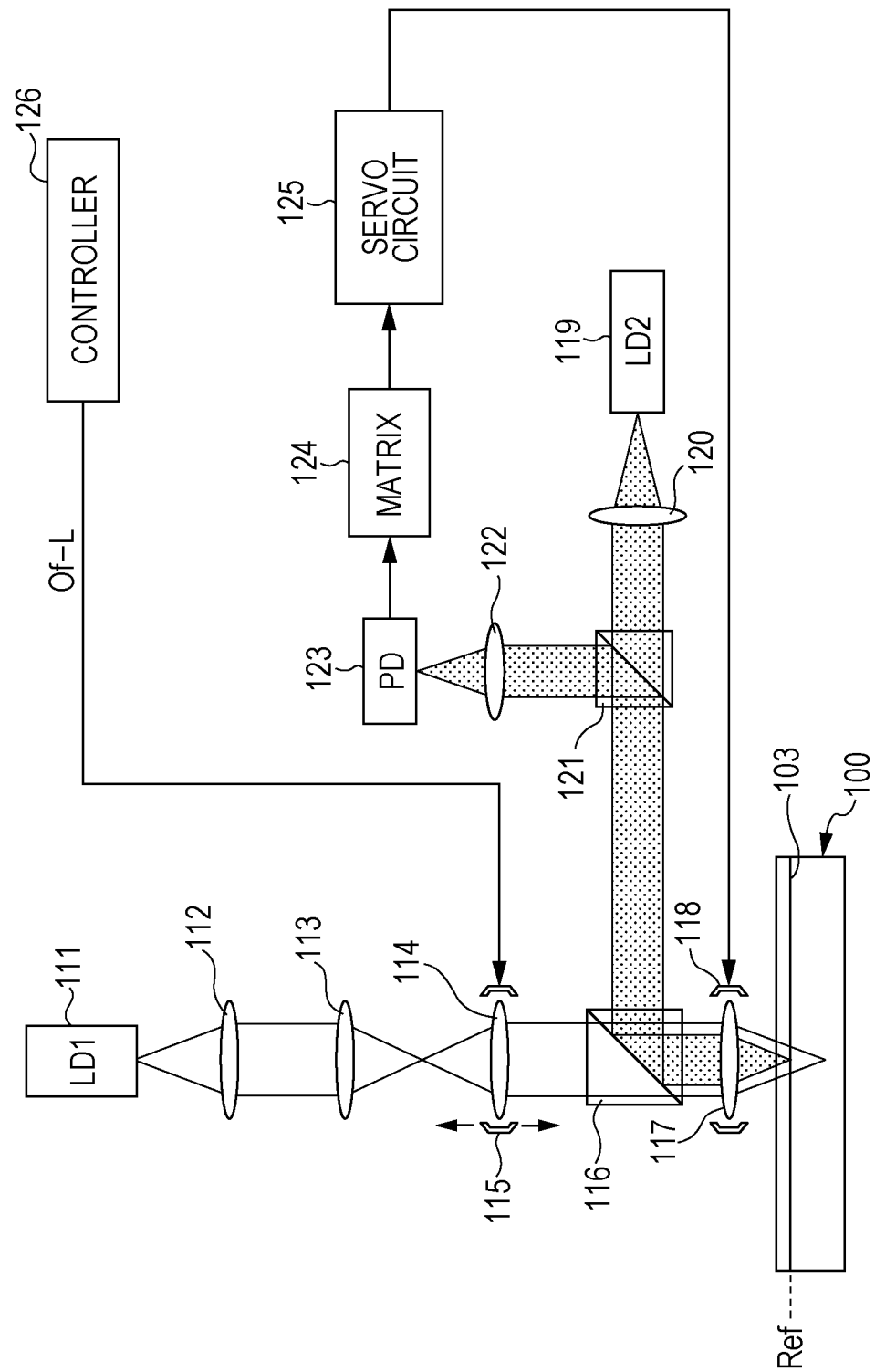
FIG. 28 is a diagram illustrating an internal configuration of a disc drive in the related art which performs recording and reproduction for the bulk type recording medium.
Figure 30A:
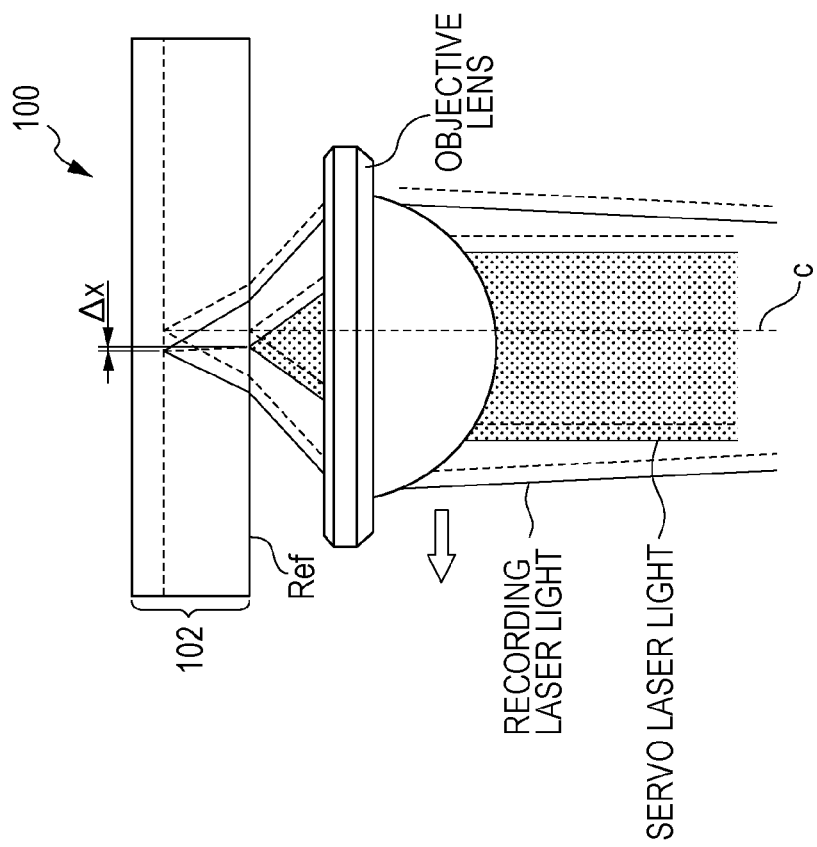
FIGS. 30A and 30B are diagrams schematically illustrating spot position misalignment of the recording laser light and the servo laser light due to lens shift.
Figure 30B:
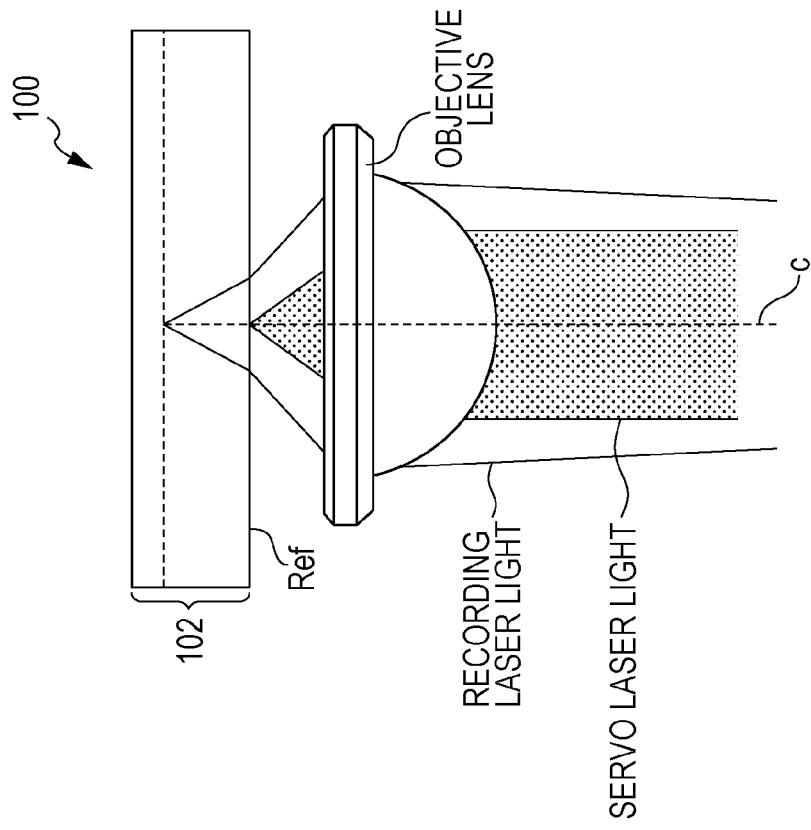

The recording laser light and the ATS light passing through the polarization beam splitter 13 are incident to an expander including a fixed lens 14, a movable lens 15, and a lens driving unit 16. In the expander, the fixed lens 14 is disposed at a position close to the light source, the movable lens 15 is disposed at a position distant from the light source, and the movable lens 15 is driven in a direction parallel to the optical axis of incident light by the lens driving unit 16, thereby performing independent focus control for the recording laser light and the ATS light. The expander corresponds to the above-described recording light focus mechanism (FIG. 28).

As described later, the lens driving unit 16 in the expander is driven by a controller 41 shown in FIG. 3, according to a value of the offset of-L set so as to correspond to the information recording layer position L which is a recording target.

Each laser light beam passing through the fixed lens 14 and the movable lens 15 forming the expander is reflected by a mirror 17 as shown in the figure, and then is incident to a dichroic prism 19 via a ¼ wavelength plate 18.

The dichroic prism 19 has a selective reflection surface which reflects light having the same wavelength as the recording laser light and the ATS light and transmits light having wavelengths other than that therethrough. Therefore, each laser light beam incident as described above is reflected by the dichroic prism 19.

Each laser light beam reflected by the dichroic prism 19 is applied to the bulk type recording medium 1 via the objective lens 20 as shown in the figure.

Figure 31:
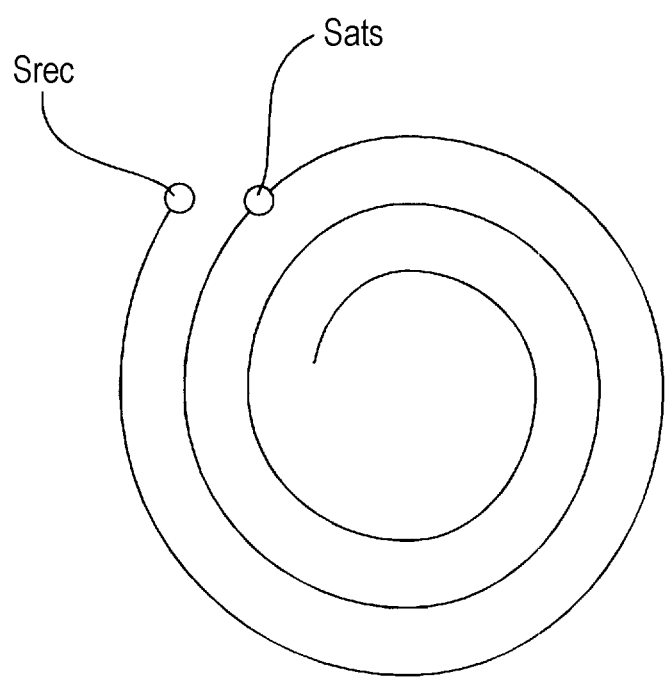
FIG. 31 is a diagram illustrating an ATS.

Here, the recording laser light and the ATS light are applied via the objective lens 20 in this way, and thus the recording spot Srec and the adjacent track servo spot Sats as shown in FIG. 31 are formed at a targeted information recording layer position L inside the bulk layer 5.

The optical system in this case is designed such that a positional relationship between the recording spot Srec and the adjacent track servo spot Sats is fixed to a preset positional relationship.

In this example, a spacing distance between the recording spot Srec and the adjacent track servo spot Sats in the radius direction is set to correspond with a value set as a track pitch of the bulk layer 5.

The objective lens 20 is provided with a biaxial actuator 21 which holds the objective lens 20 so as to be displaced in the focus direction (direction coming into contact with and separating from the bulk type recording medium 1) and the tracking direction (direction perpendicular to the focus direction: direction parallel to the radius direction of the bulk type recording medium 1).

The biaxial actuator 21 has a focus coil and a tracking coil, which are respectively supplied with driving signals (driving signals FD and TD described later) and displace the objective lens 20 in the focus direction and tracking direction, respectively.

Here, during recording or reproduction, it is possible to obtain reflection light of the ATS light from the mark string inside the bulk layer 5 in response to the application of the ATS light to the bulk type recording medium 1 as described above.

The reflection light of the ATS light obtained in this way is guided to the dichroic prism 19 via the objective lens 20 and then is reflected by the dichroic prism 19.

The reflection light of the ATS light reflected by the dichroic prism 19 is incident to the polarization beam splitter 13 sequentially via the ¼ wavelength plate 18, the mirror 17, and the expander (the movable lens 15 and the fixed lens 14).

Here, the polarization direction of the reflection light (returning path light) of the ATS light incident to the polarization beam splitter 13 in this way is different by 90 degrees from that of the ATS light (outgoing path light) incident to the polarization beam splitter 13 from the ATS and reproduction laser 11ap side, due to an operation of the ¼ wavelength plate 18 and the operation at the time of reflection at the bulk type recording medium 1. As a result, the reflection light of the ATS light incident in this way is reflected by the polarization beam splitter 13.

As such, the reflection light of the ATS light reflected by the polarization beam splitter 13 is collected on a light detecting surface of the first light detecting unit 23 via a condensing lens 22.

Here, although description is omitted through illustration, the first light detecting unit 23 includes a plurality of light detecting elements (in this case, four). Hereinafter, light detecting signals obtained by the plurality of light detecting elements of the first light detecting unit 23 are collectively referred to as a light detecting signal DT-ap.

Further, in the optical pickup OP1, in addition to the configuration of the optical system for the recording laser light and the ATS light described above, there is formation of an optical system which guides servo laser light emitted from the servo laser 24 to the objective lens 20 and guides reflection light of the servo laser light from the bulk type recording medium 1, which has been incident to the objective lens 20, to the second light detecting unit 29.

As shown in the figure, the servo laser light emitted from the servo laser 24 becomes parallel light via a collimation lens 25 and then is incident to a polarization beam splitter 26. The polarization beam splitter 26 is configured to transmit the servo laser light (outgoing path light) incident from the servo laser 24 therethrough as such.

The servo laser light passing through the polarization beam splitter 26 is incident to the dichroic prism 19 via a ¼ wavelength plate 27.

As described above, the dichroic prism 19 is configured to reflect light having the same wavelength band as the recording laser light and the ATS light and transmit light having wavelengths other than that therethrough, and thus the servo laser light is transmitted through the dichroic prism 19 and is applied to the bulk type recording medium 1 via the objective lens 20.

Further, reflection light (reflection light from the reference face Ref) of the servo laser light obtained in response to the application of the servo laser light to the bulk type recording medium 1 is transmitted through the dichroic prism 19 via the objective lens 20, and is incident to the polarization beam splitter 26 via the ¼ wavelength plate 27.

In a manner similar to the case of the ATS light, the polarization direction of the reflection light (returning path light) of the servo laser light incident from the bulk type recording medium 1 in this way is different from that of the outgoing path light by 90 degrees, due to an operation of the ¼ wavelength plate 27 and the operation at the time of reflection at the bulk type recording medium 1, and, as a result, the reflection light of the servo laser light as the returning path light is reflected by the polarization beam splitter 26.

The reflection light of the servo laser light reflected by the polarization beam splitter 26 is collected on a light detecting surface of the second light detecting unit 29 via the condensing lens 28.

The second light detecting unit 29 also includes a plurality of light detecting elements (for example, four), and, hereinafter, light detecting signals obtained by the plurality of light detecting elements of the second light detecting unit 29 are collectively referred to as a light detecting signal DT-sv.

Here, although description through illustration is omitted, in practice, the disc drive is provided with a slide driving unit which slidably drives the overall optical pickup OP1 described above in the tracking direction, and an irradiation position of laser light can be displaced in a wide range through the driving of the optical pickup OP1 by the slide driving unit.

Figure 3:
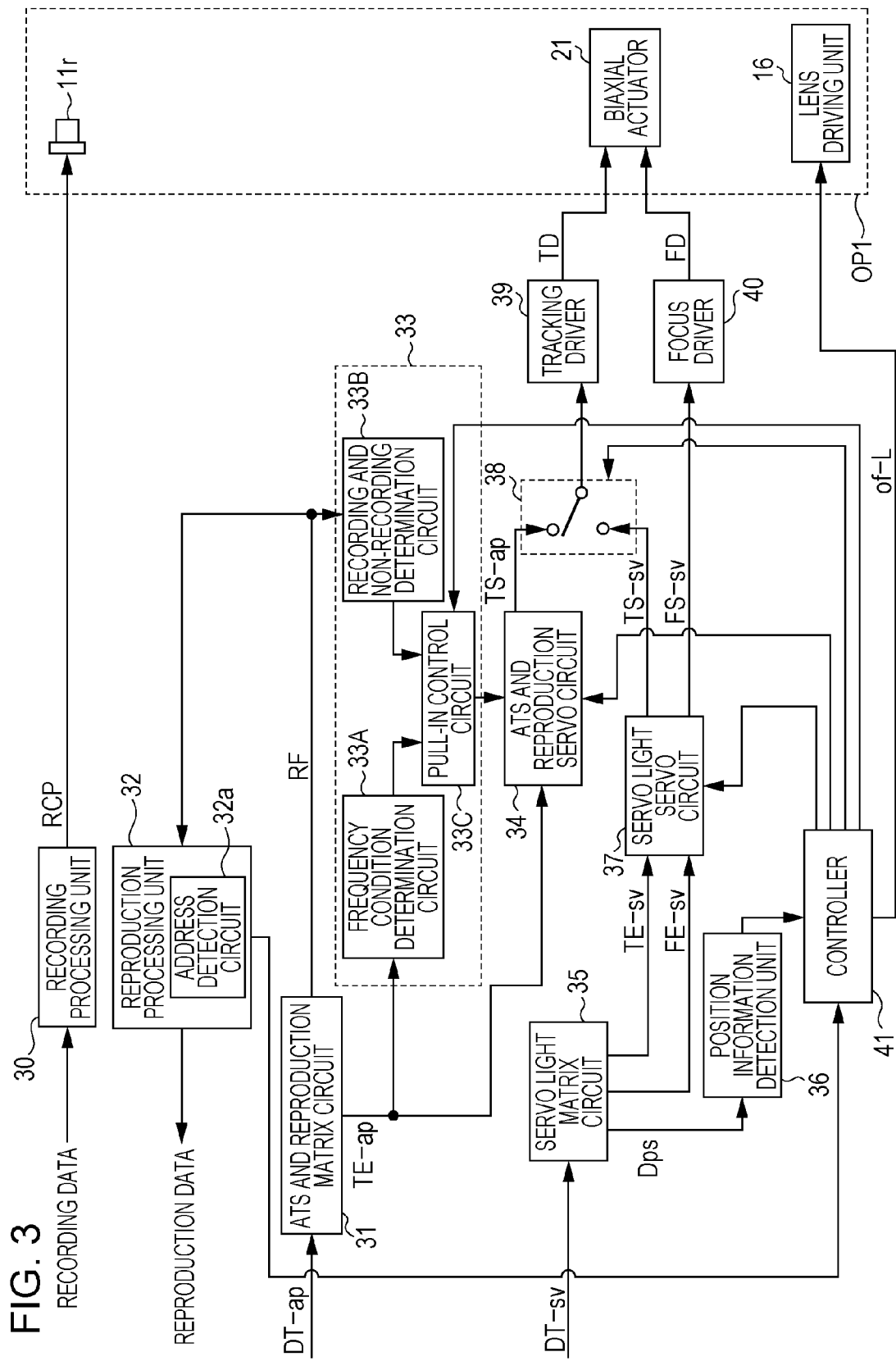
FIG. 3 is a diagram illustrating an internal configuration of the overall disc drive according to the first embodiment.

FIG. 3 shows an overall internal configuration of the disc drive according to the first embodiment.

In addition, FIG. 3 shows a portion of the internal configuration of the optical pickup OP1 through extraction. Specifically, the recording laser 11r, the lens driving unit 16, and the biaxial actuator 21 are shown among the constituent elements shown in FIG. 2.

In FIG. 3, as a signal processing system related to the recording laser light and the ATS light, the disc drive is provided with a recording processing unit 30, an ATS and reproduction matrix circuit 31, a reproduction processing unit 32, a pull-in control unit 33, and an ATS and reproduction servo circuit 34.

In addition, the pull-in control unit 33 will be described later again.

The recording processing unit 30 receives data to be recorded (recording data) on the bulk type recording medium 1. The recording processing unit 30 performs addition of error correction code to the input recording data, a predetermined recording modulation coding for the recording data, or addition of address information, and thereby obtains recording modulation data stream which is actually recorded on the bulk type recording medium 1, for example, a binary data stream of "0" and "1".

The recording processing unit 30 controls emission driving of the recording laser 11r in the optical pickup OP, in response to a recording pulse signal RCP generated based on the recording modulation data stream.

The light detecting signal DT-ap is input to the ATS and reproduction matrix circuit 31 from the first light detecting unit 23.

The ATS and reproduction matrix circuit 31 generates a variety of signals necessary for a matrix arithmetic process based on the light detecting signal DT-ap.

Here, in this example, when signals recorded by the mark strings in the bulk layer 5 are reproduced, the ATS light is used as reproduction laser light. In addition, during the ATS and the reproduction, a tracking servo control is performed targeting pre-recorded mark strings based on reflection light of the ATS light.

In order to correspond thereto, the ATS and reproduction matrix circuit 31 generates a radio frequency signal (a signal after DC-cut: hereinafter, referred to as a reproduction signal RF) corresponding to reproduction signal of the recording modulation data stream, and a tracking error signal TE-ap (a signal indicating a position error of the adjacent track servo spot Sats in the radius direction with respect to a pre-recorded mark string) for a tracking servo control, based on the light detecting signal DT-ap.

In this example, as the tracking error signal TE-ap, an error signal is generated by a DPD (Differential Phase Detection) method.

The reproduction signal RF generated by the ATS and reproduction matrix circuit 31 is supplied to the reproduction processing unit 32 and is also supplied to the pull-in control unit 33 described later.

In addition, the tracking error signal TE-ap is supplied to the ATS and reproduction servo circuit 34 and the pull-in control unit 33.

The reproduction processing unit 32 performs a reproduction process for recovering the above-described recording data such as a binarization process, decoding of the recording modulation code, and an error correction process, for the reproduction signal RF, thereby obtaining reproduction data where the recording data is reproduced.

In addition, the reproduction processing unit 32 includes an address detection circuit 32a which detects address information buried in data recorded by the mark strings based on the reproduction signal RF.

The address information detected by the address detection circuit 32a is supplied to the controller 41 described later.

The ATS and reproduction servo circuit 34 generates a tracking servo signal TS-ap based on the tracking error signal TE-ap. Here, the tracking servo signal TS-ap is a signal which allows a spot position of the ATS light to follow a mark string (to cancel a tracking error).

Further, the ATS and reproduction servo circuit 34 turns off a tracking servo and performs a track jumping operation for jumping an irradiation spot of the ATS light to another mark string in response to an instruction from the controller 41.

The tracking servo signal TS-ap generated by the ATS and reproduction servo circuit 34 is supplied to a selector 38.

In addition, as a signal processing system for reflection light of the servo laser light, the disc drive is provided with a servo light matrix circuit 35, a position information detection unit 36, and a servo light servo circuit 37.

In addition, the servo light matrix circuit 35 generates necessary signals based on the light detecting signal DT-sv from a plurality of light detecting elements of the second light detecting unit 29 shown in FIG. 2.

Specifically, the servo light matrix circuit 35 generates a tracking error signal TE-sv indicating a position error of an irradiation spot position of the servo laser light in the radius direction with respect to the guide grooves (tracks) formed on the reference face Ref, based on the light detecting signal DT-sv.

In addition, the servo light matrix circuit 35 generates a focus error signal FE-sv indicating a focus error of the servo laser light with respect to the reference face Ref (the selective reflection layer 3) as a signal for performing a focus servo control for the reference face Ref.

The servo light matrix circuit 35 generates a position information detection signal Dps as a signal for detecting position information recorded on the reference face Ref. For example, if the guide grooves are formed by the pit string, a sum signal is generated as the position information detection signal Dps, and if the guide grooves are formed by the wobbling grooves, a push-pull signal is generated as the position information detection signal Dps.

The position information detection signal Dps generated by the servo light matrix circuit 35 is supplied to the position information detection unit 36. The position information detection unit 36 detects position information (address information) recorded on the reference face Ref based on the position information detection signal Dps. The detected address information is supplied to the controller 41.

The focus error signal FE-sv and the tracking error signal TE-sv generated by the servo light matrix circuit 35 are supplied to the servo light servo circuit 37.

The servo light servo circuit 37 generates a focus servo signal FS-sv (a signal for enabling a focal position of the servo laser light to follow the reference face Ref) based on the focus error signal FE-sv, in response to an instruction from the controller 41, and generates the tracking servo signal TS-sv (a signal for enabling a spot position of the servo laser light to track the position guider on the reference face Ref) based on the tracking error signal TE-sv.

Here, a tracking servo control by the servo light servo circuit 37 is performed so as to correspond to the time when access is mainly performed based on position information recorded on the reference face Ref.

In addition, in this example, a focus servo control by the servo light servo circuit 37 is performed so as to correspond to the time of the ATS (including the time of pull-in of the ATS described later) or the time of reproduction along with the time when access is performed based on position information recorded on the reference face Ref.

Further, in response to an instruction from the controller 41, the servo light servo circuit 37 turns off the tracking servo loop and performs a track jumping operation for jumping an irradiation spot of the servo laser light to another track.

The tracking servo signal TS-sv generated by the servo light servo circuit 37 is supplied to the above-described selector 38.

In addition, the focus servo signal FS-sv is supplied to a focus driver 40.

Here, the selector 38 selects and outputs one of the tracking servo signal TS-ap and the tracking servo signal TS-sv in response to an instruction from the controller 41.

The tracking servo signal TS selected by the selector 38 is supplied to a tracking driver 39, and the tracking driver 39 drives a tracking coil of the biaxial actuator 21 depending on a tracking driving signal TD which is generated based on the supplied tracking servo signal TS.

Thereby, the objective lens 20 is driven such that an irradiation spot of the servo laser light follows the tracks on the reference face Ref, or an irradiation spot of the ATS light follows the mark strings.

The focus driver 40 drives a focus coil of the biaxial actuator 21 depending on a focus driving signal FD generated based on the focus servo signal FS supplied from the servo light servo circuit 37. Thereby, the objective lens 20 is driven such that a focus position of the servo laser light follows the reference face Ref (focus positions of recording and reproduction laser light and the ATS light follow a layer position Ln which is a target of recording or reproduction by the above-described driving of the expander).

The controller 41 is constituted by, for example, a microcomputer having a CPU (Central Processing Unit), and a memory (storage device) such as a ROM (Read Only Memory), a RAM (Random Access Memory), and the like, and performs controls and processes according to programs stored in the ROM or the like, thereby controlling the overall recording apparatus.

For example, the controller 41 controls (sets) focus positions of the recording laser light and the ATS light during recording or reproduction (including the time of access), based on a value of the offset of-L which is set in advance so as to correspond to each layer position L as described above. Specifically, a recording or reproduction position in the depth direction is selected by driving the lens driving unit 16 in the optical pickup OP1 based on a value of the offset of-L set so as to correspond to an information recording layer position Ln which is a target of recording or reproduction.

In addition, the controller 41 performs an instruction for the pull-in control unit 33 described later, or the servo light servo circuit 37 and the selector 38, and thereby performs a control such that a focus servo and a tracking servo are executed by methods according to the respective cases such as recording or reproduction of the bulk type recording medium 1 or access using the reference face Ref.

Here, in performing recording or reproduction targeting inside of the bulk layer 5, access around a recording start position or a reproduction start position is first performed using the reference face Ref. In addition, tracking servo (the ATS during recording) pull-in is performed using the adjacent track servo spot Sats.

Based on this premise, first, in relation to the focus servo control, the focus servo control is performed by the servo light servo circuit 37 at the time of access around a recording start position using the reference face Ref, at the time of ATS pull-in after the access, at the time of access around a reproduction start position using the reference face Ref, and at the time of tracking servo pull-in after the access.

On the other hand, in relation to the tracking servo control, the tracking servo control is performed by the servo light servo circuit 37 at the time of access around a recording start position and at the time of access around a reproduction start position. Specifically, a tracking servo signal TS-sv is generated by the servo light servo circuit 37, and the selector 38 selects the tracking servo signal TS-sv.

After the access, a pull-in control start instruction is given to the pull-in control unit 33 (a pull-in control circuit 33C described later) and the selector 38 selects the tracking servo signal TS-ap such that switching to the tracking servo control by the ATS and reproduction servo circuit 34 is performed.

In addition, the controller 41 performs an access control (a control for movement to a recording or reproduction position) based on address information (address information recorded by the mark strings) from the address detection circuit 32a of the reproduction processing unit 32 or address information (address information recorded on the reference face Ref) from the position information detection unit 36.

1-3. Pull-in Method According to First Embodiment

As can be seen from the above description, in the disc drive in this example, it is presupposed that, when rewriting or reproduction is performed for the bulk type recording medium 1, rough access is first performed based on position information on the reference face Ref, and then tracking servo pull-in is performed targeting mark strings (recording tracks) recorded at a predetermined information recording layer position L inside the bulk layer 5.

Here, as described above, in the related art, in consideration of variation in a frequency of the traverse signal (a tracking error signal obtained in a traverse state before the pull-in) due to the influence of the disc eccentricity during the tracking servo pull-in, the tracking servo pull-in is performed at a timing when the traverse signal frequency is low. Alternatively, a method has been proposed in which a relative speed of a track to a spot is reduced, and then the tracking servo pull-in is performed.

Such a tracking servo pull-in method in the related art which considers only the traverse signal frequency is a method for a typical disc where position guiders are formed in the recording layer in advance such as a CD (Compact Disc), a DVD (Digital Versatile Disc), or a BD (Blu-ray Disc: registered trademark), and if it is applied to a disc where position guiders are not formed in advance at a layer position where marks are to be recorded such as the bulk type recording medium 1 in this example, there is concern that the tracking servo pull-in may not be appropriately performed. That is to say, as described with reference to FIGS. 34A to 36B, in a disc where position guiders are not formed and a mixture of a recording part and a non-recording part is allowed, there are cases where the tracking servo pull-in may be performed for the non-recording part.

Therefore, in the embodiment, the following methods are proposed such that, even if the recording part and the non-recording part are allowed to be mixed at a layer position in a disc where position guiders are not formed in advance at the layer position in which marks are to be recorded such as the bulk type recording medium 1, the tracking servo pull-in can be appropriately performed.

FIG. 4 is a diagram illustrating a tracking servo pull-in method according to the first embodiment.

In FIG. 4, the tracking signal TE-ap indicates a tracking error signal TE-ap (traverse signal) in a traverse state.

Here, in a case where the recording part and the non-recording part are mixed, an irradiation spot of the laser light periodically straddles the recording part and the non-recording part according to rotation of the disc due to the influence of the disc eccentricity.

As described with reference to FIGS. 34A to 36B, in a typical disc where position guiders are formed in advance at a layer position in which marks are to be recorded, even if the irradiation spot straddles the non-recording part, the amplitude of the traverse signal can be obtained. However, in a disc where position guiders are not formed in advance at the layer position in which marks are to be recorded such as the bulk type recording medium 1 in this example, as shown in the figure, the amplitude of the traverse signal may not be obtained (becomes zero) while the irradiation spot straddles the non-recording part.

As such, since the amplitude of the traverse signal may not be obtained in a section where the non-recording part is straddled, if the pull-in control is merely performed according to the frequency condition in the related art, the tracking servo pull-in is performed for the non-recording part.

In addition, for confirmation, this problem does not occur in the related art targeting a typical disc where position guiders are formed in advance.

Thus, in the embodiment, starting of the tracking servo pull-in is performed in consideration of a determination result of recording or non-recording along with a traverse signal frequency in the related art.

In relation to the frequency condition, in the same manner as the related art, it is determined whether or not a frequency of the traverse signal (in this example, the tracking error signal TE-ap) is equal to or less than a predetermined threshold value.

In the first embodiment, in a traverse state before the pull-in (a state where the focus servo control is executed and the disc rotates), a determination of the traverse frequency and a determination of recording or non-recording are performed separately from each other. In addition, the tracking servo pull-in is started at a timing when a determination result that the traverse frequency is equal to or less than a predetermined threshold value and there is a recording part is obtained.

By such a pull-in method, it is possible to effectively prevent the tracking servo pull-in from being performed for the non-recording part by mistake even in a disc where position guiders are not formed in advance at a layer position in which marks are to be recorded and a recording part and a non-recording part are mixed.

In addition, FIG. 4 exemplifies a case where the traverse frequency is continuously equal to or less than a predetermined threshold value in the recording part after passing the non-recording part, and, in this case, as shown in the figure, the tracking servo pull-in is started at a timing when the irradiation spot is moved from the non-recording part to the recording part.

1-4. Configuration Related to Pull-in Control

Referring to FIG. 3, a configuration for realizing the pull-in method according to the first embodiment will be described.

In FIG. 3, the disc drive in this example is provided with the pull-in control unit 33 as a configuration for realizing the above-described pull-in method.

As shown in the figure, the pull-in control unit 33 includes a frequency condition determination circuit 33A, a recording and non-recording determination circuit 33B, and a pull-in control circuit 33C.

As described above, the tracking error signal TE-ap is input to the frequency condition determination circuit 33A from the ATS and reproduction matrix circuit 31.

The frequency condition determination circuit 33A measures a frequency of the tracking error signal TE-ap which is input in a traverse state and determines whether or not the measured frequency is equal to or less than a preset threshold value. Further, a signal indicating the determination result is supplied to the pull-in control circuit 33C.

The recording and non-recording determination circuit 33B performs a determination of recording or non-recording, that is, a determination of whether there is a recording part or a non-recording part, based on the reproduction signal RF input from the ATS and reproduction matrix circuit 31. Further, a signal indicating the determination result is supplied to the pull-in control circuit 33C.

The pull-in control circuit 33C instructs the ATS and reproduction servo circuit 34 to start the tracking servo pull-in based on the pull-in control start instruction from the controller 41, the determination result by the frequency condition determination circuit 33A, and the determination result by the recording and non-recording determination circuit 33B.

Specifically, after the pull-in control start instruction is given, in a case where the determination result by the frequency condition determination circuit 33A indicates that the traverse frequency is equal to or less than a predetermined threshold value, and the determination result by the recording and non-recording determination circuit 33B indicates that there is a recording part, the ATS and reproduction servo circuit 34 is instructed to start the tracking servo pull-in.

Thereby, in a traverse state before the pull-in, the tracking servo pull-in can be performed in response to establishment of the condition that the traverse frequency is equal to or less than a predetermined threshold value and there is a recording part.

2. Second Embodiment 2-1. Problem that Traverse Frequency is not Reduced

Figure 32:
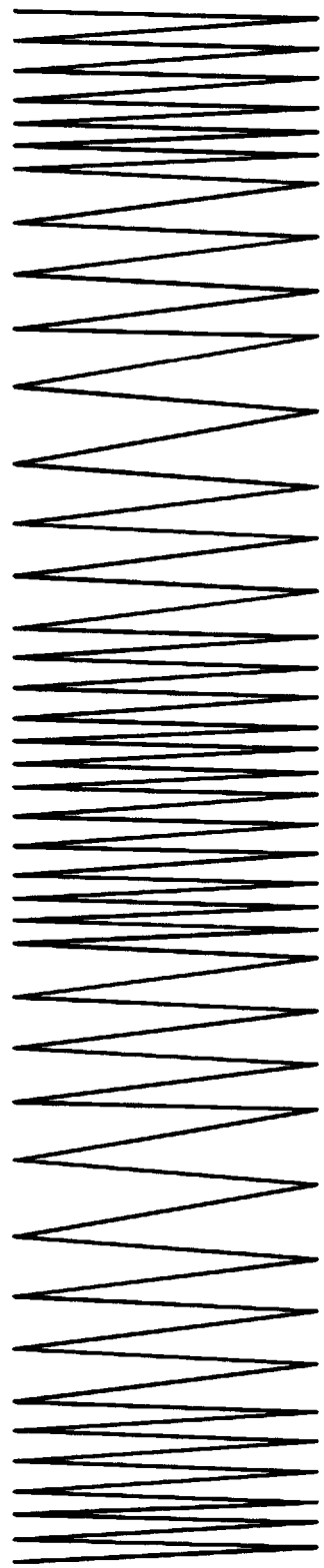
FIG. 32 is a diagram illustrating a traverse signal accompanied by disc eccentricity.
Figure 33:
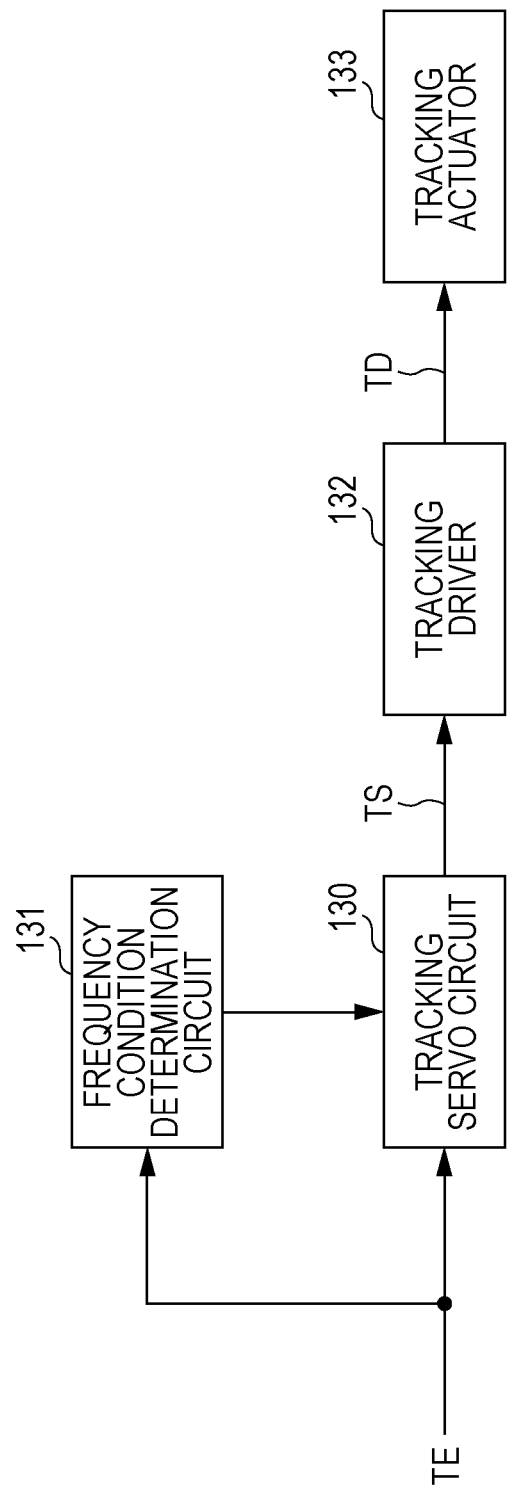
FIG. 33 is a diagram illustrating a configuration for tracking servo pull-in as the related example.
Figure 34A:
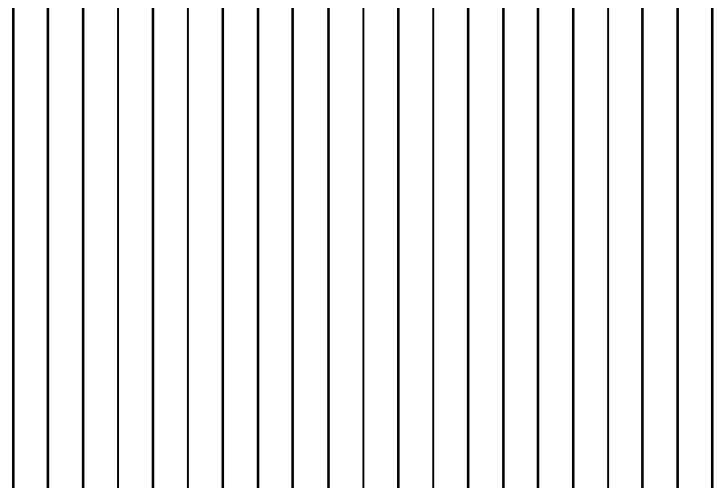
FIGS. 34A to 34C are diagrams illustrating a traverse signal in a case where a recording part and a non-recording part are mixed in a typical disc.
Figure 34B:
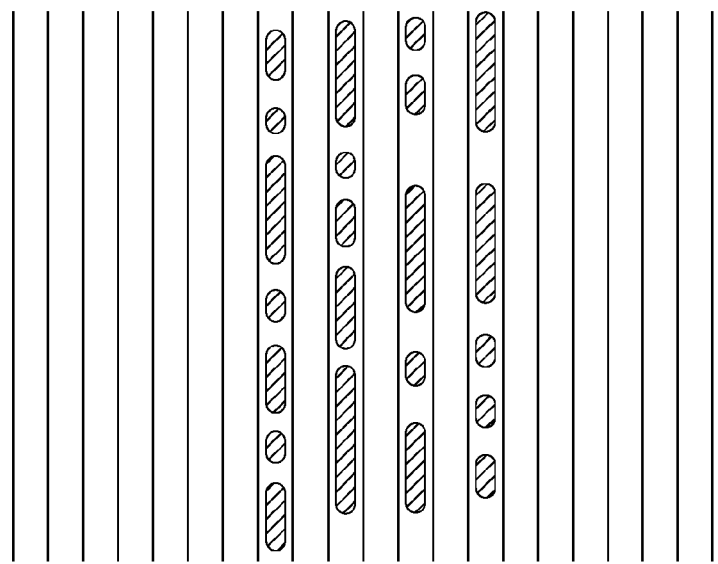
Figure 34C:
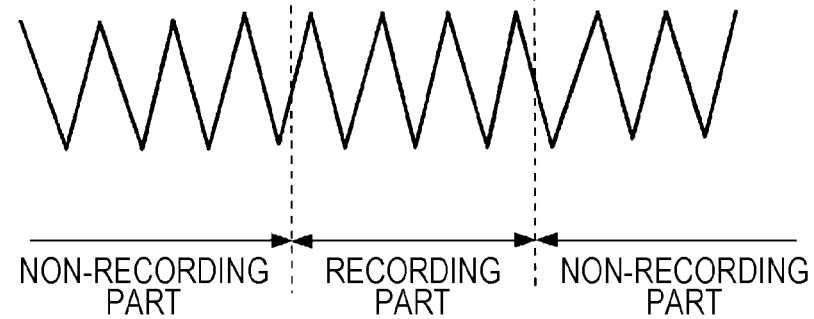
Figure 35A:
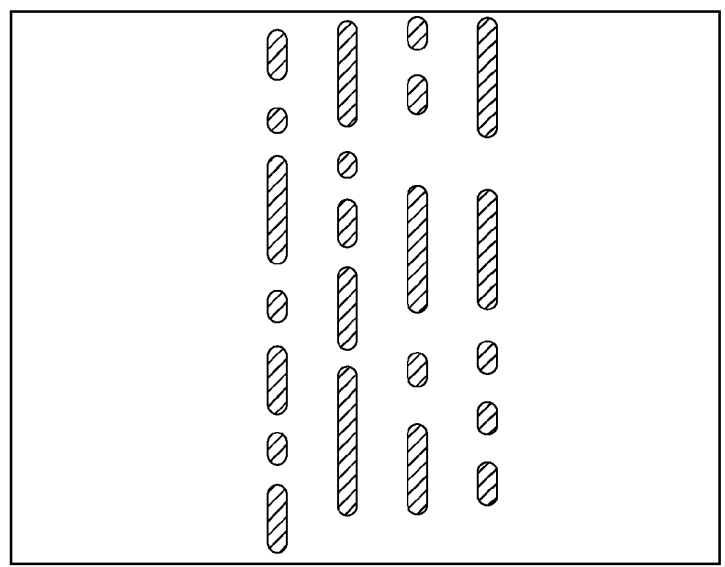
FIGS. 35A and 35B are diagrams illustrating a traverse signal in a case where a recording part and a non-recording part are mixed in a disc having no groove.
Figure 35B:
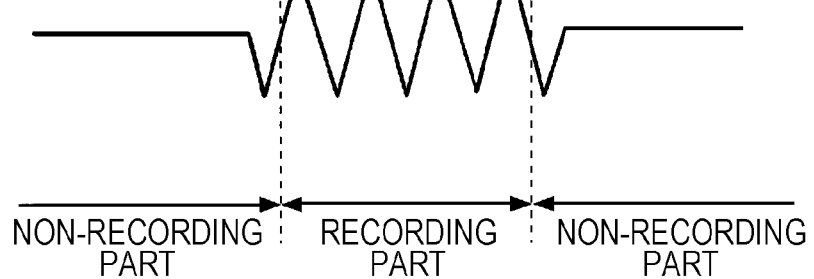
Figure 36A:
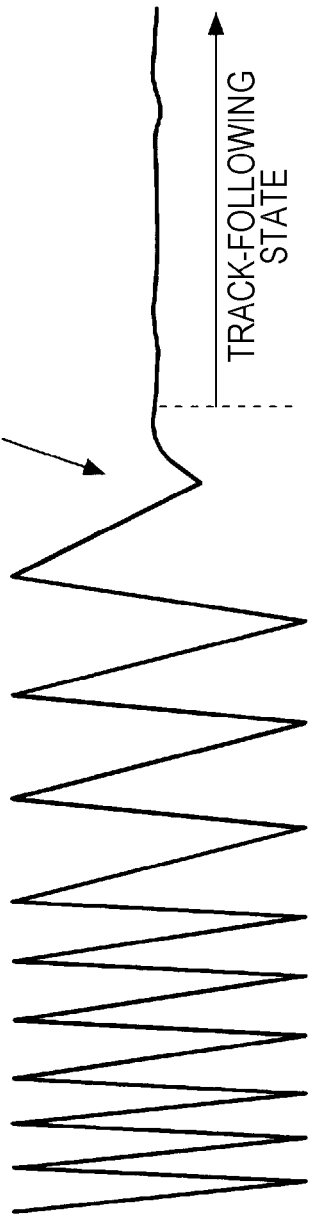
FIGS. 36A and 36B are diagrams illustrating a problem in a case where a pull-in method in the related art is employed in a disc where position guiders are not formed.
Figure 36B:
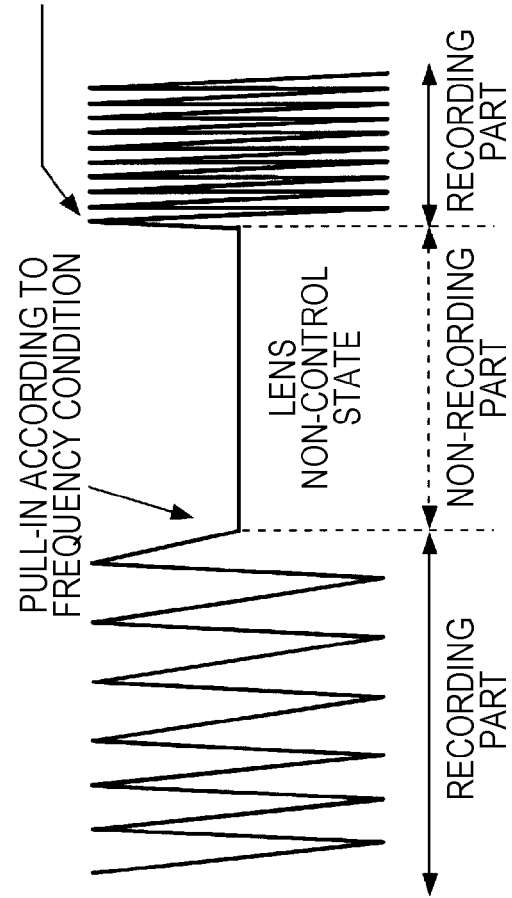

Here, as described with reference to FIG. 32, in a traverse state before the pull-in, a high region and a low region of the traverse frequency are periodically repeated due to the influence of the disc eccentricity.

As described above, since the traverse signal amplitude can be obtained even in the non-recording part in a typical disc, even if the recording part and the non-recording part are mixed, the traverse signal amplitude can be obtained in a traverse state at all times.

Figure 5A:
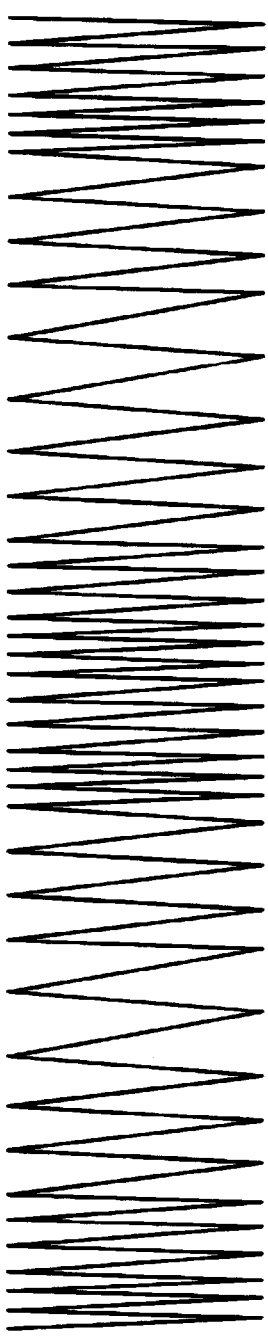
FIGS. 5A and 5B are diagrams illustrating a problem that a traverse frequency is not reduced.

FIG. 5A shows a traverse signal waveform in a case of a typical disc. At this time, the traverse frequency is lowest at a part where an eccentricity amount is the maximum and at a part where an eccentricity amount is the minimum.

In contrast, in a disc where position guiders are not formed, there may be occurrence of a situation where a spot alternately straddles the recording part and the non-recording part in a traverse state before the pull-in.

Figure 5B:
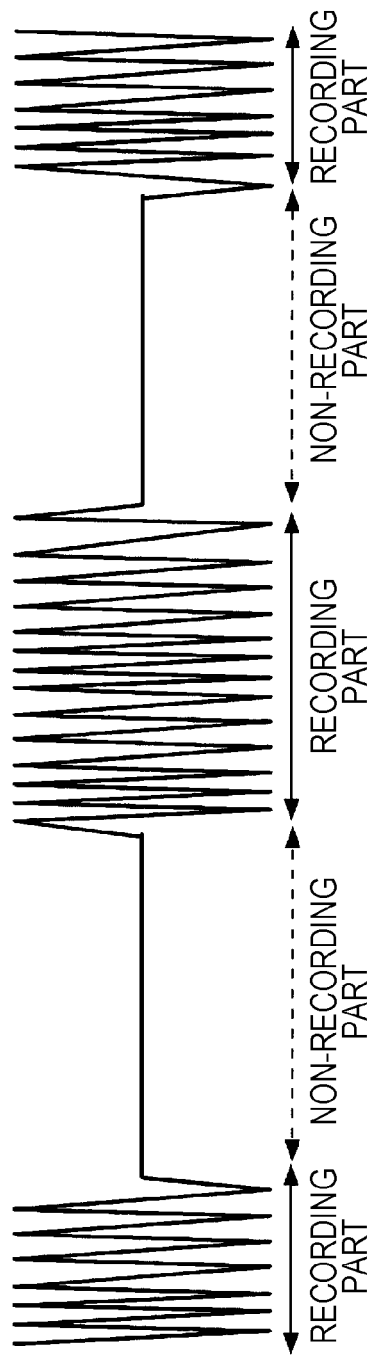

At this time, depending on a relationship between an occurrence aspect of eccentricity (a difference between a track center and a rotation center of the disc) and a formation aspect of the recording part and non-recording part, as shown in FIG. 5B, there is a case where a region in which a frequency is to be lowered matches a non-recording part, and, in this case, there is concern that a frequency condition of the traverse signal may not be established.

2-2. Pull-in Method According to Second Embodiment

Therefore, in the traverse state before the pull-in, in the second embodiment, a method is employed in which it is determined whether or not a state where a frequency of the tracking error signal TE-ap obtained from the recording part is not reduced to a predetermined threshold value or less continues for a predetermined time or more, and, if the state where the frequency is not reduced to a predetermined threshold value or less continues for a predetermined time or more, a position of the objective lens 20 is shifted in a tracking direction.

FIG. 6 is a diagram illustrating an effect achieved by the pull-in method according to the second embodiment.

FIG. 6 shows an example where a recording part and a non-recording part are formed at a targeted information recording layer position Ln, and an example of a traverse range (R_1) due to eccentricity before lens shift, a traverse range (R_2) due to eccentricity after lens shift, a traverse signal waveform (TE-ap_1) before lens shift, and a traverse signal waveform (TE-ap_2) after lens shift.

In FIG. 6, if the traverse range R_1 before lens shift is in a range where a spot is applied only to a part other than the vicinity in which an eccentricity amount is the maximum and the minimum in the recording part depending on the relationship between an occurrence aspect of eccentricity and a formation aspect of the recording part and non-recording part, the traverse signal TE-ap_1 before lens shift has a high frequency at all times in a section where the spot is applied to the recording part as shown in the figure.

According to the method in the second embodiment, in this situation, it is possible to obtain a determination result that a state where a frequency of the tracking error signal TE-ap is not reduced to a predetermined threshold value or less continues for a predetermined time or more, and thus the objective lens 20 is shifted in the tracking direction.

Thereby, a traverse range due to the eccentricity can be varied from the original range R_1 to the range R_2 in the figure, and, as a result, a frequency in the section where there is the recording part can be lowered as indicated by the traverse signal TE-ap_2 in the figure.

Therefore, it is possible to appropriately perform the tracking servo pull-in at a part where the traverse signal frequency is low (a part where a relative speed between the spot and the track is lowered).

Here, in a case where the ATS is performed in the same manner as this example in relation to the above-described pull-in method according to the second embodiment, it is necessary to consider a direction where the lens shift is performed.

This is because there is concern that when the pull-in is performed for the vicinity of the end portion of the recording part in the recording progress direction in a case of performing recording using the ATS, a mark string may not be appropriately rewritten from the end portion. Specifically, when the pull-in is performed for a part which is not previous to one circumference from the end portion in the recording progress direction, a tracking servo as the ATS is deviated, and thus a mark string may not be appropriately rewritten from the end portion.

Thus, during recording where a tracking servo is performed using at least ATS, a direction where the objective lens 20 is shifted is set to the same direction as the recording progress direction.

Figure 7:
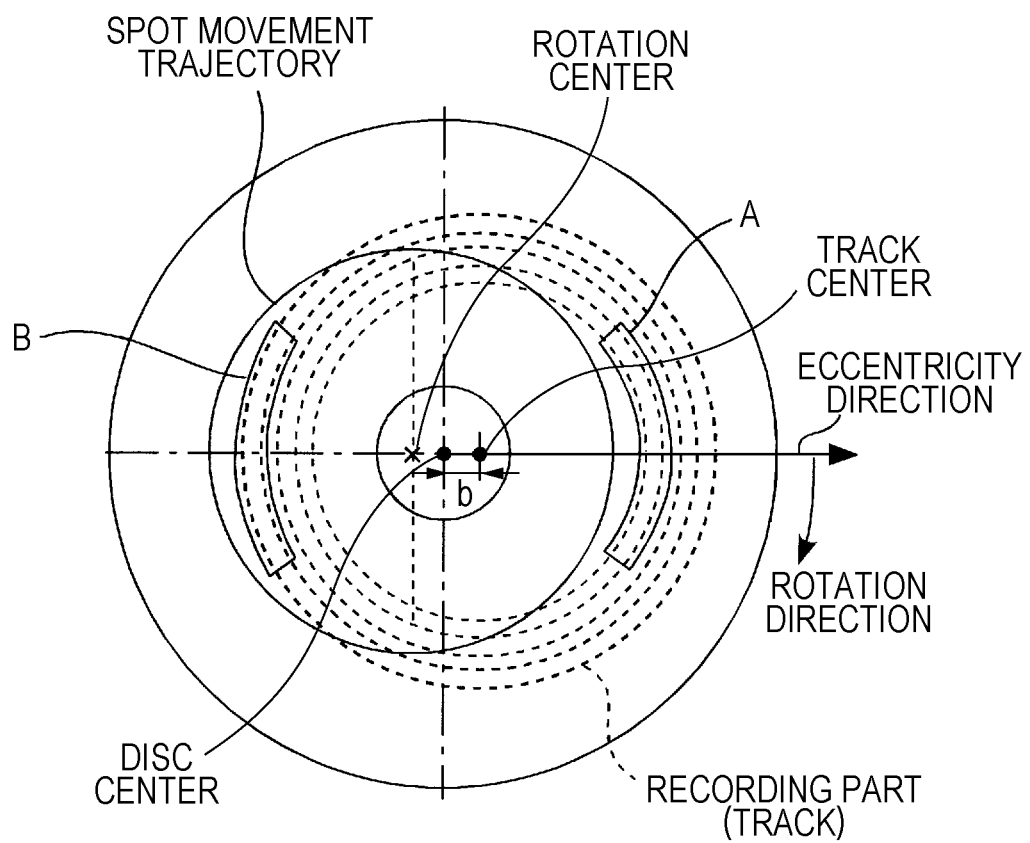
FIG. 7 is a schematic diagram illustrating a relationship between a recording part and a movement trajectory of a spot in a case where the recording part and the non-recording part are mixed and there is disc eccentricity.

Here, FIG. 7 schematically shows a relationship between the recording part and a movement trajectory of the spot in a case where a recording part and a non-recording part are mixed and there is disc eccentricity.

In addition, in FIG. 7, for convenience of illustration, tracks are formed in a concentric shape in the recording part, but, in practice, the tracks are formed in a spiral shape.

If there is eccentricity, misalignment between a disc center and a track center occurs (the eccentricity amount b in the figure). In addition, a rotation center of the disc does not necessarily match the disc center and the track center, and the disc center, the track center, and the rotation center may differ from each other as shown in the figure.

In this state, a relationship between a movement trajectory of the spot and the recording part is shown in the figure. This figure exemplifies a case where a part where the spot is applied to the recording part is only a region where the traverse frequency is high (a state where the traverse frequency is not sufficiently reduced in the recording part).

It can be seen from FIG. 7 that if the objective lens 20 is shifted in the same direction as the recording progress direction in response to a determination result that a state where a frequency of the tracking error signal TE-ap is not reduced to a predetermined threshold value or less continues for a predetermined time or more as described above, it is possible to prevent the tracking servo pull-in from being performed for the end portion in the recording part in the recording progress direction.

For example, in a case where the recording progresses from the inner circumference to the outer circumference, if the lens is shifted in an opposite direction (inner circumferential side) to the recording progress direction from the state shown in FIG. 7, a circle as the "movement trajectory of the spot" in the figure becomes small, and thus the spot becomes distant from the vicinity of the end portion of the inner circumferential side (the opposite direction to the recording progress direction) in the recording part and the region (region A) where the traverse frequency is sufficiently low, and, on the contrary, becomes close to the vicinity of the end portion of the outer circumferential side (the recording progress direction side) in the recording part and the region (region B) where the traverse frequency is sufficiently low.

That is to say, if the lens is shifted in an opposite direction to the recording progress direction, the tracking servo pull-in is necessarily performed for the end portion of the recording part in the recording progress direction.

In contrast, if the lens is shifted in the recording progress direction (outer circumferential side), a circle as the "movement trajectory of the spot" in the figure becomes large, and thus the spot becomes distant from the vicinity of the end portion of the recording part in the recording progress direction (outer circumferential side) and the region (region B) where the traverse frequency is sufficiently low, and, becomes close to the vicinity of the end portion of the recording part in an opposite direction to the recording progress direction (the inner circumferential side) and the region (region A) around which the traverse frequency is sufficiently low. As a result, in this case, the tracking servo pull-in can be necessarily performed for the end portion of the recording part in an opposite direction (inner circumferential side) to the recording progress direction. That is to say, it is possible to prevent the pull-in from being performed for the vicinity of the end portion in the recording progress direction in the recording part and to thereby appropriately perform rewriting from the end portion of the recording part in the recording progress direction using the ATS.

In addition, in this example, when the objective lens 20 is shifted, a shift amount thereof is set according to the number of shifts of the objective lens 20 (that is, the number of position shifts). Specifically, after the pull-in control start instruction is given, the number that the objective lens 20 is counted, and the objective lens 20 is shifted by a shift amount according to the counted value. In this example, the objective lens 20 is shifted based on a predetermined step value (LS_STEP), and a lens shift amount (LS) is calculated and set through calculation based on the step value LS_STEP and a counted value (CT_LS) of the number of lens shifts (the number of position shifts) which is counted as above.

Specifically, the lens shift amount LS is calculated by $$LS = (CT\_LS - 4) * 8 * LS\_STEP \quad \text{[Equation 1]}$$

2-3. Configuration Related to Pull-in Control

Figure 8:
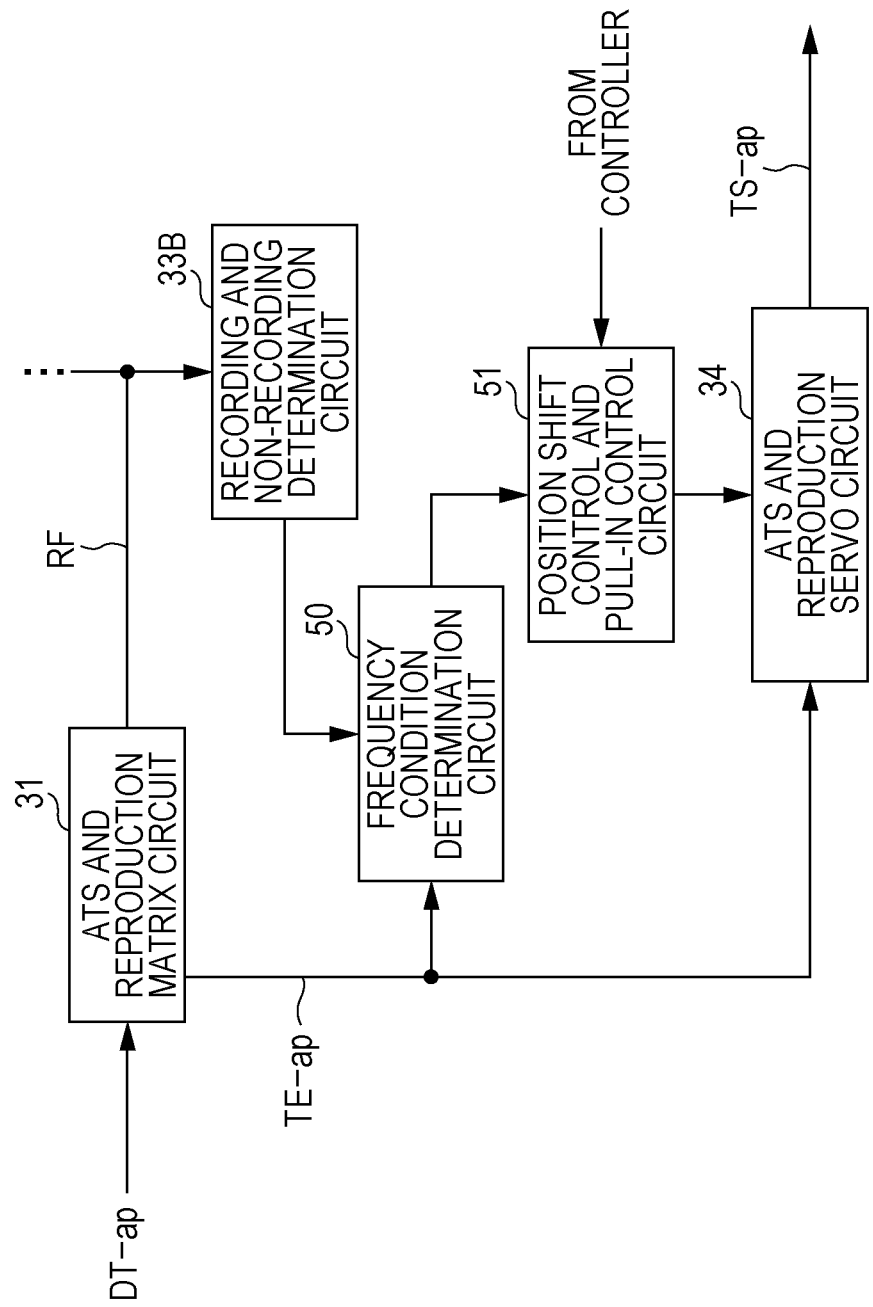
FIG. 8 is a diagram illustrating a configuration of a disc drive according to the second embodiment.

FIG. 8 is a diagram illustrating a configuration of the disc drive according to the second embodiment which realizes the above-described pull-in method according to the second embodiment.

In addition, in the second embodiment, the parts other than the configuration related to the pull-in control are the same as those in the first embodiment and thus are not shown in FIG. 8.

As shown in FIG. 8, in the second embodiment, a determination result by the recording and non-recording determination circuit 33B is supplied to a frequency condition determination circuit 50.

The frequency condition determination circuit 50 determines whether or not a frequency condition of the tracking error signal TE-ap from the ATS and reproduction matrix circuit 31 is established based on a result of recording or non-recording determination by the recording and non-recording determination circuit 33B, unlike the above-described frequency condition determination circuit 33A. Specifically, the frequency condition determination circuit 50 measures a frequency of the tracking error signal TE-ap in a state where the recording and non-recording determination circuit 33B determines that there is a recording part, and determines whether or not the frequency is equal to or less than a predetermined threshold value.

The determination result (determination result of the frequency condition of the traverse signal in the recording part) by the frequency condition determination circuit 50 is supplied to a position shift control and pull-in control circuit 51.

The position shift control and pull-in control circuit 51 instructs the ATS and reproduction servo circuit 34 to start the pull-in based on the determination result by the frequency condition determination circuit 50 in response to a pull-in control start instruction from the controller 41, and performs an instruction for shifting the objective lens 20 in the tracking direction as necessary.

Specifically, in relation to the position shift control, it is determined whether or not a state where a frequency of the tracking error signal TE-ap is not reduced to a predetermined threshold value or less continues for a predetermined time or more in the recording part, based on the determination result by the frequency condition determination circuit 50, and if a state where the frequency is not reduced to a predetermined threshold value or less continues for a predetermined time or more, an instruction for shifting the objective lens 20 in the tracking direction is given to the ATS and reproduction servo circuit 34.

Here, the "predetermined time" may be set to a time corresponding to at least one rotation of the disc.

As described above, a lens shift amount which is instructed at this time is set so as to correspond to the number of lens shifts. Specifically, the position shift control and pull-in control circuit 51 counts the number of times where the lens is shifted (the number of times where a lens shift instruction is given) after the pull-in control start instruction is given from the controller 41, and sets a lens shift amount according to a counted value. For example, in a case of this example, the lens shift amount is calculated according to the above Equation 1.

In addition, as described above, a direction where the lens is shifted is set to a recording progress direction.

The position shift control and pull-in control circuit 51 performs the following processes in relation to the pull-in control. That is to say, the position shift control and pull-in control circuit 51 instructs the ATS and reproduction servo circuit 34 to start the tracking servo pull-in if the determination result by the frequency condition determination circuit 50 indicates that a frequency of the tracking error signal TE-ap in the recording part is reduced to a predetermined threshold value or less.

2-4. Modified Example of Second Embodiment

Here, although, in the above description, the position shift control and the pull-in control according to the second embodiment are realized by the hardware configuration such as the recording and non-recording determination circuit 33B or the frequency condition determination circuit 50, and the position shift control and pull-in control circuit 51 as an example, for example, in a case where the ATS and reproduction servo circuit 34 is constituted by a programmable information processing device such as a DSP (Digital Signal Processor), all or a portion of the above-described position shift control or the pull-in control may be mounted as software.

Figure 9:
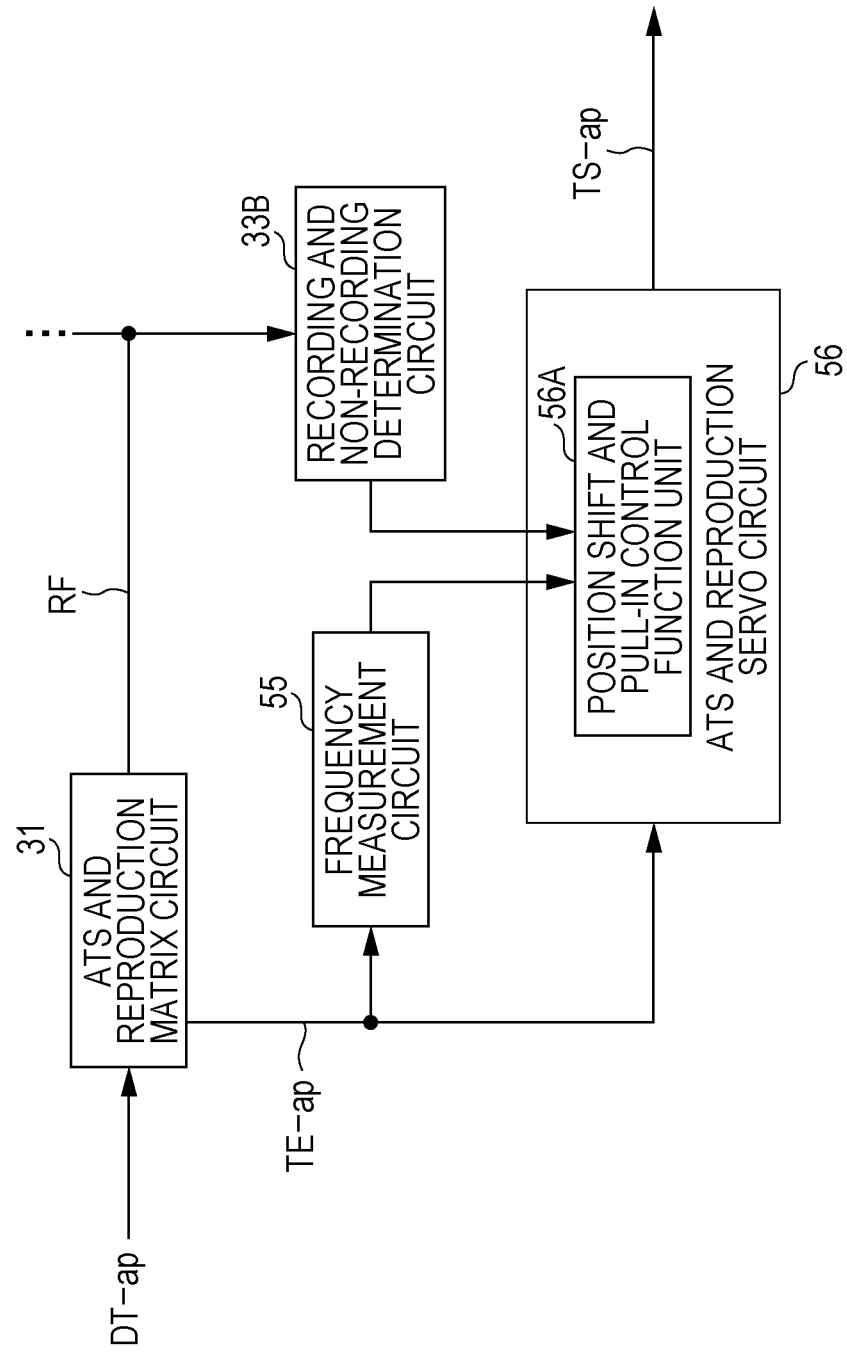
FIG. 9 is a diagram illustrating a configuration of a disc drive according to a modified example of the second embodiment.

FIG. 9 is a diagram illustrating a configuration of the disc drive as a modified example where all or a portion of the position shift control or the pull-in control according to the second embodiment is mounted as software.

Upon comparison with the case of FIG. 8, in this case, a frequency measurement circuit 55 is installed instead of the frequency condition determination circuit 50, and the position shift control and pull-in control circuit 51 is omitted.

In addition, in this case, an ATS and reproduction servo circuit 56 having a function as a position shift and pull-in control function unit 56A in this figure is installed.

Here, the frequency measurement circuit 55 measures a frequency of the tracking error signal TE-ap and supplies a result thereof to the ATS and reproduction servo circuit 56. In addition, in this case, a determination result by the recording and non-recording determination circuit 33B is supplied to the ATS and reproduction servo circuit 56.

Figure 10:
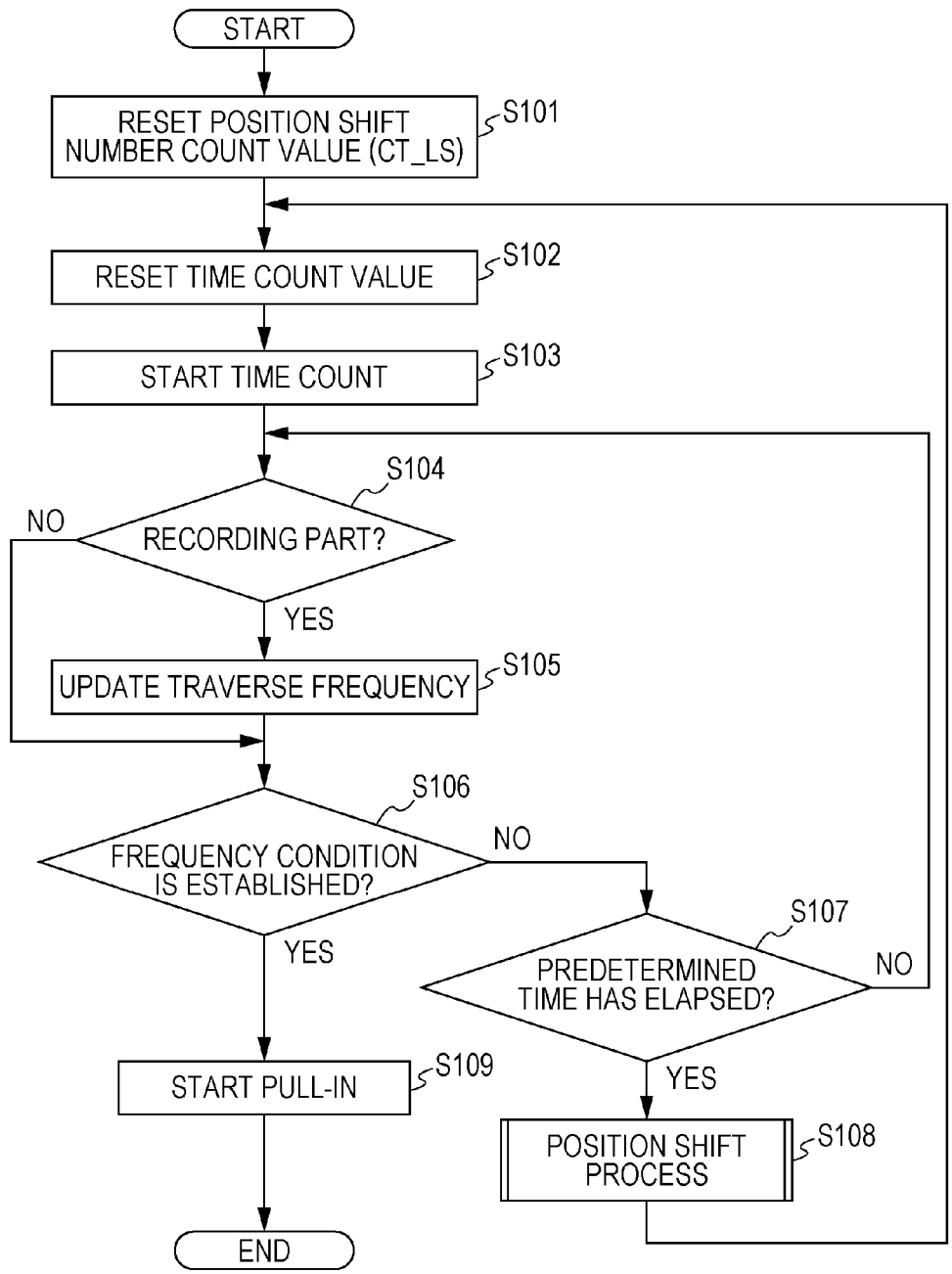
FIG. 10 is a flowchart illustrating a procedure of detailed processes which are performed in the disc drive according to the modified example of the second embodiment.

FIG. 10 is a flowchart illustrating a procedure of detailed processes which are performed as processes related to the position shift and pull-in control function unit 56A by the ATS and reproduction servo circuit 56 constituted by the DSP, in the disc drive according to the above-described modified example.

In FIG. 10, first, in step S101, a position shift number count value (CT_LS) is reset. With such as execution of the process in step S101, the number of position shifts is counted per pull-in control start instruction from the controller 41.

In subsequent step S102, a time count value is reset, and then time count is started in step S103. The time count is to measure an elapsed time as a reference when the position shift is performed.

After the time count is started in step S103, it is determined whether or not there is a recording part in step S104. That is to say, it is determined whether or not a determination result by the recording and non-recording determination circuit 33B indicates that there is a recording part.

If an affirmative result that there is a recording part is obtained in step S104, a traverse frequency is updated in step S105. That is to say, a frequency value of the tracking error signal TE-ap input from the frequency measurement circuit 55 is maintained as an effective frequency value at this time.

After the updating process is performed in step S105, the flow proceeds to step S106.

On the other hand, if a negative result that there is no recording part is obtained in step S104, a process in step S106 is performed.

In step S106, it is determined whether or not a frequency condition is established. That is to say, it is determined whether or not the frequency value maintained (updated) in the process in step S105 is equal to or less than a predetermined threshold value.

If a negative result is obtained that the frequency value is not equal to or less than a predetermined threshold value and a frequency condition is not established in step S106, the flow proceeds to step S107 where it is determined whether or not a predetermined time has elapsed.

If a negative result is obtained that a predetermined time has not elapsed, the flow returns to step S104 as shown in the figure. Thereby, there is a formation of a loop process for waiting until a state where a traverse signal frequency in the recording part is not reduced to a predetermined threshold value or less continues for a predetermined time or more.

On the other hand, if an affirmative result is obtained that a predetermined time has elapsed in step S107, the flow proceeds to step S108 where a position shift process is performed.

Figure 11:
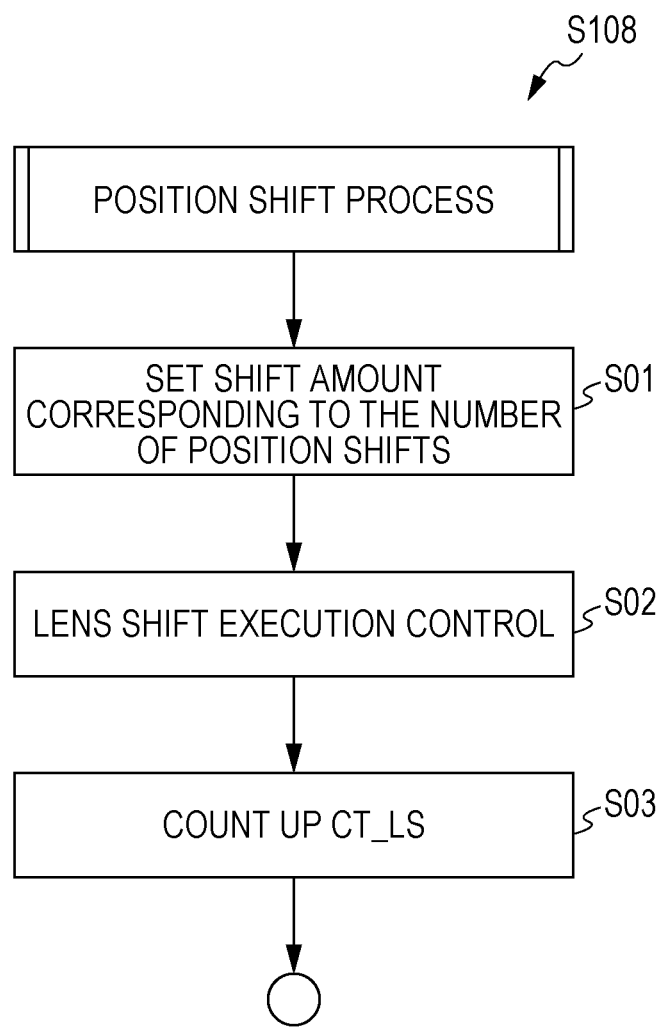
FIG. 11 is a flowchart illustrating a procedure of detailed processes which are performed as position shift processes.

FIG. 11 shows a procedure of detailed processes which are performed as the position shift process in step S108.

First, in step S01, a lens shift amount (LS) corresponding to the number of position shifts is set. Specifically, in this example, the lens shift amount LS is calculated and set according to the above Equation 1 based on a position shift number count value CT_LS (counted in step S03 described later) and a preset step value LS_STEP.

Next, in step S02, a lens shift execution control process is performed. That is to say, an instruction is given to the tracking driver 39 shown in FIG. 3 such that the objective lens 20 is shifted by the lens shift amount LS set in step S01.

At this time, the objective lens 20 is shifted in a recording progress direction.

Next, in step S03, the position shift number count value CT_LS is counted up. With this, the position shift process in step S108 is completed.

The description will be continued with reference to FIG. 10.

After the position shift process is performed in step S108, the flow returns to step S102 where a time count value is reset, and time count is started again in step S103. With this, in a case where the traverse signal frequency in the recording part is not reduced to a predetermined threshold value or less even if the position shift process is performed, the position shift process is performed again, and the position shift process is repeatedly performed until the traverse signal frequency in the recording part is reduced to a predetermined threshold value or less.

If the traverse signal frequency in the recording part is reduced to a predetermined threshold value or less, an affirmative result that the frequency condition is established is obtained in step S106, and, in this case, the flow proceeds to step S109 where the tracking servo pull-in is started.

If the pull-in start process is performed in step S109, a series of processes shown in this figure is completed.

3. Third Embodiment

3-1. Pull-in Method According to Third Embodiment

Figure 12:
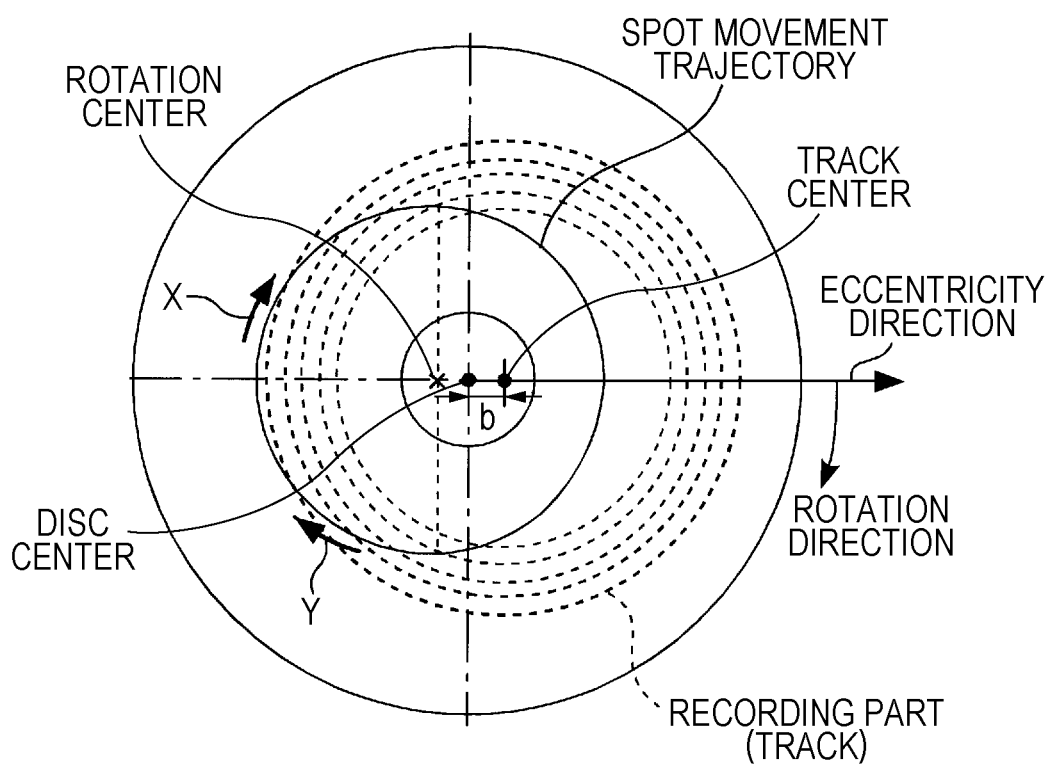
FIG. 12 is a diagram illustrating a problem which may occur in the second embodiment.

Although, in FIG. 7, a state where the spot is not applied to a region in which the traverse frequency is sufficiently low in the recording part has been shown as an example of the traverse state before the pull-in, a state may be expected in which, for example, as shown in FIG. 12, the spot is not applied to the region (the region A in FIG. 7) where a frequency is sufficiently low around the end portion of the recording part in an opposite direction to the recording progress direction but is applied to the region (the region B in FIG. 7) where a frequency is sufficiently low around the end portion of the recording part in the recording progress direction, as a traverse state before the pull-in.

In a state shown in FIG. 12, when the spot enters the end portion of the recording part in the recording progress direction as indicated by the arrow X in the figure, a condition that a frequency is equal to or less than a predetermined threshold value and there is a recording part is satisfied, and, as a result, there is concern that the tracking servo pull-in may be performed for the end portion of the recording part in the recording progress direction. That is to say, in this case, there is concern that rewriting may not be appropriately performed using the ATS from the end portion of the recording part.

Therefore, in the third embodiment, a method is employed in which a direction where the spot enters the recording part is determined in a traverse state before the pull-in, and if the spot enters the recording part in an opposite direction to the recording progress direction, the tracking servo pull-in is not performed even if other pull-in conditions are established.

Figure 13:
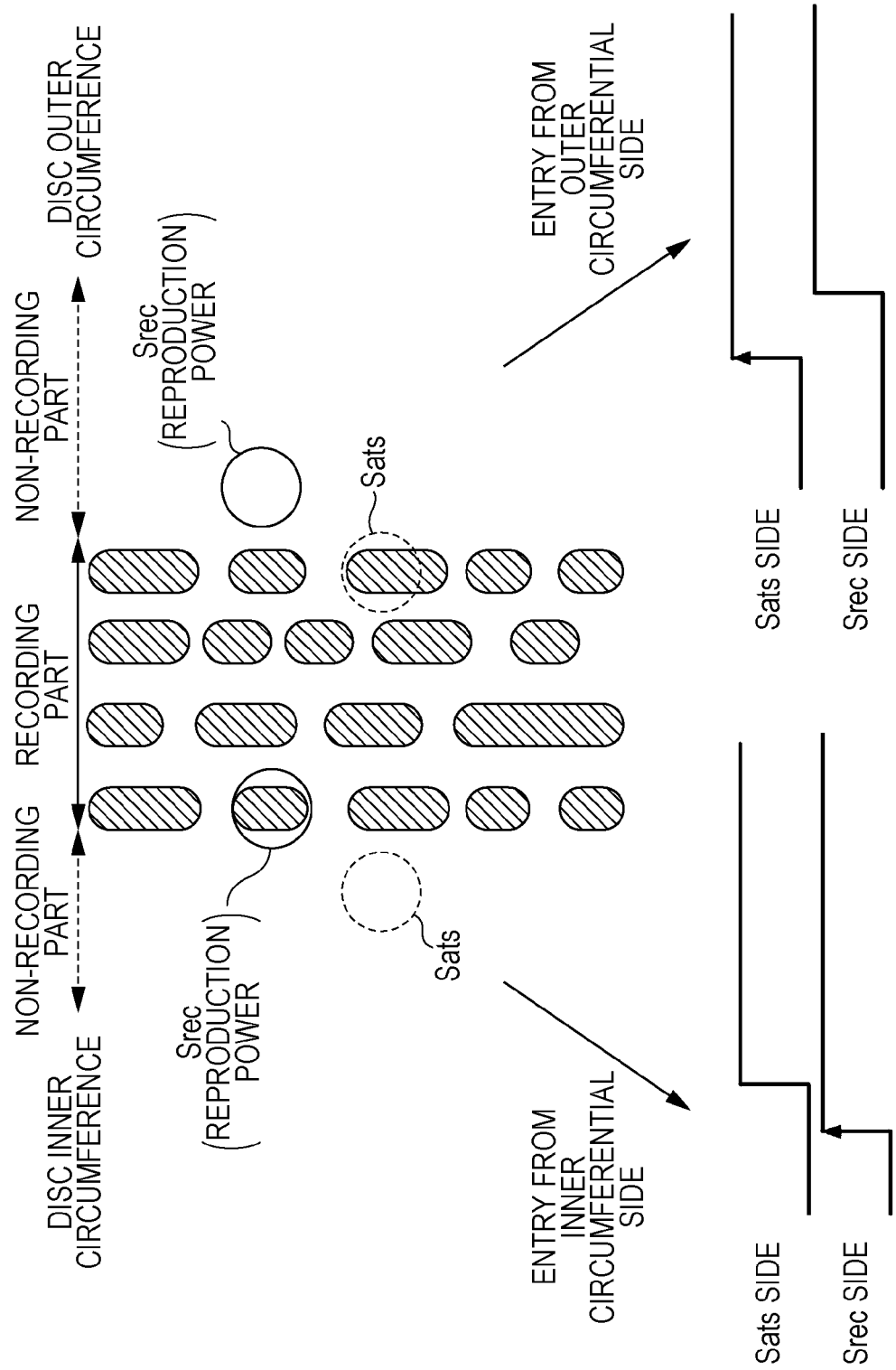
FIG. 13 is a diagram illustrating a detailed method for determining an entry direction.

FIG. 13 is a diagram illustrating a detailed method for determining an entry direction.

In a case of this example, from a relationship performing the ATS, a recording spot Srec having the recording laser 11r as a light source and an adjacent track servo spot Sats having the ATS and reproduction laser ap as a light source are formed as irradiation spots of laser light.

As described above, the adjacent track servo spot Sats is formed as a following spot (disposed in a side opposite to the recording progress direction) of the recording spot Srec. Thus, in this example, an entry direction is determined using a disposition relationship of the spots and reflection light of the adjacent track servo spot Sats and the recording spot Srec.

Specifically, the recording laser 11r emits light at reproduction power, the recording spot Srec is formed at the reproduction power, and an entry direction is determined using a light detecting signal for the recording spot Srec at the reproduction power and a light detecting signal for the adjacent track servo spot Sats.

Although, in FIG. 13, it is presupposed that the recording progress direction is from the inner circumference to the outer circumference, if the spot enters the recording part from the inner circumferential side (enters in the same direction as the recording progress direction), it is first detected that there is a recording part from the recording spot Srec side, and then it is detected that there is a recording part from the adjacent track servo spot Sats side.

Conversely, if the spot enters the recording part from the outer circumferential side (enters in an opposite direction to the recording progress direction), it is first detected that there is a recording part from the adjacent track servo spot Sats side, and then it is detected that there is a recording part from the recording spot Srec side.

By the use of it, in this example, an entry direction is determined by determining from which of the recording spot Srec and the adjacent track servo spot Sats it is first detected that there is a recording part.

In a case where a determination result that an entry direction is the same as the recording progress direction is obtained, if the frequency condition is established, the tracking servo pull-in is performed.

On the other hand, in a case where a determination result that an entry direction is an opposite direction to the recording progress direction is obtained, even if the frequency condition is established, the tracking servo pull-in is not performed.

Thereby, it is possible to prevent the tracking servo pull-in from being performed for the part indicated by the arrow X in a state where a traverse state before the pull-in is the state as shown in FIG. 12, and thus to appropriately perform rewriting using the ATS after the pull-in.

Here, it can be said that a part indicated by the arrow Y in FIG. 12 is the same as the part indicated by the arrow X in terms of a traverse frequency.

In light of it, even if the tracking servo pull-in is prevented from being performed for the part indicated by the arrow X by applying the above-described method, that is, the method where only an entry direction is considered, there is concern that the tracking servo pull-in may be performed for the part indicated by the arrow Y which is an outer circumferential part of the recording part.

Specifically, since an entry direction is satisfied (naturally, it is also satisfied that there is a recording part) and a frequency condition is satisfied when the spot reaches the part indicated by the arrow Y, there is a possibility that the tracking servo pull-in may be performed for the outer circumferential portion (end portion in the recording progress direction) which is the part indicated by the arrow Y.

Therefore, it is preferable to impose an elapsed time after the entry as conditions of the pull-in along with the entry direction condition. Specifically, in a case where an entry direction condition is satisfied and a frequency becomes equal to or less than a predetermined threshold value within a predetermined time after the entry, the tracking servo pull-in is performed.

Thereby, it is also possible to prevent the tracking servo pull-in from being performed for the part indicated by the arrow Y.

However, if the lens shift method described in the second embodiment is applied to the third embodiment, it is determined that a traverse frequency in the recording part is equal to or less than a predetermined threshold value in the part indicated by the arrow X or the arrow Y, and, as a result, it leads to a state where lens shift is not performed from the state shown in FIG. 12.

Therefore, in the lens shift in this case, it is determined whether or not an entry direction condition is satisfied, and a state where a frequency of the traverse signal within a predetermined time after the entry is reduced to a predetermined value or less continues for a predetermined time (for example, a time corresponding to one rotation of the disc) or more.

If the lens shift is performed based on such a determination result, the lens shift can be performed gradually in the recording progress direction (outer circumferential side) so as to correspond to the situation shown in FIG. 12, and thus the tracking servo pull-in can be performed for the end portion of the recording part in an opposite direction to the recording progress direction.

According to the above-described method of the third embodiment, even if a traverse state before the pull-in is the state shown in FIG. 12, that is, a part where the traverse frequency is equal to or less than a predetermined threshold value is obtained only in the end portion of the recording part in the recording progress direction, it is possible to prevent the tracking servo pull-in from being performed for the end portion in the recording progress direction and thus to appropriately perform rewriting using the ATS by preventing servo misalignment of the ATS.

3-2. Configuration Related to Pull-in Control

Figure 14:
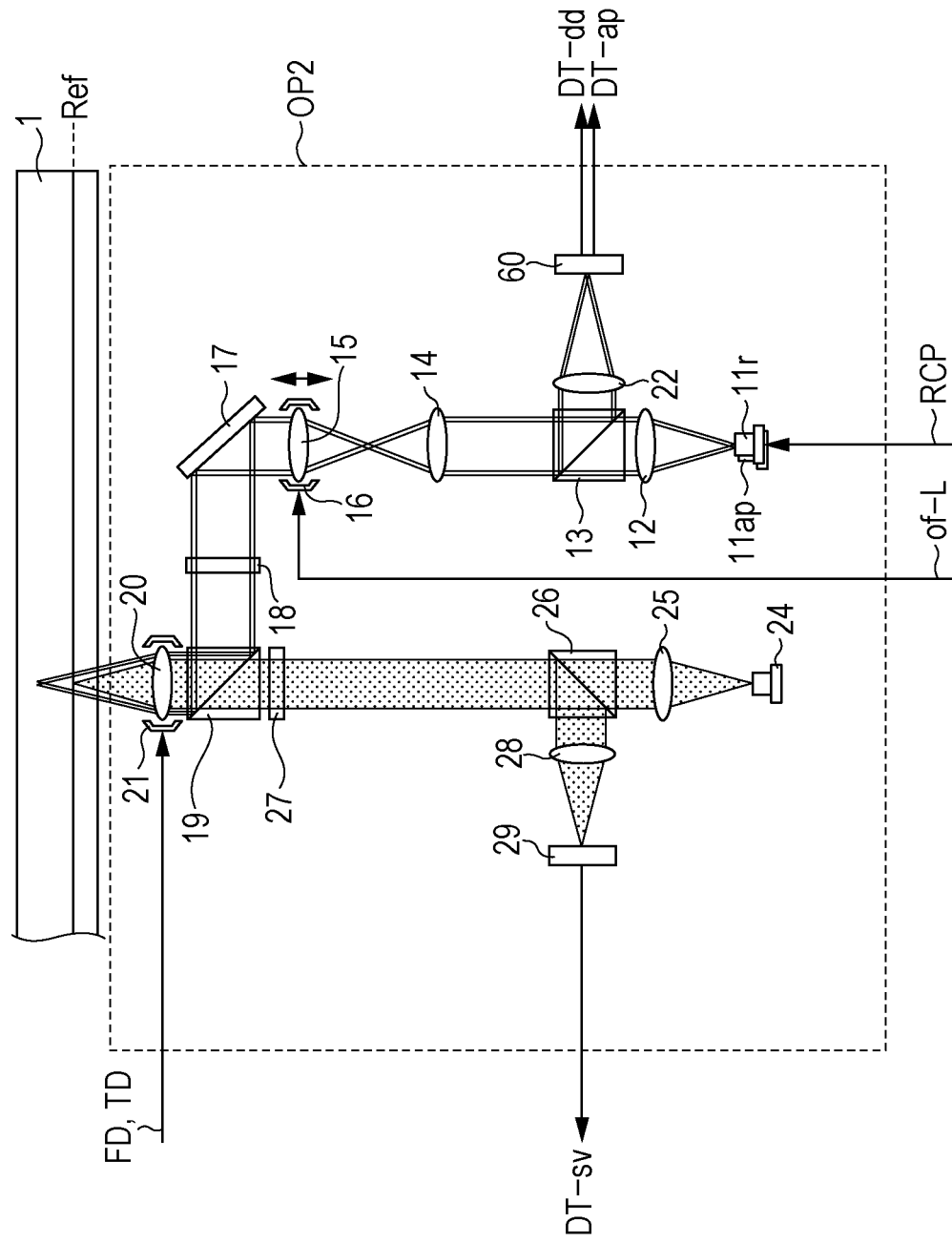
FIG. 14 is a diagram illustrating a configuration of the main optical system included in a disc drive according to a third embodiment.
Figure 15:
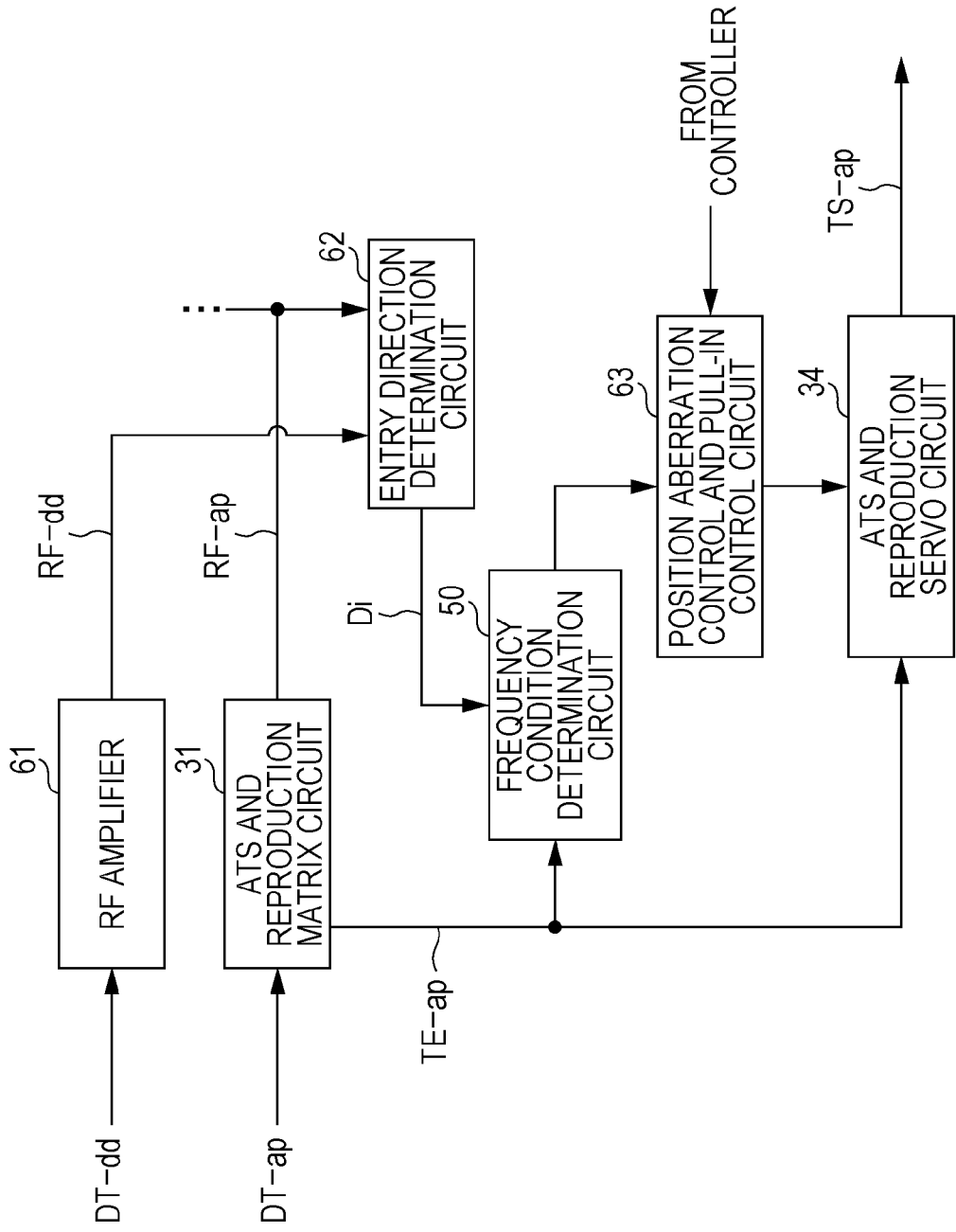
FIG. 15 is a diagram illustrating a configuration related to a tracking servo control of the overall disc drive according to the third embodiment.

FIGS. 14 and 15 are diagrams illustrating a configuration of the disc drive according to the third embodiment for realizing the pull-in method according to the third embodiment.

FIG. 14 mainly shows an internal configuration of the optical pickup OP2 included in the disc drive according to the third embodiment, and FIG. 15 mainly shows a configuration related to the tracking servo control of the disc drive according to the third embodiment.

In addition, in FIGS. 14 and 15, the parts of which the description has been completed are given the same reference numerals and description thereof will be omitted.

First, when an entry direction is determined according to the third embodiment as described above, a light detecting signal for reflection light of the recording laser light (reproduction power) is used along with a light detecting signal DT-ap for reflection light of the ATS light.

For this reason, in the optical pickup OP2 shown in FIG. 14, a first light detecting unit 60 which separately detects reflection light of the ATS light and reflection light of the recording laser light is installed instead of the first light detecting unit 23 shown in FIG. 2.

Here, a light detecting signal for the recording laser light (reproduction power) obtained by the first light detecting unit 60 is hereinafter referred to as a light detecting signal DT-dd.

In addition, in FIG. 15, upon comparison of the disc drive in this case with the disc drive shown in FIG. 8, an RF amplifier 61 is added, an entry direction determination circuit 62 is installed instead of the recording and non-recording determination circuit 33B, and a position shift control and pull-in control circuit 63 is installed instead of the position shift control and pull-in control circuit 51.

The RF amplifier 61 generates a reproduction signal RF (denoted by RF-dd) for the recording laser light based on the light detecting signal DT-dd.

Here, a reproduction signal RF (a reproduction signal RF for the ATS light) generated by the ATS and reproduction matrix circuit 31 is referred to as a reproduction signal RF-ap so as to be differentiated from the reproduction signal RF-dd.

The reproduction signal RF-ap is supplied to the reproduction processing unit 32 (not show) and the entry direction determination circuit 62.

In addition, the reproduction signal RF-dd is supplied to the entry direction determination circuit 62.

The entry direction determination circuit 62 generates an entry direction determination signal Di based on the reproduction signal RF-ap and the reproduction signal RF-dd. In this example, as the entry direction determination signal Di, a signal which indicates establishment or non-establishment of an entry direction condition and establishment or non-establishment of a predetermined time condition after the entry.

Figure 16:
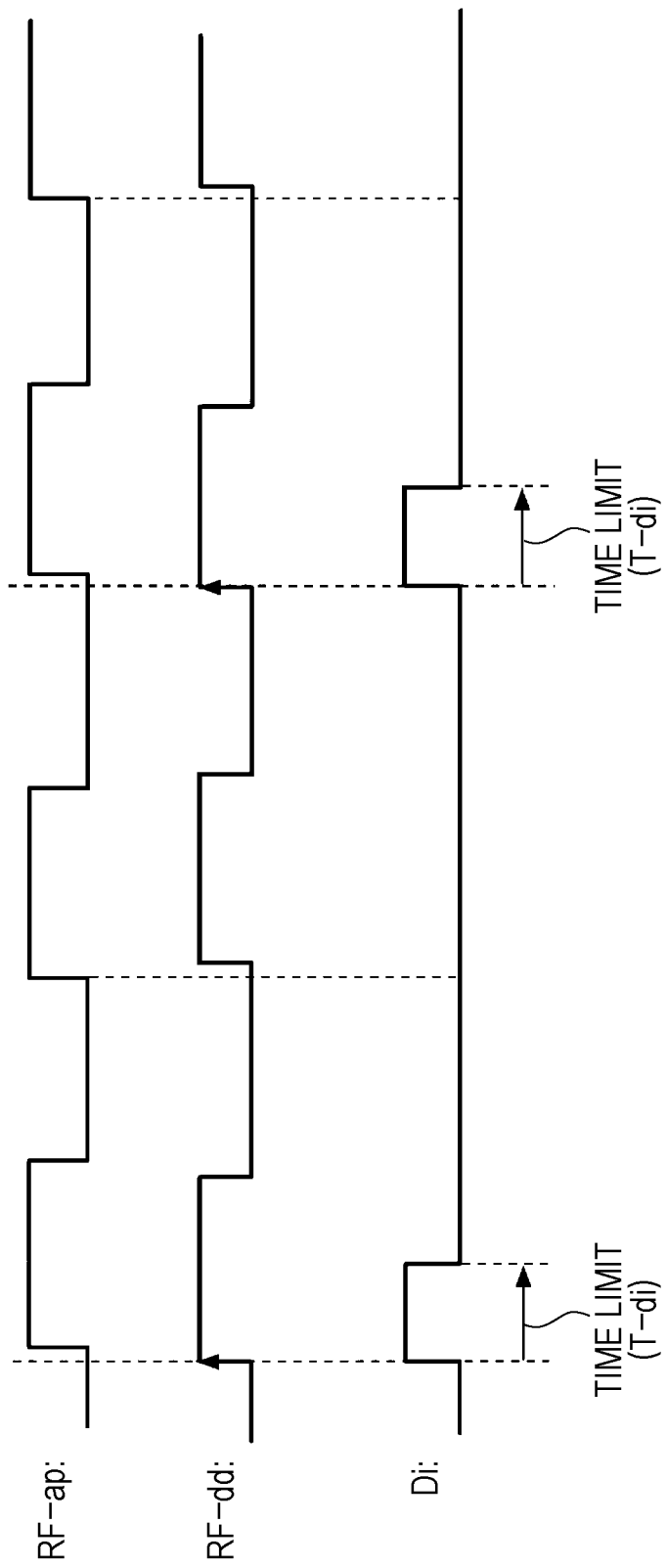
FIG. 16 is a diagram illustrating a method of generating an entry direction determination signal.

FIG. 16 is a diagram illustrating a method for generating the entry direction determination signal Di in this example.

First, in a case of this example, the entry direction determination circuit 62 performs recording and non-recording determination for the reproduction signal RF-ap and the reproduction signal RF-dd, respectively. In addition, as shown in the figure, the entry direction determination signal Di rises to a high level at a timing when a recording and non-recording determination result for the reproduction signal RF-ap is non-recording (Low) and a recording and non-recording determination result for the reproduction signal RF-dd is recording (High).

As such, time count is started from the timing when the entry direction determination signal Di rises, and the entry direction determination signal Di falls to a low level after a predetermined time T-di set in advance has elapsed.

With this, it is possible to obtain the entry direction determination signal Di which indicates establishment or non-establishment of an entry direction condition and establishment or non-establishment of a predetermined time condition after the entry. Specifically, the entry direction determination signal Di is a signal indicating a time period when the entry direction condition is established and the predetermined time condition after the entry is established.

In addition, as can be seen from the above description, the predetermined time T-di is preferably set to a time for preventing the pull-in for the part indicated by the arrow Y in FIG. 12.

Referring to FIG. 15 again, the entry direction determination signal Di generated by the entry direction determination circuit 62 is supplied to the frequency condition determination circuit 50.

The frequency condition determination circuit 50 in this case determines whether or not a frequency of the tracking error signal TE-ap is equal to or less than a predetermined threshold value based on the entry direction determination signal Di. Specifically, it is determined whether or not a frequency of the tracking error signal TE-ap in a state where the entry direction condition is established and the predetermined time condition after the entry is established is equal to or less than a predetermined threshold value.

The position shift control and pull-in control circuit 63 instructs the ATS and reproduction servo circuit 34 to start the pull-in based on the determination result by the frequency condition determination circuit 50 in response to a pull-in control start instruction from the controller 41, and performs an instruction for shifting the objective lens 20 in the tracking direction as necessary.

Specifically, in relation to the position shift control in this case, it is determined whether or not a state where a frequency of the tracking error signal TE-ap in a state where the entry direction condition is established and the predetermined time condition after the entry is established is equal to or less than a predetermined threshold value is not reduced to a predetermined threshold value or less continues for a predetermined time or more, based on the determination result by the frequency condition determination circuit 50, and if a state where the frequency is not reduced to a predetermined threshold value continues for a predetermined time or more, an instruction for shifting the objective lens 20 in the tracking direction is given to the ATS and reproduction servo circuit 34.

Here, the "predetermined time" may be set to a time corresponding to at least one rotation of the disc in this case as well.

In addition, in the same manner as the second embodiment, a lens shift amount which is instructed at this time is set so as to correspond to the number of lens shifts. In addition, a direction where the lens is shifted is set to a recording progress direction in this case as well.

Further, since the pull-in control in this case is performed based on the determination result by the frequency condition determination circuit 50, if a frequency of the tracking error signal TE-ap in a state where the entry direction condition is established and the predetermined time condition after the entry is established is reduced to a predetermined threshold value, an instruction for starting the tracking servo pull-in is given to the ATS and reproduction servo circuit 34.

3-3. Modified Example 1 of Third Embodiment

Here, in the third embodiment as well, in the same manner as the second embodiment, all or a portion of the above-described position shift control or the pull-in control may be mounted as software as a modified example thereof.

Figure 17:
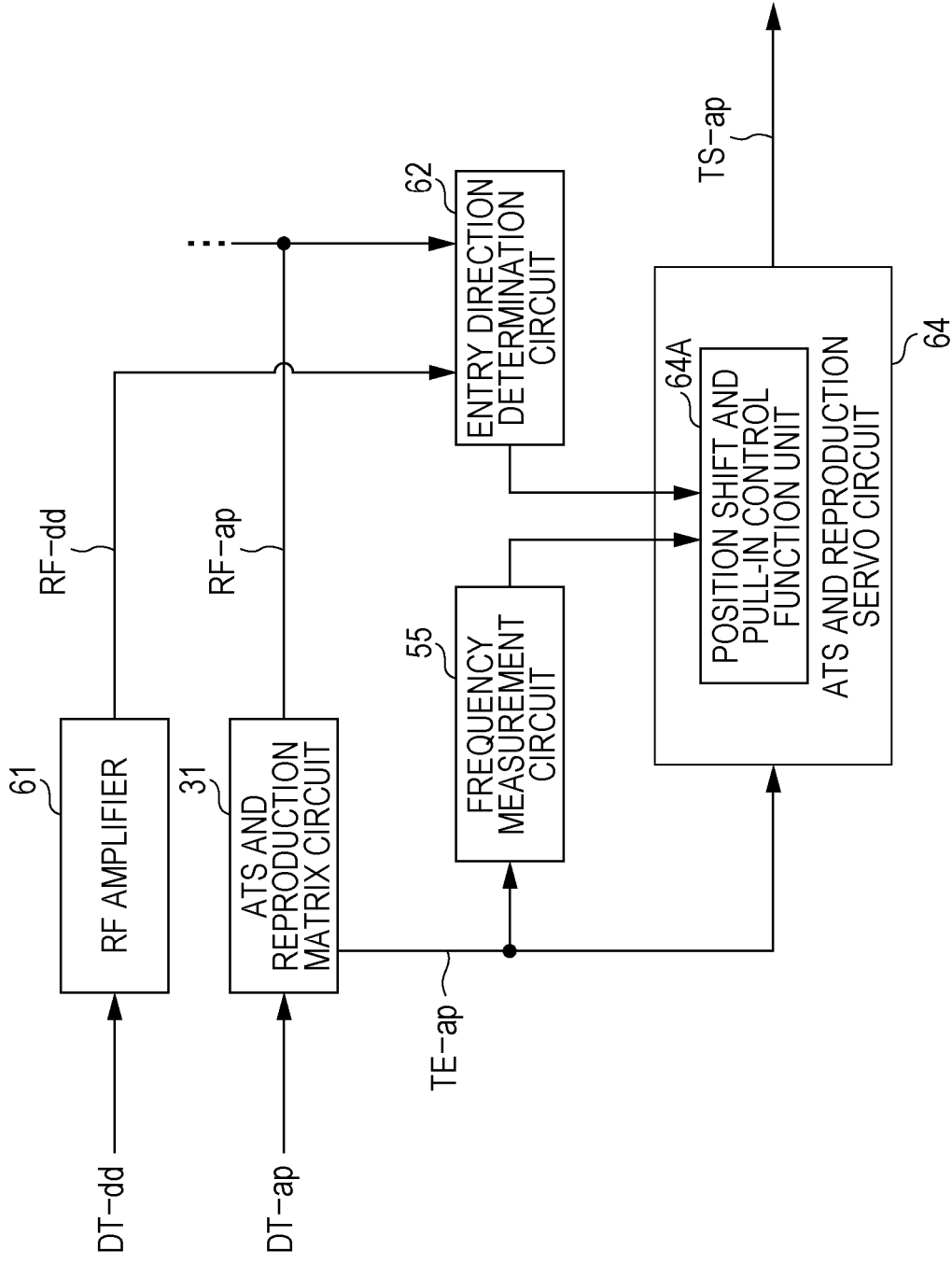
FIG. 17 is a diagram illustrating a configuration of a disc drive according to a modified example of the third embodiment.

FIG. 17 is a diagram illustrating a configuration of the disc drive according to the modified example of the third embodiment.

Upon comparison with the case of FIG. 15, in this case, a frequency measurement circuit 55 is installed instead of the frequency condition determination circuit 50, and the position shift control and pull-in control circuit 63 is omitted.

In addition, in this case, an ATS and reproduction servo circuit 64 having a function as a position shift and pull-in control function unit 64A in this figure is installed.

Here, a frequency measurement result of the tracking error signal TE-ap by the frequency measurement circuit 55 and the entry direction determination signal Di by the entry direction determination circuit 62 are input to the ATS and reproduction servo circuit 64.

Figure 18:
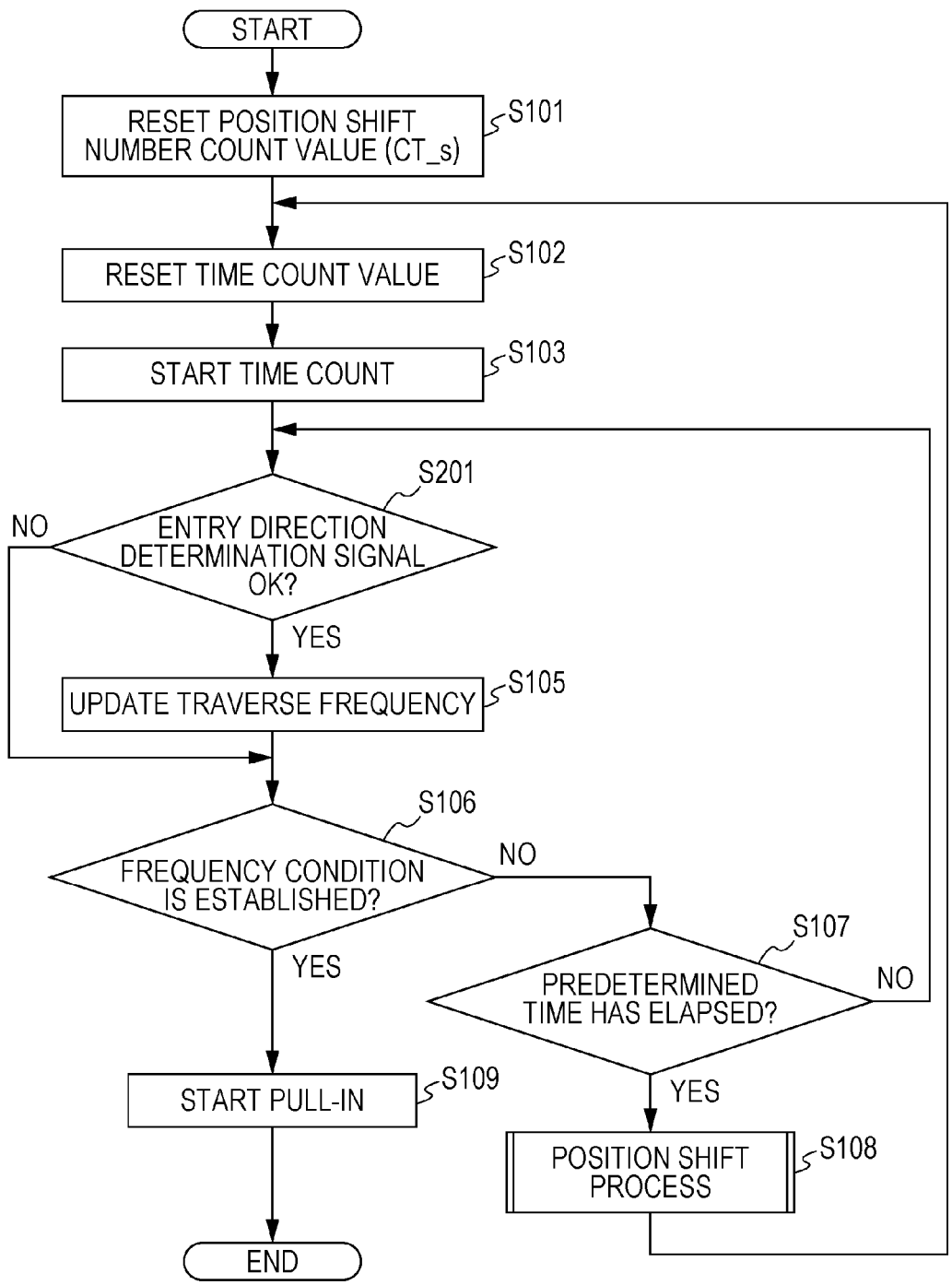
FIG. 18 is a flowchart illustrating a procedure of detailed processes which are performed in the disc drive according to the modified example of the third embodiment.

FIG. 18 is a flowchart illustrating a procedure of detailed processes which are performed as processes related to the position shift and pull-in control function unit 64A by the ATS and reproduction servo circuit 64 constituted by the DSP, in the disc drive according to the above-described modified example.

In FIG. 18, the processes which are the same as the processes described with reference to FIG. 10 are given the same reference numerals, and description thereof will be omitted.

As can be seen from comparison with FIG. 10, in this case, instead of the determination process in step S104, a determination process in step S201, that is, a determination process of whether or not the entry direction determination signal Di is satisfied is performed. Specifically, it is determined whether or not the entry direction determination signal Di is high (whether or not the entry direction condition is established and the predetermined time condition after the entry is established).

If an affirmative result that the entry direction determination signal Di is high and the entry direction determination signal Di is satisfied is obtained in step S201, the traverse frequency updating process (frequency maintaining process) in step S105 is performed, and then a determination process of whether or not the frequency condition is established is performed in step S106.

On the other hand, if a negative result that the entry direction determination signal Di is not high and the entry direction determination signal Di is not satisfied is obtained, the process in step S106 is performed.

With this, if a frequency of the tracking error signal TE-ap in a state where the entry direction condition is established and the predetermined time condition after the pull-in is established is equal to or less than a predetermined threshold value is reduced to a predetermined threshold value or less, a tracking servo pull-in start process (S109) is performed.

In addition, if a state where a frequency of the tracking error signal TE-ap in a state where the entry direction condition is established and the predetermined time condition after the entry is established is not reduced to a predetermined threshold value or less continues for a predetermined time or more, a position shift process (S108) is performed.

3-4. Modified Example 2 of Third Embodiment

Although, in the above description, as a method for preventing the tracking servo pull-in from being performed for the part indicated by the arrow Y shown in FIG. 12, the method where an elapsed time after the entry is imposed as pull-in conditions along with the entry direction condition has been exemplified, the method for preventing the pull-in for the Y part may employ the following method. That is to say, the tracking servo pull-in is performed only in a case where a recording and non-recording determination signal of the recording spot Srec side (the reproduction signal RF-dd side) is high (indicating that there is a "recording part") at a rising edge of the recording and non-recording determination signal (a variation point from non-recording to recording) of the adjacent track servo spot Sats side (the reproduction signal RF-ap side).

As can be seen from FIG. 13 or 16, in a case where a recording and non-recording determination signal of the recording spot Srec side is low at a rising edge the recording and non-recording determination signal of the adjacent track servo spot Sats side, since an entry direction is an opposite direction to the recording progress direction, if the pull-in is performed only in a case where a recording and non-recording determination signal of the recording spot Srec side is high at a rising edge of the adjacent track servo spot Sats side, it is possible to prevent the pull-in from being performed for the end portion of the recording part in the recording progress direction.

In addition, according to the method, since establishment or non-establishment of the entry condition is determined at a rising edge position of the adjacent track servo spot Sats side, even if a time limit such as the predetermined time T-di as described above is not provided, the pull-in is performed only for the entry side of the recording part, and, as a result, it is possible to effectively prevent the pull-in from being performed for the part indicated by the arrow Y.

In order to realize the above-described method according to the modified example 2, the generation method of the entry direction determination signal Di in the entry direction determination circuit 62 shown in FIG. 15 is modified as follows.

That is to say, as the entry direction determination signal Di in this case, a signal which enters a high level is generated only in a case where a recording and non-recording determination signal for the reproduction signal RF-dd is high at a rising edge of a recording and non-recording determination signal for the reproduction signal RF-ap. An entry direction determination signal Di (hereinafter, denoted by Di') generated in this way is not input to the frequency condition determination circuit 50 but is input to the position shift control and pull-in control circuit 63.

Figure 19:
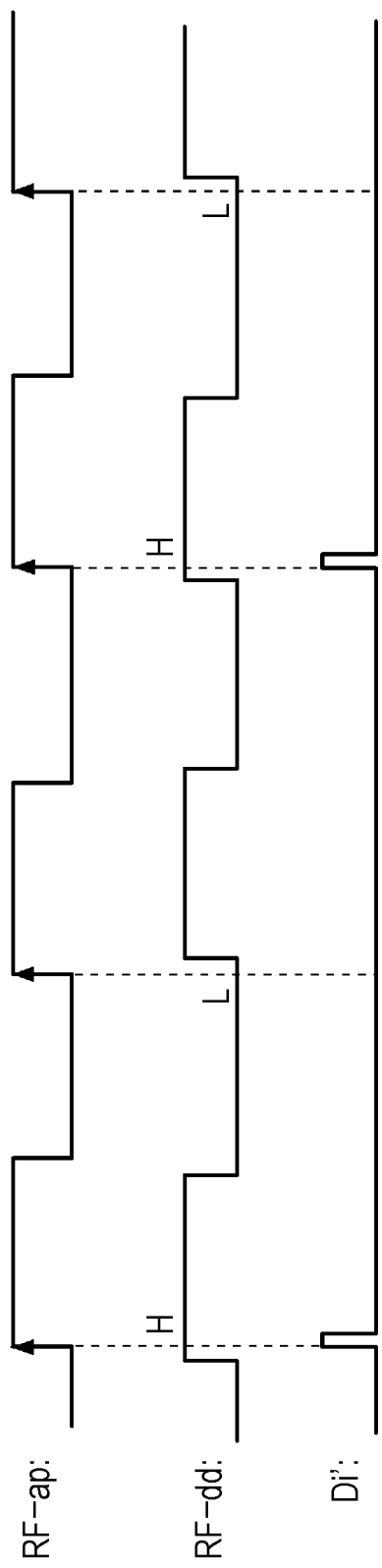
FIG. 19 is a diagram illustrating a pull-in method according to a modified example (modified example 2) of the third embodiment.

For confirmation, a generation method of the entry direction determination signal Di' is shown in FIG. 19.

In this case, the frequency condition determination circuit 50 is omitted, and, alternatively, there is provided a frequency condition determination circuit 33A which outputs a determination signal which only indicates whether or not the frequency condition is established in the same manner as the first embodiment.

Further, the position shift control and pull-in control circuit 63 instructs the ATS and reproduction servo circuit 34 to start the pull-in in a case where the entry direction determination signal Di' is high and a determination signal by the frequency condition determination circuit 33A is high (a case of indicating that the frequency condition is established). Thereby, the pull-in in this case can be performed in a case where conditions that 1) an entry direction to the recording part is the same as the recording progress direction, and 2) is around a variation point from the non-recording part to the recording part, and 3) the frequency condition is established, are all satisfied. As a result, it is possible to prevent the pull-in from being performed for the end portion of the recording part in the recording progress direction including the part indicated by the arrow Y.

Here, a position shift control by the position shift control and pull-in control circuit 63 in this case is modified as follows so as to correspond to omission of the frequency condition determination circuit 50.

That is to say, it is determined whether or not the frequency condition is established when the entry direction determination signal Di' is high, and if a time when an affirmative result is not obtained through the determination continues for a predetermined time (corresponding to at least one rotation of the disc) or more, an instruction for shifting the objective lens 20 is given to the ATS and reproduction servo circuit 34.

Thereby, it is possible to prevent the problem that the position shift is not performed when the traverse frequency is in a state of being reduced to a predetermined threshold value or less only in the outer circumferential portion (the end portion in the recording direction) in the recording part as in FIG. 12.

3-5. Modified Example 3 of Third Embodiment

Although, in the above description, a case where a direction of the objective lens 20 to be shifted is the recording progress direction in the position shift control has been exemplified, in a case of employing a pull-in method including the entry direction determination according to the third embodiment, a shift direction of the objective lens 20 may be the same direction or an opposite direction to the recording progress direction.

That is to say, according to the pull-in method including the entry direction determination according to the third embodiment which has been described hitherto, even if the objective lens 20 is shifted in an opposite direction to the recording progress direction, for example, in the state shown in FIG. 7, it is possible to prevent the pull-in from being performed for the end portion of the recording part in the recording progress direction, and thus to necessarily perform the pull-in for the end portion of the recording part in an opposite direction to the recording progress direction. As can be seen from this, in a case of employing the pull-in method according to the third embodiment including the entry direction determination, a shift direction of the objective lens 20 in the position shift control can be arbitrarily set.

4. Fourth Embodiment 4-1. Optical Disc Recording Medium which is Target of Recording and Reproduction Although a case where the present disclosure is applied to the case of performing recording and reproduction for the bulk type recording medium 1 having a bulk-shaped recording layer (the bulk layer 5) has been exemplified in the description hitherto, instead of the bulk layer 5, the present disclosure may be appropriately applied to an optical disc recording medium (referred to as a multi-layer recording medium 70) which is provided with a recording layer having a multi-layer structure formed of a plurality of recording films, for example, as shown in FIG. 20.

Figure 20:
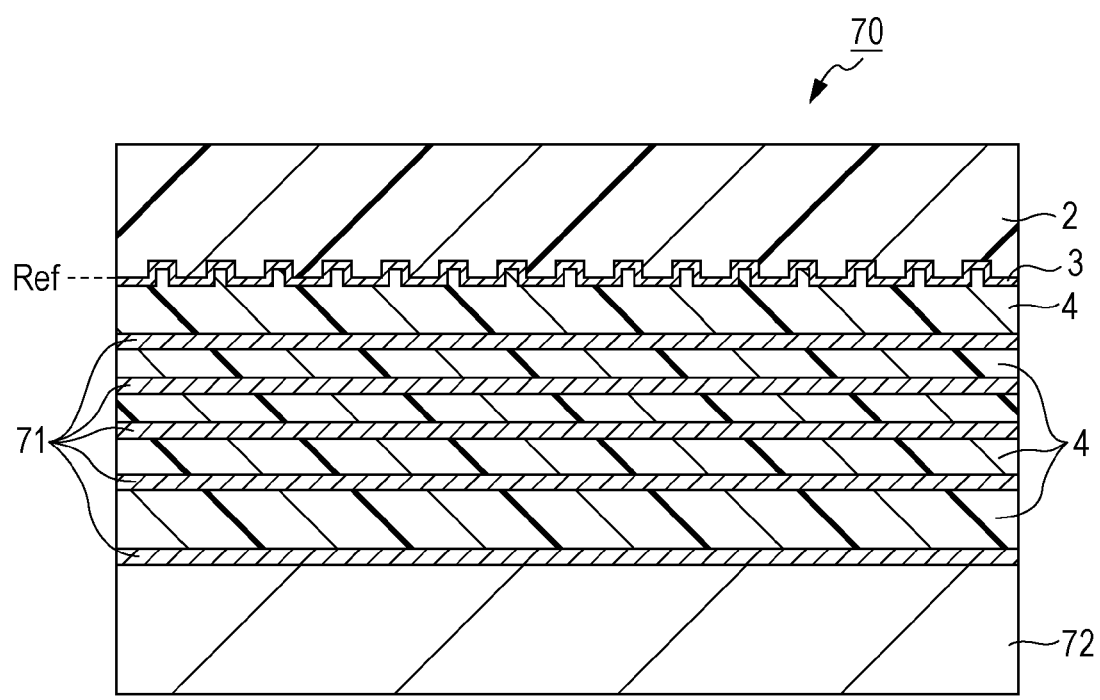
FIG. 20 is a diagram illustrating a cross-sectional structure of an optical disc recording medium which is a target of recording and reproduction according to a fourth embodiment.

In FIG. 20, the multi-layer recording medium 70 is the same as the bulk type recording medium 1 shown in FIG. 1 in that a cover layer 2, a selective reflection layer 3, and an intermediate layer 4, are sequentially formed from the upper layer side; however, in this case, instead of the bulk layer 5, a recording layer having a layer structure where a translucent recording film 71 and the intermediate layer 4 are laminated a predetermined number of times as shown in the figure. As shown in the figure, the translucent recording film 71 formed at the lowest layer is laminated on a substrate 72. In addition, a recording film formed at the lowest layer may use a total reflection recording film.

Here, it is noted that position guiders accompanied by formation of grooves or pit strings are not formed on the translucent recording film 71. That is to say, in the multi-layer recording medium 70 as well, the position guiders are formed only at one layer position which is the reference face Ref.

In the recording layer of the multi-layer recording medium 70, since the translucent recording film 71 which functions as a reflection film is formed, reflection light can be obtained even if marks are not recorded. That is to say, even in a state before the pull-in is performed after access is performed using the reference face Ref, the focus servo control can be performed using reflection light from the recording layer. Specifically, the focus servo control can be performed using reflection light of the ATS light.

4-2. Internal Configuration of Disc Drive

Figure 21:
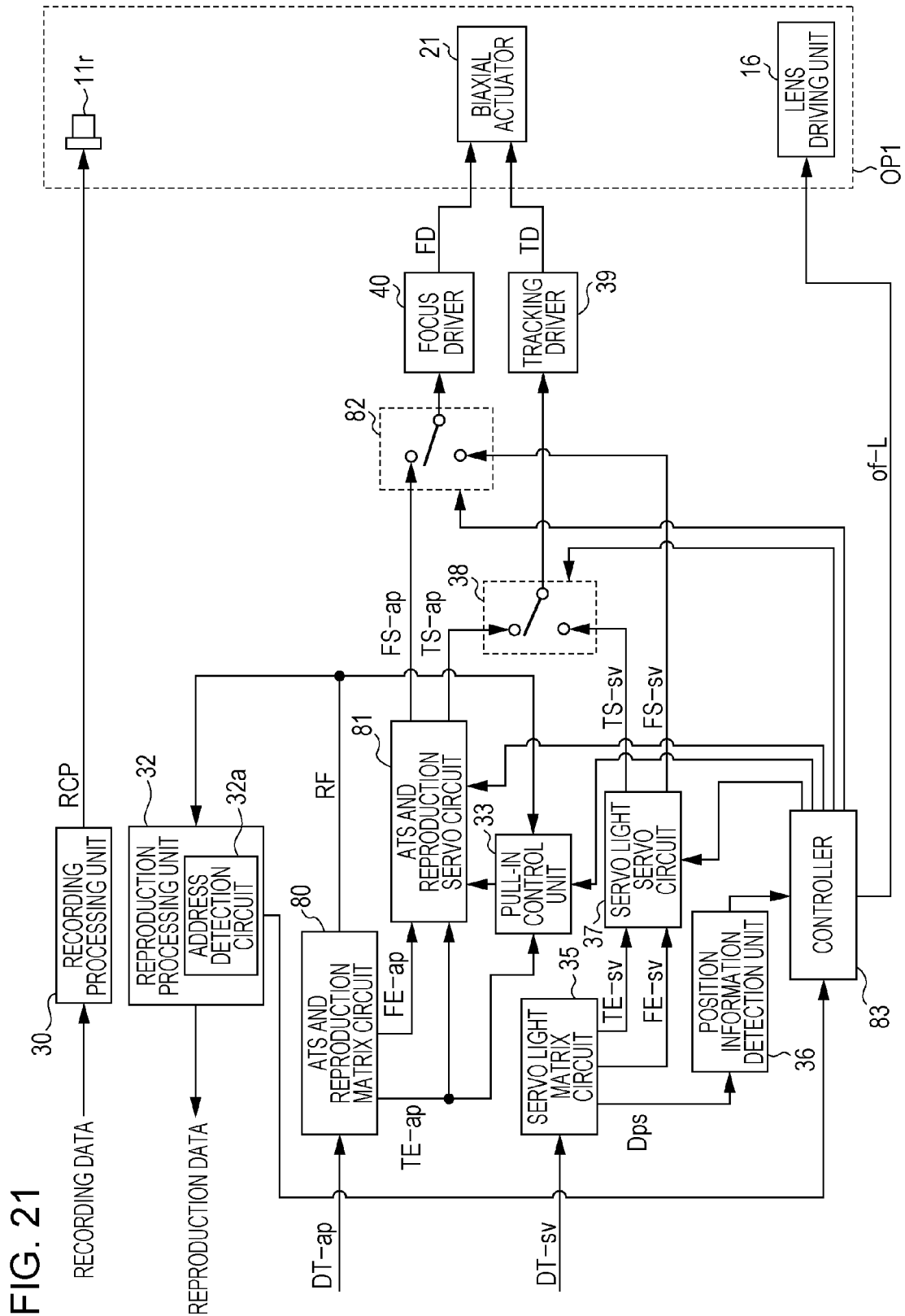
FIG. 21 is a diagram illustrating an internal configuration of a disc drive according to the fourth embodiment.

FIG. 21 is a diagram illustrating an internal configuration of the disc drive according to the fourth embodiment which performs recording and reproduction so as to correspond to the multi-layer recording medium 70 shown in FIG. 20.

In addition, FIG. 21 shows a case where the pull-in control unit 33 according to the first embodiment is provided as an example, and this configuration may be applied to a case where the pull-in control and the position shift control according to the second or third embodiment are performed.

In addition, in FIG. 21, the parts of which description has been described hitherto are given the same reference numerals and description thereof will be omitted.

First, in the disc drive in this case, an ATS and reproduction matrix circuit 80 is installed instead of the ATS and reproduction matrix circuit 31, an ATS and reproduction servo circuit 81 is installed instead of the ATS and reproduction servo circuit 34, and a controller 83 is installed instead of the controller 41, such that switching between a focus servo control based on reflection light (reflection light from the recording film 71) of the ATS light and a focus servo control based on reflection light (reflection light from the reference face Ref) of the servo laser light can be performed.

In addition, a selector 82 is added in the figure.

The ATS and reproduction matrix circuit 80 generates a reproduction signal RF and a tracking error signal TE-ap as well as a focus error signal FE-ap (a signal indicating a focus error of the ATS light with respect to a targeted recording film 71).

The focus error signal FE-ap is supplied to the ATS and reproduction servo circuit 81.

The ATS and reproduction servo circuit 81 is the same as the ATS and reproduction servo circuit 34 in that it generates a tracking servo signal TS-ap based on a tracking error signal TE-ap or performs the tracking servo pull-in in response to an instruction from the pull-in control unit 33, and, in this case, further performs processes related to the focus servo control based on the focus error signal FE-ap.

Specifically, the ATS and reproduction servo circuit 81 generates a focus servo signal FS-ap which enables a focal position of the ATS light to follow the recording film 71, based on the focus error signal FE-ap, and performs focus servo pull-in in response to an instruction from the controller 83. In addition, the ATS and reproduction servo circuit 81 performs a focus jumping control in response to an instruction from the controller 83.

As shown in the figure, the focus servo signal FS-ap is supplied to the selector 82.

A focus servo signal FS-sv is supplied to the selector 82 from the servo light servo circuit 37 along with the focus servo signal FS-ap.

The selector 82 selects one of the focus servo signals FS and outputs it to the focus driver 40 in response to an instruction from the controller 83.

The controller 83 controls driving of the lens driving unit 16 based on a value of the offset of-L set so as to correspond to each recording layer position L (in this case, each recording film 71), thereby performing a control of a focus position (in this case, a rough position is determined corresponding to a targeted recording film 71) of the recording laser light and the ATS light during recording or reproduction (including the time of access).

In addition, in this case, the controller 83 performs an instruction for the servo light servo circuit 37, the pull-in control unit 33, and the selector 38, and performs an instruction for the ATS and reproduction servo circuit 81 and the selector 82, thereby performing a control such that a focus servo and a tracking servo are executed by methods according to the respective cases such as recording or reproduction or access using the reference face Ref.

Specifically, the tracking servo control is the same as that in the first embodiment at the time of access around a recording start position and at the time of access around a reproduction start position in this case.

That is to say, the tracking servo control is performed by the servo light servo circuit 37 at the time of the access. In addition, after the access, a pull-in control start instruction is given to the pull-in control unit 33 (a pull-in control circuit 33C) and the selector 38 selects the tracking servo signal TS-ap through a selection instruction such that switching to the tracking servo control by the ATS and reproduction servo circuit 81 is performed. In addition, these detailed processes have already been described, and repeated description will be omitted.

Further, in this case, in relation to the focus servo control, the following control is performed at the time of access around a recording start position, at the time of access around a reproduction start position, and after the access (before pull-in). That is to say, at the time of access around a recording start position and at the time of access around a reproduction start position, the focus servo signal FS-sv is generated by the servo light servo circuit 37 and the focus servo signal FS-sv is selected by the selector 82 such that the servo light servo circuit 37 performs the focus servo control. On the other hand, after the access, the ATS and reproduction servo circuit 81 generates the focus servo signal FS-ap and the selector 82 selects the focus servo signal FS-ap such that switching to the focus servo control by the ATS and reproduction servo circuit 81 is performed.

In this way, in the fourth embodiment, the focus servo control can be performed using reflection light from the recording film 71.

5. Modified Example

As above, although the respective embodiments according to the present disclosure have been described, the present disclosure is not limited to the detailed examples described hitherto.

For example, although, in the description hitherto, a case where recording and non-recording determination is performed using a binarization signal as a reproduction signal RF (a signal after DC-cut) has been exemplified, the recording and non-recording determination may be performed using a sum signal (pull-in signal) which is generated without the DC-cut.

Figure 22:
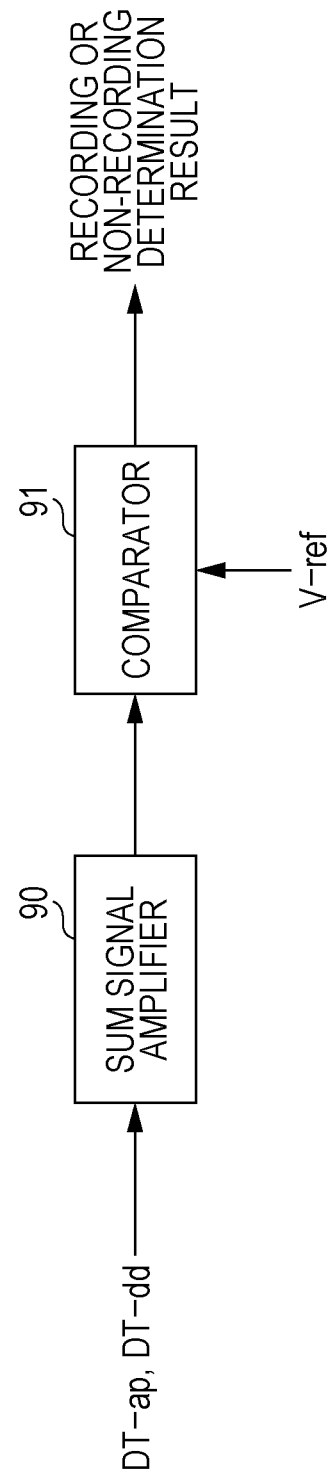
FIG. 22 is a diagram illustrating a method of determining recording and non-recording according to a modified example.

Specifically, as shown in FIG. 22, a sum signal amplifier 90 generates a sum signal, and a comparator 91 compares the sum signal with a predetermined reference voltage V-ref, thereby performing a recording and non-recording determination based on a light detecting signal DT-ap (or a light detecting signal DT-dd).

Although, in the second and third embodiments, there has been proposed the method for performing the tracking servo pull-in for the end portion of the recording part in an opposite direction to the recording progress direction such that rewriting can be appropriately performed using the ATS, the method is preferably applied at least during recording. That is to say, during tracking servo pull-in corresponding to reproduction, the pull-in control according to the method of the first embodiment may be performed.

In addition, although a case where marks are recorded using the ATS and a tracking servo is performed by the adjacent track servo spot Sats during reproduction so as to correspond thereto has been exemplified in the above description, the present disclosure may be applied to cases of performing a tracking servo using methods other than the ATS, such as a tracking servo using the recording spot Srec.

Although a case where the reference face is provided on the upper layer side of the recording layer has been exemplified in the above description, the reference face may be provided on a lower layer side of the recording layer.

Figure 23:
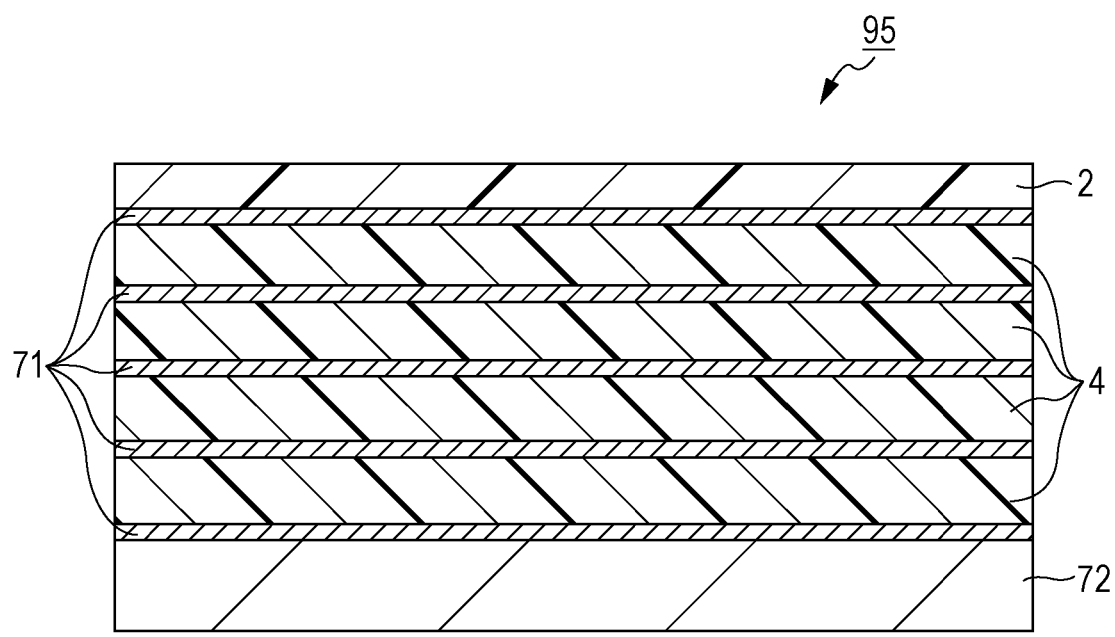
FIG. 23 is a diagram illustrating a cross-sectional structure of the optical disc recording medium according to the modified example.

The present disclosure may be applied to a case where recording and reproduction are performed for an optical disc recording medium having no reference face Ref as shown in FIG. 23.

FIG. 23 shows an example where an optical disc recording medium having no reference face Ref is used as a multi-layer recording medium 95 having a plurality of translucent recording films 71.

For example, guide mark strings corresponding to at least one circumference are recorded on a targeted recording film 71 using the recording spot Srec in the multi-layer recording medium 95. The tracking servo pull-in is performed for the guide mark strings recorded in this way using the adjacent track servo spot Sats, thereby performing a tracking servo as the ATS. Thereby, rewriting on the guide mark strings can be performed using the ATS.

Figure 24:
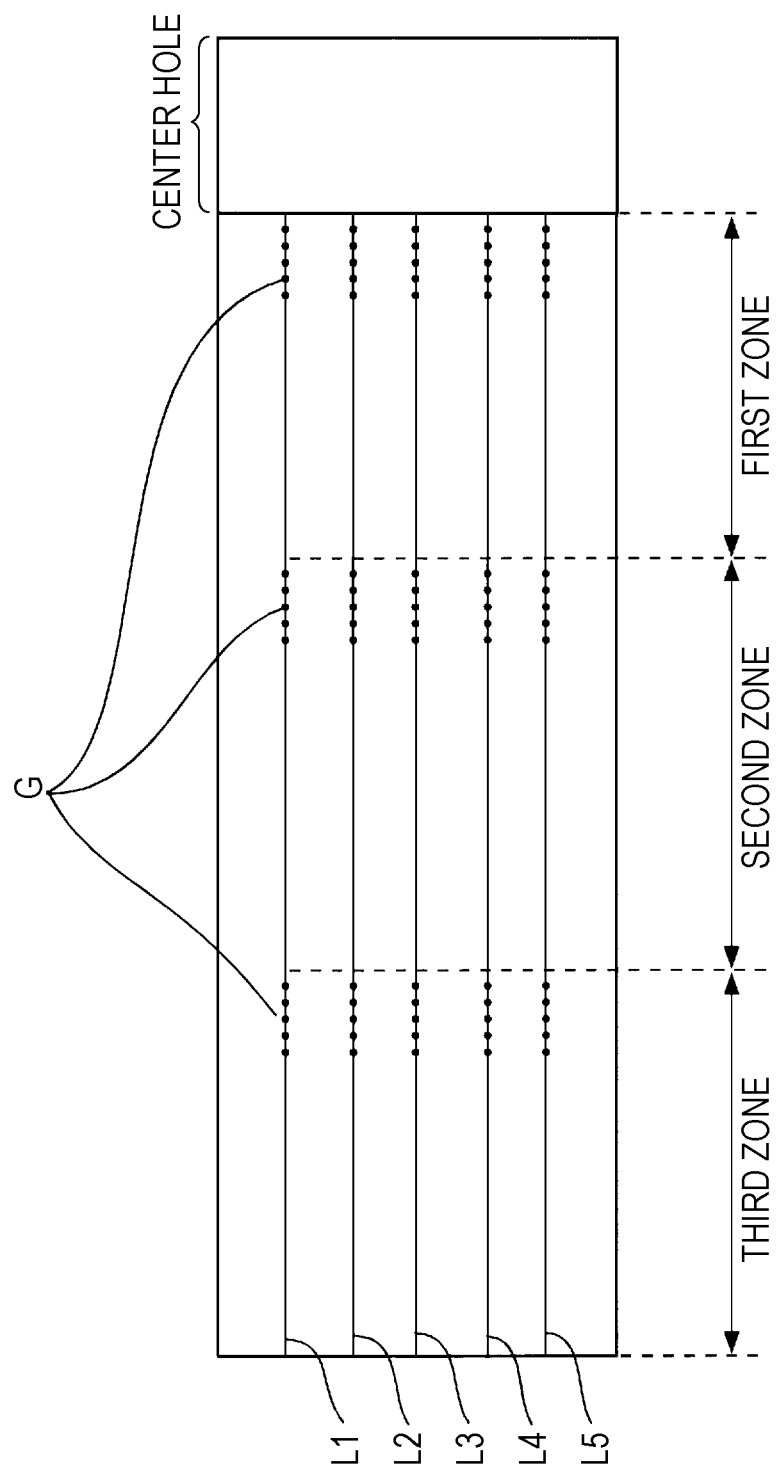
FIG. 24 is a diagram illustrating a cross-sectional structure of the optical disc recording medium according to another modified example.
Figure 25:
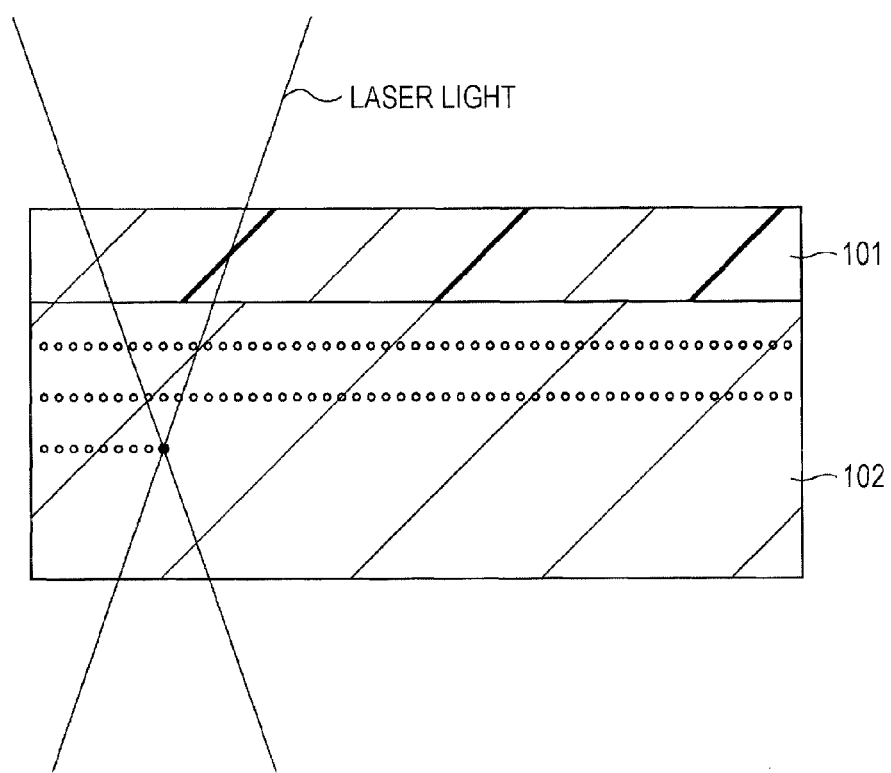
FIG. 25 is a diagram illustrating a bulk recording type.
Figure 26:
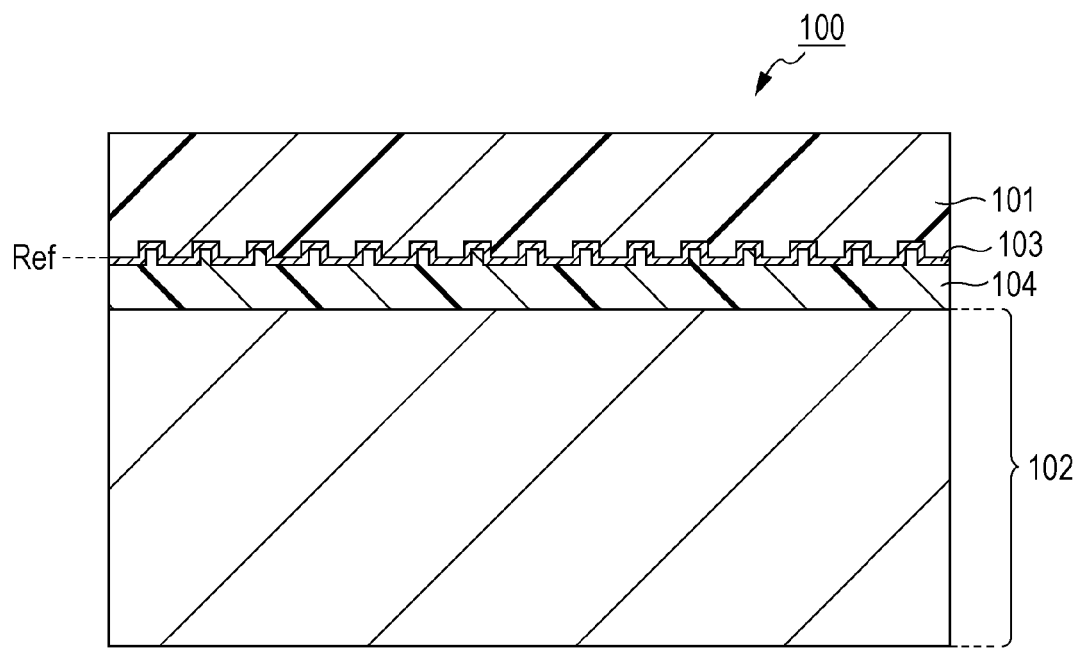
FIG. 26 is a diagram illustrating a cross-sectional structure of an actual bulk type recording medium having a reference face.

In addition, as shown in FIG. 24, a method may be employed in which guide pre-recorded mark strings G are formed in advance at the head for each zone which is set in the radius direction.

The guide pre-recorded mark strings G are recorded in advance using a high accuracy recording apparatus, for example, before shipment thereof. In addition, the guide pre-recorded mark strings G are recorded for each layer position L.

With the formation of the guide pre-recorded mark strings G, it is possible to appropriately perform ATS pull-in at the head of the zone for each layer position L.

In addition, although a case where the guide pre-recorded mark strings G are formed inside the bulk-shaped recording layer has been exemplified in FIG. 24, the present disclosure may be also appropriately applied to a case where the guide pre-recorded mark strings G are formed in the multi-layer recording medium 95 as shown in FIG. 23.

Although a case where the present disclosure is applied to the recording and reproduction apparatus which performs both recording and reproduction for an optical disc recording medium (recording layer) has been exemplified, the present disclosure may be appropriately applied to a recording only apparatus (recording apparatus) which performs only recording for an optical disc recording medium (recording layer) or a reproduction only apparatus (reproduction apparatus) which performs only reproduction.

The present disclosure contains subject matter related to that disclosed in Japanese Priority Patent Application JP 2011-016084 filed in the Japan Patent Office on Jan. 28, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A disc drive comprising:
    an optical pickup configured to emit laser light to a predetermined layer position via an objective lens and detect reflection light of the laser light with respect to an optical disc recording medium where marks are recorded at the predetermined layer position through application of laser light;
    a tracking mechanism configured to drive the objective lens in a tracking direction which is a direction parallel to a radius direction of the optical disc recording medium;
    a tracking error signal generation unit configured to generate a tracking error signal indicating a position error of an irradiation spot of the laser light with respect to a track, which is formed at the predetermined layer position through mark recording, based at least in part on a light detecting signal for the reflection light obtained by the optical pickup;
    a tracking servo control unit configured to perform a tracking servo control based at least in part on the tracking error signal; and
    a control unit configured to make the tracking servo control unit perform tracking servo pull-in at least in part on the basis of a frequency measurement result of the tracking error signal and a recording or non-recording determination result based at least in part on the light detecting signal, in a state where a tracking servo control by the tracking servo control unit is turned off.

2. The disc drive according to claim 1, wherein the control unit is configured to determine whether a state where a frequency of the tracking error signal, which is in a state where a determination result indicating that there is a recording part through the recording or non-recording determination can be obtained, is not reduced to a predetermined threshold value or less continues for a predetermined time or more, and control the tracking mechanism to shift a position of the objective lens if the state where the frequency is not reduced to the predetermined threshold value or less continues for the predetermined time or more.

3. The disc drive according to claim 2, wherein the controller is configured to make the tracking servo control unit perform tracking servo pull-in if a frequency of the tracking error signal, which is in a state where a determination result indicating that there is a recording part through the recording or non-recording determination can be obtained, is reduced to a predetermined threshold value or less.

4. The disc drive according to claim 3, wherein the controller is configured to shift a position of the objective lens by a shift amount corresponding to a number of times where a position of the objective lens is shifted based at least in part on a determination result of the frequency.

5. The disc drive according to claim 4, wherein if a progress direction of recording in the radius direction set in the predetermined layer position of the optical disc recording medium is a recording progress direction, the controller shifts a position of the objective lens in the recording progress direction.

6. The disc drive according to claim 5, wherein, as the laser light is applied via the objective lens, the optical pickup is configured to apply first laser light emitted from a light source for recording the marks and to apply second laser light for an adjacent track servo which forms a following spot of an irradiation spot of the first laser light, and to detect reflection light of the second laser light, and
wherein the tracking servo control unit is configured to perform a tracking servo control at least in part on the basis of the tracking error signal which is generated by the tracking error signal generation unit at least in part on the basis of a light detecting signal for the second laser light which is obtained by the optical pickup.

7. The disc drive according to claim 6, wherein the optical pickup is configured to separately detect reflection light of the first laser light and reflection light of the second laser light, and
wherein the controller is configured to determine which of an irradiation spot of the first laser light and an irradiation spot of the second laser light first enters a recording track at least in part on the basis of a recording or non-recording determination result based at least in part on a light detecting signal for the first laser light and a recording or non-recording determination result based at least in part on a light detecting signal for the second laser light, obtained by the optical pickup, and controls the tracking servo pull-in not to be performed if the irradiation spot of the second laser light first enters the recording track.

8. The disc drive according to claim 7, wherein the control unit is configured to determine whether or not a state where a frequency of the tracking error signal, which is in a state where a condition that the irradiation spot of the first laser light first enters the recording track and a condition that an elapsed time is within a predetermined time after the entry are established, is not reduced to a predetermined threshold value or less continues for a predetermined time or more, and controls the tracking mechanism to shift a position of the objective lens if the state where the frequency is not reduced to the predetermined threshold value or less continues for the predetermined time or more, and makes the tracking servo control unit perform tracking servo pull-in if the frequency is reduced to the predetermined threshold value or less.

9. The disc drive according to claim 7, wherein, on the basis of a first recording or non-recording determination signal indicating a recording or non-recording determination result based at least in part on a light detecting signal for the first laser light and a second recording or non-recording determination signal indicating a recording or non-recording determination result based at least in part on a light detecting signal for the second laser light, obtained by the optical pickup, the controller is configured to determine whether or not the first recording or non-recording determination signal indicates that there is a recording part at a variation point from a non-recording part to a recording part indicated by the second recording or non-recording determination signal, and make the tracking servo control unit perform tracking servo pull-in if the first recording or non-recording determination signal indicates that there is a recording part and the frequency of the tracking error signal is equal to or less than a predetermined threshold value at the variation point.

10. The disc drive according to claim 9, wherein the control unit is configured to determine whether a state where a frequency of the tracking error signal at the variation point of the second recording or non-recording determination signal is not reduced to a predetermined threshold value or less continues for a predetermined time or more, and controls the tracking mechanism to shift a position of the objective lens if the state where the frequency is not reduced to the predetermined threshold value or less continues for the predetermined time or more.

11. The disc drive according to claim 1, wherein the optical disc recording medium is a bulk type recording medium, which has a bulk-shaped recording layer, and where marks are recorded at a predetermined layer position inside the recording layer, and which is provided with a reference face as a reflection surface where position guiders are formed, at a layer position different from the recording layer,
wherein the optical pickup is configured to apply first type laser light, which is to be applied to the recording layer and second type laser light which is to be applied to the reference face, and to separately detect reflection light of the first type laser light and reflection light of the second type laser light, via the objective lens,
wherein the tracking error signal generation unit is configured to generate the tracking error signal based at least in part on a light detecting signal for the first type laser light obtained by the optical pickup, and
wherein the disc drive further includes a position control unit that controls a position of the objective lens based at least in part on a light detecting signal for the second type laser light obtained by the optical pickup.

12. The disc drive according to claim 1, wherein the optical disc recording medium is a multi-layer recording medium which has a plurality of recording films where the marks are recorded, each recording film being formed at a predetermined layer position, and
wherein the optical pickup is configured to emit laser light to the recording films via the objective lens and to detect reflection light of the laser light from the recording films.

13. A tracking servo pull-in method in a disc drive including an optical pickup configured to emit laser light to a predetermined layer position via an objective lens and detect reflection light of the laser light with respect to an optical disc recording medium where marks are recorded at the predetermined layer position through application of laser light; a tracking mechanism configured to drive the objective lens in a tracking direction which is a direction parallel to a radius direction of the optical disc recording medium; a tracking error signal generation unit configured to generate a tracking error signal indicating a position error of an irradiation spot of the laser light with respect to a track which is formed at the predetermined layer position through mark recording, based at least in part on a light detecting signal for the reflection light obtained by the optical pickup; and a tracking servo control unit configured to perform a tracking servo control based at least in part on the tracking error signal, the method comprising:

causing the tracking servo control unit to perform tracking servo pull-in at least on the basis of a frequency measurement result of the tracking error signal and a recording or non-recording determination result based at least in part on the light detecting signal, in a state where a tracking servo control by the tracking servo control unit is turned off.

\* \* \* \* \*